US012458230B2

(12) United States Patent
Plath et al.

(10) Patent No.: US 12,458,230 B2
(45) Date of Patent: *Nov. 4, 2025

(54) WEARABLE DEVICE FOR MONITORING THE HEALTH AND SUPERVISION OF A SUPERVISED BEING AND RELATED SYSTEMS AND METHODS

(71) Applicant: Littlebird Connected Care, Inc., Fall City, WA (US)

(72) Inventors: Monica Marie Plath, Yakima, WA (US); Gadi Amit, San Mateo, CA (US); Stanislav Moiseyenko, San Rafael, CA (US); Christopher James Foster, San Francisco, CA (US); Tim Suleymanov, San Francisco, CA (US)

(73) Assignee: LITTLEBIRD CONNECTED CARE, INC., Fall City, WA (US)

( * ) Notice: Subject to any disclaimer, the term of this patent is extended or adjusted under 35 U.S.C. 154(b) by 254 days.

This patent is subject to a terminal disclaimer.

(21) Appl. No.: 18/326,995

(22) Filed: May 31, 2023

(65) Prior Publication Data

US 2023/0301517 A1    Sep. 28, 2023

Related U.S. Application Data

(63) Continuation-in-part of application No. 18/147,637, filed on Dec. 28, 2022, now Pat. No. 11,786,123, (Continued)

(51) Int. Cl.
A61B 5/00    (2006.01)
A61B 5/11    (2006.01)
(Continued)

(52) U.S. Cl.
CPC .......... *A61B 5/0022* (2013.01); *A61B 5/1112* (2013.01); *A61B 5/681* (2013.01);
(Continued)

(58) Field of Classification Search
CPC ..... A61B 5/0022; A61B 5/1112; A61B 5/681; A61B 5/746; G08B 21/0453; G16H 40/67
(Continued)

(56) References Cited

U.S. PATENT DOCUMENTS 8,725,148 B2 * 5/2014 George ............... H04M 7/1235
                                                        455/552.1
11,348,681 B1 * 5/2022 Morrow ................. G16H 10/60
(Continued)

*Primary Examiner* — Omar Casillashernandez
(74) *Attorney, Agent, or Firm* — Perkins Coie LLP

(57) ABSTRACT

Systems and methods for aiding, supplementing, and/or increasing the monitoring capabilities of responsible persons over a supervised being are disclosed herein. In some implementations, the system includes one or more controlling persons, one or more supervising persons, a supervised being, and a cloud server. Each of the controlling persons and the supervising persons can have a personal electronic device. The supervised being can have an associated electronic device, such as a wearable electronic device. The electronic devices allow the controlling persons and the supervising persons to actively communicate with the cloud server to upload data related to the supervised being that is accessibly stored in the cloud server. In turn, the associated electronic device can include one or more sensors to measure and communicate various information to the cloud server. The system allows the controlling persons to monitor the health of, development of, and/or current control over the supervised being.

20 Claims, 30 Drawing Sheets

Related U.S. Application Data which is a continuation of application No. 17/891,781, filed on Aug. 19, 2022, now Pat. No. 11,540,716.

(60) Provisional application No. 63/260,440, filed on Aug. 19, 2021.

(51) Int. Cl.
*G08B 21/04* (2006.01)
*G16H 40/67* (2018.01)

(52) U.S. Cl.
CPC .......... *A61B 5/746* (2013.01); *G08B 21/0453* (2013.01); *G16H 40/67* (2018.01)

(58) Field of Classification Search
USPC .............................................. 705/2
See application file for complete search history.

(56) References Cited

U.S. PATENT DOCUMENTS

| | | | | |
|---|---|---|---|---|
| 2015/0154370 A1* | 6/2015 | Skaaksrud | ......... | G06Q 30/0269 |
| | | | | 705/2 |
| 2016/0147974 A1* | 5/2016 | Sha | ................ | G16H 10/20 |
| | | | | 705/2 |

* cited by examiner

700g

WEARABLE DEVICE FOR MONITORING THE HEALTH AND SUPERVISION OF A SUPERVISED BEING AND RELATED SYSTEMS AND METHODS

CROSS-REFERENCE TO RELATED APPLICATIONS

The present application is a continuation-in-part of U.S. patent application Ser. No. 18/147,637 filed Dec. 28, 2022, which is a continuation of U.S. patent application Ser. No. 17/891,781 filed Aug. 19, 2022, now U.S. Pat. No. 11,540,716, which claims the benefit of U.S. Provisional Patent Application No. 63/260,440 filed Aug. 19, 2021, the entirety of both applications incorporated herein by reference.

TECHNICAL FIELD

The present disclosure is generally related to systems and methods for supervising one or more living beings. In particular, the present technology relates to wearable devices and related systems for monitoring the health and control over the supervised beings.

BACKGROUND

The health and safety of our loved ones is an invaluable aspect of daily life. We closely supervise our children's development through their early years and continue to supervise and care for them as they grow older. Then, as our parents and other family members age, we become increasingly reinvolved in their daily lives, care, and wellbeing. Further, we invite pets into our lives and look after their care and development like additional family members; and we raise livestock who's care and development can occupy our entire lives. For many of us, the supervision of our children, elderly family members, other loved ones, pets, and other animals (sometimes referred to collectively herein as "beings" or "living beings") requires the assistance of caregivers, doctors, vets, and other supervisors to reach the supervision required for the health of the beings with busy work schedules and daily life. For example, American families spend upwards of forty billion dollars on childcare in a typical year, with more than half of American families with a child under the age of five paying for some amount of childcare. In another example, Americans spend upwards of one-hundred billion on pets in a given year with most of that spending going towards vets and boarding the pets.

However, existing systems for monitoring who exactly is supervising the beings in our lives; whether the supervised being is happy, healthy, and exercised; and/or whether they experienced a significant event (such as a bad fall) while with a caregiver or other supervisor are outdated. For example, caregivers often cannot adequately report to parents whether each child under their supervision experienced anything noteworthy each day, while those daily experiences can have formative impacts on the child's development. Meanwhile, the young child (e.g., infant/toddler) may be incapable of adequately reporting on their daily experiences themselves, especially with respect to their physical, emotional, and mental development. Similarly, it is difficult to understand which caregivers best provide an environment for positive physical, emotional, cognitive, and/or social development (or maintaining development) to the beings under their supervision even when we receive complete information. Further, it is even more difficult to understand how parents, legal guardians, caregivers, doctors, vets, and other supervising persons can change their behaviors to help avoid and/or correct underdevelopment, deterioration, and/or misdevelopment.

Figure 1:
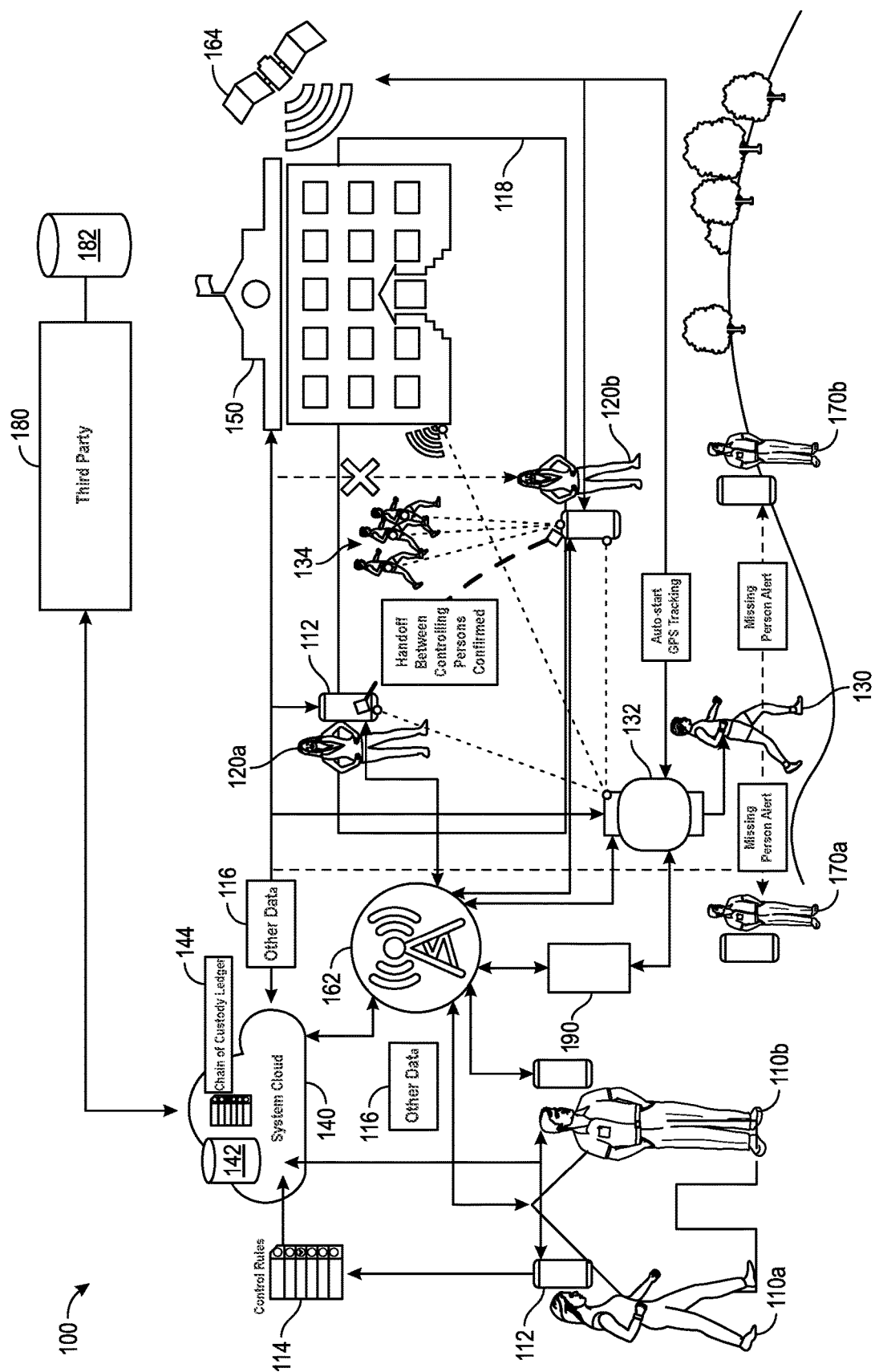
FIG. 1 is a schematic view of a system for monitoring a supervised being in accordance with some implementations of the present technology.

The drawings have not necessarily been drawn to scale. Similarly, some components and/or operations can be separated into different blocks or combined into a single block for the purpose of the discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

Overview

Systems and methods for aiding, supplementing, and/or increasing the monitoring capabilities of responsible persons over a supervised being are disclosed herein. In some implementations, the system includes one or more controlling persons (e.g., parents, guardians, owners, adult children, and the like), one or more supervising persons (e.g., childcare workers, elderly care workers, doctors, vets, animal sitters, animal care providers, and the like), one or more supervised beings (e.g., a toddler, elderly person, differently abled person, pet, livestock, and the like), and a cloud server (or other remote servers) in communication with each of the controlling persons, the supervising persons, and the supervised being. For example, each of the controlling persons and the supervising persons can have a personal electronic device (e.g., a smartphone, tablet, personal computer, personal assistant, wearable device, and the like); while the supervised being can have an associated electronic device (e.g., a wearable (or otherwise portable) electronic device, tethered device, smartphone, personal assistant, and the like). The electronic devices allow the controlling persons and the supervising persons (sometimes referred to collectively herein as "responsible persons") to actively communicate with one or more cloud servers to upload data related to the supervised being (e.g., medical history data, allergies, photos/videos, activity data, sleep data, data related to the current control over the supervised being (e.g., responsibility for the care and/or supervision of the supervised being), comments and instructions about care or instructions for the day (e.g., food preferences, supervisory care preferences), a specification of a daily routine, approved visitors for the supervised being, approved persons who can supervise the supervised being, approved timeframes for handoffs of the supervision of the supervised being, approved persons to pick up the supervised being, approved medications, approved dosages of medications, and the like) that is accessibly stored in the cloud server. In some implementations, the data is uploaded with a required security and/or permission level included. For example, medical data can be uploaded by and/or limited to viewers with a preset connection security level and/or a preset permissions level (e.g., allowing a parent to share medical data about their child with only a head childcare provider). Additionally, or alternatively, who can upload specific types of data can be limited by security and/or permission levels. For example, the permission levels can limit which controlling persons can upload information about supervision preferences.

Meanwhile, the supervised being's electronic device can include one or more sensors that measure bioindicators and/or other data related to the supervised being (e.g., heart rate, skin temperature, skin conductivity, movement, heart-rate variability, resting heart rate, sweat chemical composition, hydration levels, nervous system electrical signals, stress levels, air quality, UV exposure, environmental chemical exposures, environmental chemical sensitivity, environmental sound exposures, images of a surrounding environment, presence of other beings, blood oxygen and/or pulse oxygen, voice commands and/or other sounds, electrical activity of the heart, atmospheric pressure, pressure on the electronic device, orientation of the electronic device when worn by the supervised being, strength and direction of electromagnetic fields around the supervised being, and the like) and one or more communication components to communicate the bioindicators to the controlling persons and/or the supervising persons and/or directly to the cloud server(s). Once communicated out from the electronic device, the bioindicators and/or other data can be accessibly stored in the cloud server(s).

The being's electronic device is frequently discussed herein as a "wearable device." However, one of skill in the art will understand that the technology described herein is not so limited. For example, the electronic device can include smartphones and/or other portable electronic devices capable of one or more of the functions discussed herein. Furthermore, the electronic device can include various networked devices (e.g., virtual assistants, other hubs, internet of things (IoT) devices, and the like) in an environment. In a specific, non-limiting example, the electronic device can include a smart device positioned in an environment to help supervise a pet (e.g., a dog, cat, bird, reptile, fish, and the like) therein. In view of the alternatives discussed above, the term "wearable device" is to be understood to refer to a range of electronic devices except where explicitly requiring the device to be worn.

As a result of the interconnection and data storage, for example, the system allows parents to quickly communicate with the cloud server to check the health and/or mental status of their toddler, monitor the location of their toddler, define rules for the supervision of their toddler, check to ensure the rules for the supervision of their toddler are followed by the childcare providers, and/or review a chain of custody for their toddler in a given day. Accordingly, the system can provide parents with some peace of mind regarding the status of their toddler and/or allow parents to make more informed decisions about the childcare workers they entrust with the supervision of their toddlers.

In a specific, non-limiting example, the system can include two parents, a daycare service with multiple childcare providers, and one or more toddlers equipped with wearable (or otherwise portable) electronic devices. The parents can access the cloud server to set control rules for their toddler (mandatory rules, and/or suggested rules) to be followed by the daycare service, such as rules on where the toddler can be taken without additional permission, nutritional rules for any snacks provided by the daycare service, and rules on who can (and cannot) be left in control over of the toddler (e.g., trusted with supervision the toddler). The daycare service can then access the cloud server to review the rules, request any changes, and implement the control rules when in supervising of the toddler. Within this example system, the parents and daycare service can also follow a handoff procedure to update a chain of custody ledger with the cloud server. For example, when a first parent drops the child off at the daycare, the handoff can be reflected in the chain of custody ledger, allowing a second parent to see the updated supervision over the toddler. Further, when one of the childcare workers takes over for another, the shift in supervision can also be reflected in the chain of custody ledger, allowing the parents to quickly review who is currently supervising the toddler throughout the day.

Additionally, or alternatively, the wearable electronic device on the toddler can communicate updates on the physical, mental, and/or emotional status of the toddler throughout the day and/or the toddler's location. To do so, the wearable electronic device can communicate with an electronic device of any nearby responsible person (e.g., the electronic device of the childcare workers), a nearby beacon, one or more internet of things (IoT) devices in its vicinity, and/or directly to the cloud server (e.g., over an internet or cellular connection). The status updates can allow the toddler's parents to easily monitor the health and development of their child throughout the day, as well as the child's physical location. Further, the status updates can be timestamped, allowing the toddler's parents (and/or the system) to cross-reference significant events with which the childcare worker was supervising their toddler at the time. As a result, the parents can request additional information from that childcare worker, determine which childcare workers should (or should not) be trusted with the supervision of the toddler, and/or determine which childcare workers should (or should not) the toddler should spend time with. For example, a record indicating that the toddler was especially happy and/or mentally stimulated while under the supervision of a particular childcare worker can indicate that the toddler should spend additional time with that particular childcare worker. In an alternative example, a record indicating that the toddler was especially unhappy or experienced a significant event that is unaccounted for while under the supervision of a particular childcare worker may indicate that the particular childcare worker should not be trusted with the toddler.

In another specific non-limiting example, the system can include one or more pet owners, a pet sitter, one or more pets, and a cloud server. The one or more pets (e.g., dogs, cats, lizards and other reptiles, birds, fish, rabbits, horses, and like) can be associated with an electronic device, such as a wearable device (e.g., on a collar and/or otherwise attached to the pet), an IoT device (e.g., a virtual assistant) positioned in a control room for the pet, and the like. The pet owners can access the cloud server to set control rules for their pet(s) (mandatory rules and/or suggested rules) to be followed by the animal sitter, such as rules on where the pets can be taken without additional permission (e.g., on a walk while pet sitting, to use the restroom, and the like), nutritional rules for any snacks provided by the pet sitters (e.g., allergies, treat limits, and the like), and rules on who can (and cannot) be left in control over of the pet (e.g., approved sitters, non-approved sitters, company for the sitter, and the like). The pet sitter can then access the cloud server to review the rules, request any changes, and implement the control rules while in control of the pet(s).

Within this example system, the parents and/or pet sitter can also follow a handoff procedure to update a chain of custody ledger with the cloud server. For example, in a home-visit example, the pet owners can complete a first handoff at the beginning of the day to move the pet(s) from a first state (e.g., supervised by the pet owners) to a second state (e.g., unsupervised), and the first handoff can be reflected in the chain of custody ledger. When the pet sitter arrives, they can complete a second handoff to move the pet(s) from the second state to a third state (e.g., supervised by the pet sitter), and the second can be reflected in the chain of custody ledger. The update allows the pet owners to see that the pet sitter arrived and has control over the pet(s). When the pet sitter is ready to depart, they can initiate a third handoff to move the pet(s) from the third state back to the second state. The third handoff can be checked against control rules (e.g., a timeframe for the third handoff to confirm the pet sitter stayed for a pre-agreed amount of time). If approved, the third handoff can be recorded in the chain-of-custody ledger, allowing the pet owners to quickly review the state of the pet(s) and/or when the pet sitter arrived and departed. Alternatively, the pet sitters can initiate a fourth handoff to move the pet(s) from the third state to a fourth state (e.g., supervised by another pet sitter) and/or back to the first sitter (when the pet owner arrives). The fourth handoff can be checked against control rules (e.g., approved people for supervising the pet(s)). If approved, the fourth handoff can be recorded in the chain-of-custody ledger, allowing the pet owners to quickly review who currently has control over the pet(s).

Additionally, or alternatively, the electronic device(s) associated with the pet(s) can collect information related to the physical, mental, and/or emotional status of the pet(s) and/or the location of the pet(s) throughout the day. The electronic device(s) can then communicate the information to the cloud server to be recorded and/or accessible to the pet owner and/or pet sitter. In some implementations, the electronic device(s) can communicate with an electronic device of any nearby responsible person (e.g., the electronic device of the pet sitter) via a shortrange communication component, one or more internet of things (IoT) devices in its vicinity, and/or directly to the cloud server (e.g., over an internet or cellular connection). The information can allow the pet owner to easily monitor the health and location of their pet(s) throughout the day. Further, the information can be timestamped, allowing the pet owners (and/or the system) to cross-reference (or associate) significant events with a responsible person in control of the pet(s) at the time. As a result, for example, pet owners can determine which childcare workers should (or should not) be trusted with the supervision of the pet(s) and/or request that pet sitters provide more detailed information (e.g., why they took the pet away from a home while sitting). For example, a record indicating that the pet(s) were especially happy and/or mentally stimulated while under the supervision of a particular pet sitter can indicate that the pet(s) should spend additional time with that particular pet sitter. In an alternative example, a record indicating that the pet(s) were especially unhappy or experienced a significant event while under the supervision of a particular pet sitter may indicate that the particular pet sitter should not be trusted with the pet(s).

In some implementations of the present technology, the cloud server (or other remote servers) includes one or more components that automatically review the data (including data from the responsible persons and/or the wearable sensor) related to the supervised being. In doing so, the cloud server can generate a report on the physical, mental, and/or emotional health and/or development of the supervised being. For example, the cloud server can indicate when a toddler may be getting sick, may not have had enough sleep, etc. Additionally, or alternatively, the cloud server can generate recommendations to the responsible persons related to the physical, mental, and/or emotional health and/or development of the supervised being. For example, the cloud server can recommend additional cognitive activities to generate additional mental stimulation and development when detecting that a toddler has fallen behind predetermined milestones (e.g., the CDC-defined milestones for child development).

For ease of reference, components of the system are sometimes described herein with reference to top and bottom, upper and lower, upwards and downwards, and/or horizontal plane, x-y plane, vertical, or z-direction relative to the spatial orientation of the implementations shown in the figures. It is to be understood, however, that the components can be moved to, and used in, different spatial orientations without changing the structure and/or function of the disclosed implementations of the present technology.

Further, although primarily discussed herein as a system for use to supervise a toddler, one of skill in the art will understand that the scope of the technology is not so limited. For example, the systems and methods disclosed herein can also be used to aid and/or supplement the supervision of, and/or help monitor the control over, a baby, a child, an elderly person, a differently-abled person, and/or any other person that requires at least partial supervision over their daily activities. Additionally, or alternatively, the systems and methods disclosed herein can be used to aid and/or supplement the supervision of, and/or help monitor the control over, pets, livestock, and/or various other animals. Still further, one of skill in the art will understand that the systems and methods disclosed herein can be used to help monitor the control over luggage, packages, and/or any other suitable subject. Accordingly, the scope of the technology is not confined to any subset of implementations described herein.

Systems of the Present Technology

FIG. 1 is a schematic view of a system 100 for monitoring a supervised being 130 in accordance with some implementations of the present technology. The system 100 interconnects one or more controlling persons with one or more supervising persons to share the supervision of a supervised being 130 (e.g., a baby, toddler, child, elderly person, differently-abled person, and/or any other person requiring supervision). The illustrated implementation includes two controlling persons 110, referred to individually as a "first controlling person 110$a$" and a "second controlling person 110$b$." In various implementations, the first and second controlling persons 110$a$, 110$b$ can be a first parent, godparent, grandparent, older sibling, any legal guardian, an adult providing care to an elderly family member, an adult providing care to another elderly person, and/or any other suitable person that exercises a degree of control over the supervised being's daily activities and/or overall well-being. Further, in various implementations, the system 100 can include fewer, or additional, controlling persons 110. For example, the system 100 can include two parents and an older sibling; a single parent; or multiple siblings that share caregiving responsibilities for an elderly parent.

The illustrated implementation also includes one or more supervising persons 120 (two shown, referred to individually as a "first supervising person 120$a$" and a "second supervising person 120$b$"). In various implementations, the first and second supervising persons 120$a$, 120$b$ can be various caregivers (e.g., a child care worker (such as a daycare worker, nursery worker, nanny, or babysitter), a family caregiver, a home health caregiver, an assisted living nurse or any other nursing practitioner, and the like), a preschool or elementary school teacher, various other school officials, and/or any other suitable person responsible for the supervised being 130. Further, in the illustrated implementation, the supervising persons 120 are also responsible for one or more additional supervised beings 134. For example, when the supervising persons 120 are a part of a daycare provider, the additional supervised beings 134 can be the other toddlers and/or children entrusted to the daycare.

As further illustrated in FIG. 1, the system 100 connects each of the controlling persons 110 and the supervising persons 120 (e.g., the responsible persons) to a remote server 140 (e.g., a cloud server and/or any other suitable remote server). In the illustrated implementation, each of the responsible persons is interconnected to the system 100 through one or more electronic devices 112 (e.g., a smartphone, tablet, personal computer, personal assistant, wearable device, IoT device, AR/VR device, and the like). For example, each of the electronic devices 112 can communicate via shortrange wireless components (e.g., Bluetooth® components and the like), internet communication components that connect to a wireless or wired network (e.g., the internet), and/or cellular components that connect to a cellular network 162. The communication can help the responsible persons maintain a record of the control over of the supervised being 130 within the system; coordinate regarding basic needs for the supervised being 130; coordinate regarding physical, mental, and/or an emotional status of the supervised being 130; and/or communicate any other suitable information. The actions of the responsible persons in the system 100 can be performed through one or more user interfaces and/or modules on the electronic devices 112. Accordingly, one of skill in the art will understand that, as used herein, the actions of the responsible persons with respect to the system 100 can be performed through the electronic devices 112 (e.g., through various subsystems 300, 400 thereon, discussed in more detail below), unless otherwise indicated.

For example, the controlling persons 110 can upload, edit, and/or update a set of control rules 114 that are stored within the remote server 140, and the control rules 114 can then be accessed by a supervising person 120 to ensure appropriate supervision of the supervised being 130. In various implementations, the control rules 114 include rules for how much supervision must be given to the supervised being 130 (e.g., constant supervision, whether semi-supervised playtime is allowed, and the like); who is permitted to supervise the supervised being 130 (e.g., when supervision must be maintained by a particular caregiver or set of caregivers rather than handed off); what activities the supervised being 130 can engage in such as types of play, field trips, sports, movie and television watching controls, and the like; what activities the supervised being 130 must engage in such as a daily nap, daily exercise, learning activities, and the like; a preferred and/or required schedule and/or routine for the supervised being 130; what foods the supervised being 130 can consume and/or cannot consume; a predefined geographic location for the supervision of the supervised being 130; geographical limits to field trips, errands, and/or any other deviations from where the supervised being is dropped off; rules for proscribed medical care, such as a preferred hospital, pediatrician, authorized medications (e.g., Advil®, Tylenol®, and the like and/or authorized dosages of medications; authorized visitors for the supervised being 130; authorized persons to receive the supervised being 130 (e.g., a parent can specific that a grandparent, godparent, and/or older sibling can pick up their child from daycare); and/or various other suitable rules related to the supervision of the supervised being 130. In some implementations, the system 100 includes tiers of control between the first and second controlling persons 110$a$, 110$b$. For example, the first controlling person 110a can have more power in setting and/or adjusting the control rules 114 than the second controlling person 110b (e.g., allowing parents to exercise more control than an older sibling).

The control rules 114 can also include information related to the supervision of the supervised being 130, such as known allergies, known medical conditions, medical history information, known behavioral patterns, recent developments or updates, and/or various other data that impacts the supervision of the supervised being 130. Non-limiting examples of medical history information can include information on vaccinations, family medical history, diagnoses specific to the supervised being, past medical events such as surgeries, illnesses, and/or major medical events (e.g., seizures). Non-limiting examples of recent developments or updates include recent diagnoses, broken bones and/or other physical trauma, recently experienced mental and/or emotional trauma such as the loss of a family member, cognitive and/or behavioral developments such as learning to use the restroom for toddlers and loss of memory in adults, and the like.

Additionally, or alternatively, each of the responsible persons can upload, edit, update, and/or review developmental data related to the supervised being 130, such as data about their daily activities, evaluations of interactions with the supervised being, evaluations of their developmental status, achieved milestones, and the like. For example, each of the responsible persons can upload data related to the daily activities of the supervised being 130 such as reports on physical and/or cognitive exercise, estimated sleep during naps and/or overnight, nutritional intakes, eating and/or sleeping patterns (e.g., when the supervised being 130 tends to nap and/or be hungry), an assessment of various cognitive elements (e.g., ability to learn, participate in class, attention span, memory, comprehension of text, and the like) a mood of supervised being, reports on injuries and/or stress events, reports on medication administrated to the supervised being, and/or any other suitable information about the daily activities of the supervised being 130.

Additionally, or alternatively, as the responsible persons complete actions and/or communicate through the system 100, their actions and/or communications can be routed through and/or relayed to the remote server 140. Further, as illustrated in FIG. 1, the remote server 140 includes one or more databases 142 (one shown) that can store a record of the control rules 114, various communications between the responsible persons, developmental data contained in communications, other data related to the supervised being 130 (e.g., medical history data, allergies, background data, food preferences and/or permissions, supervisory care instructions, and the like), a record of the control over the supervised being 130 (e.g., responsibility for providing care to and/or supervising the supervised being 130), and/or any other suitable information. Further, in some implementations, the remote server 140 maintains a secure ledger with any of the information discussed above. For example, in the illustrated implementation, a record of any handoffs can be recorded in a chain of custody ledger 144 ("ledger 144") that is stored on and accessed through the remote server 140. The ledger 144 can maintain a complete record of who was responsible for the supervised being 130 throughout a day in a secure, unalterable manner. Accordingly, for example, the ledger 144 allows a parent to review the supervision of their toddler when the toddler indicates that they had a particularly good or bad day. Additional details on the handoff functions of the system 100 are discussed below, especially in reference to FIG. 5.

As further illustrated in FIG. 1, the responsible persons can communicate with the remote server 140 to create, edit, receive, and/or download other data 116. The other data 116 communicated to the remote server 140 include pictures/videos/audios of the supervised being 130, reports on events related to the supervised being 130, reviews of supervising persons 120, other information related to the supervision of the supervised being 130, indications of deviations from a daily routine (e.g., that the supervised being 130 missed a nap or had some additional meal), and/or other information related to the daily activities of the supervised being 130. In some implementations, the other data 116 can also be supplemented by reports from an electronic device 132 associated with the supervised being 130 (e.g., a wearable device, personal electronic device, IoT device, virtual assistant hub, beacon, and the like).

In the illustrated implementation, the electronic device 132 can communicate data to the electronic devices 112 and/or directly the remote server 140 through any suitable network connection. To do so, as described in more detail below, the electronic device 132 can include a shortrange wireless communication component, an internet communication component, and/or a cellular component. Further, to collect the data, the electronic device 132 can include one or more sensors that collect bioindicator data that helps monitor the health and mental status of the supervised being 130, such as skin temperature sensors, photoplethysmogram (PPG) sensors, accelerometers, skin conductivity sensors, heart-rate variability sensors, resting heart rate sensors, sweat chemical composition sensors, nervous system electrical sensors, air quality sensors, UV exposure sensors, sensors to detect environmental chemicals, blood oxygen and/or pulse oxygen sensors, voice recognition, electrocardiogram (ECG) sensor, pressure sensors, gyroscopes, magnetometers, and the like. Additionally, or alternatively, can include one or more sensors that record an environment around the supervised being, such as microphones or other audio devices, imaging devices (e.g., one or more digital cameras, infrared cameras, 3D scanners, and the like), temperature sensors, motion detectors, and the like. The bioindicator and/or other data other data from the sensors (referred to collectively herein as "recorded data") from the sensors can be continuously and/or periodically communicated throughout the system 100. For example, the electronic device 132 can communicate updates to the electronic device 112 of any responsible person whenever their electronic devices 112 are within range of the shortrange wireless communication component; to the remote server 140 through the internet when a wireless connection is available; and/or to the remote server 140 through the cellular network 162 whenever the shortrange and internet options are unavailable. The recorded data can then be relayed to the controlling persons 110 so they can monitor the physical, emotional, and/or mental condition of the supervised being 130. Additionally, or alternatively, recorded the data can be processed and/or mined by one or more modules on the remote server 140 to assist the controlling persons 110 with monitoring the physical, emotional, and/or mental condition of the supervised being 130.

For example, the cloud server 140 can use the developmental data and the recorded data (referred to collectively as "target data") to generate one or more predictive models specific to a particular supervised being 130 and/or applicable to supervised beings overall. The predictive models can be used to evaluate target data identify a current physical, emotional, cognitive, and/or social developmental status (also referred to collectively herein as the "developmental status") for a supervised being, predict the impact various changes will have on the developmental status for the supervised being, and/or generate recommendations for changes to intentionally impact the developmental status for the supervised being in a desired way.

The specific predictive models can also be customized to a specific supervised being, for example, by accounting for their typical reactions to changes (e.g., whether they are more or less sensitive to changes) to more accurately identify how activities and/or actions will impact the developmental status of the particular supervised being. The general predictive models can be used to help identify broad trends in the impact of various activities and/or actions on the developmental status of supervised beings (e.g., to assess how various levels of exercise generally impact the developmental status of toddlers), to identify previously unrecognized correlations that may indicate some causal relation, and/or to make broad recommendations for activities and/or actions to intentionally impact the developmental status of supervised beings. Further, the general predictive models can be used to assess the developmental status of a new supervised being in the system given a small amount of target data on the new supervised being.

In some implementations, the electronic device 132 can process the recorded data, before sending the update related to the recorded data, to better monitor the physical, emotional, and/or mental condition of the supervised being 130. For example, the electronic device 132 can process the bioindicator data to detect emotional, cognitive, and/or physical developments and/or events (e.g., a high-stress event) and send the update in response to the detected event. In another example, the electronic device 132 can process environmental data to identify emotional, cognitive, and/or physical developments and/or potential causes events (e.g., causes of a high-stress event can include a detected crash and/or injury, loud sounds, a presence of another person and/or animal, and the like) and send an update related to the processed data.

The electronic device 132 can also include a global positioning system (GPS) component that communicates with one or more GPS satellites 164 to track the location and/or movement of the supervised being 130. The GPS component allows one or more responsible persons to define a geofence boundary 118 to aid in monitoring the supervised being 130. For example, the geofence boundary 118 can surround the perimeter of a playground associated with a daycare or school. If the supervised being 130 exits the geofence boundary 118 without a suitable explanation, the system 100 can send an alert to any of the responsible persons. Additional details on the geofencing aspects of the system 100 are discussed below, especially in reference to FIG. 6.

In some implementations, one or more of the additional supervised beings 134 are also wearing a electronic device 132, connecting them to the supervising persons 120 and their own respective controlling person(s) (not shown). In some implementations, the geofencing features discussed above can be implemented broadly for each of the supervised beings 130, 134. For example, the supervising persons 120 can define the geofence boundary 118 as broadly applying to each of the supervised beings 130, 134 at a single time (e.g., while children are at recess), such that if any of the supervised beings 130, 134 break the geofence boundary the supervising persons 120 are alerted. Similarly, in some implementations, one or more control rules 114 are be set for each of the supervised beings 130, 134 broadly.

In the implementation illustrated in FIG. 1, the supervising persons 120 are members of an associated caregiving facility 150, such as a contracting school, daycare or other childcare facilities, assisted living facility, nursing center, and/or any other suitable entity. In some implementations, the caregiving facility 150 includes features that assist communication throughout the system 100 (e.g., various IoT-enabled devices, beacons, WiFi hotspots, sensors, and the like) dispersed throughout the caregiving facility 150. Further, in some implementations, the caregiving facility 150 includes a set of supervising persons 120 that have an organizational hierarchy and/or sub-divisions for supervising groups of one or more the supervised beings 130.

For example, the first supervising person 120a can define control rules 114 applying to the supervised beings 130, 134 that the second supervising person 120b can review and follow. In some implementations, the control rules 114 defined by the first supervising person 120a must be within a tolerance of the control rules 114 defined for each of the supervised beings 130, 134 individually (e.g., by their respective controlling persons). To provide a specific example, the controlling persons of each of the supervised beings 130, 134 may indicate that the supervised beings 130, 134 are not to leave a specific facility (e.g., a daycare facility) without their permission. In turn, the first supervising person 120a can indicate that the second supervising person 120b cannot remove the supervised beings 130, 134 from a specific room within the facility without the permission of the first supervising person 120a.

As further illustrated in FIG. 1, the system 100 can also connect with one or more third parties 180 (one shown), each having its own database 182 to store information related to the developmental status of the supervised being 130 and/or the additional supervised beings 134. In some implementations, the remote server 140 can share some, or all, of the target data with the third parties 180. The third parties 180 can then study the target data to, for example, identify general trends in development for supervised beings based on their experiences, bioindicators, and/or daily routines. Additionally, or alternatively, the third parties 180 can mine the target data to generate predictive models (both specific and general) for supervised beings. Once generated, the third parties 180 can communicate the predictive models back to the cloud server 140, which can then use the predictive models in one or more modules accessible by the responsible persons. Like the predictive models generated by the cloud server 140, the predictive models generated by the third parties 180 can be used to identify a current developmental status of the supervised being 130 (or any of the additional supervised beings 134); predict how various changes will impact the developmental status of the supervised being 130; and/or make recommendations for changes to intentionally impact the developmental status of the supervised being 130.

By collecting and linking recorded data with data from the supervised beings, as well as collecting the target data in bulk, the system 100 is expected to greatly improve the accuracy of predictive models used to assess the current developmental status of supervised beings and make decisions about changes to the supervised beings' lives. For example, by closely monitoring the bioindicators of a child alongside assessments of the child, the system 100 is expected to generate more accurate predictive models for physical, emotional, cognitive, and/or social development in children. In another example, by closely monitoring the bioindicators of an elderly person alongside assessments of the elderly person, the system 100 is expected to generate more accurate predictive models that allow for early detection of various illnesses that cause a decline and/or early intervention against the illnesses. Further, the system 100 is expected to provide a non-invasive point of entry for academic research into human development, together with checks that help ensure the data from the system is accurate (e.g., checks between evaluations of the supervised being and their bioindicator data).

As further illustrated in FIG. 1, the system 100 can also include a connection to one or more additional persons 170 (two shown, labeled 170a and 170b). The additional persons 170 can be alerted by a variety of functions in the system to search for the supervised being 130, check on the supervised being 130, rescue the supervised being 130, and the like. Purely by way of example, when the supervised being 130 breaches a geofence boundary, the responsible persons can be alerted to the breach. Any of the responsible persons can then instruct the system 100 to notify additional persons 170 that the supervised being 130 needs to be located. In various specific, non-limiting examples, the additional persons 170 can be emergency responders (e.g., security officers, police officers, fire departments, neighborhood watch, and the like), other parents or guardians on the system 100, other supervising persons on the system 100, and the like. The notification of the additional persons 170 can help locate the supervised being 130 quickly to resolve the breach. In another example, when the supervised being 130 presses a panic button on the electronic device 132, the system 100 can respond by alerting the additional persons 170 to check on and/or rescue the supervised being 130. In yet another example, when the recorded data for a supervised being 130 indicates prolonged and/or recurring periods of stress, the system 100 can alert additional persons 170 (e.g., child services, animal services, and the like) to check on the supervised being 130.

As still further illustrated in FIG. 1, the system 100 can also include one or more field-deployed beacons 190 (one illustrated schematically in FIG. 1). The field-deployed beacons 190 ("beacons 190") can connect to the cellular network 162 and the electronic device 132 of the supervised being 130. The beacons 190 can act as an intermediate point to communicate data from the electronic device 132 to the remote server 140 (e.g., allowing the electronic device 132 to use a shortrange communication component instead of a network and/or cellular communication component) and/or can help monitor a location of the supervised being 130. In a specific, non-limiting example, the beacons 190 can help monitor a location and/or status of livestock in a dispersed grazing environment. When the livestock walk past one of the beacons 190, the beacon 190 can receive an update from the electronic device 132, record a time and date of the interaction to help track movement of the livestock, and the like. In another specific, non-limiting example, the beacons 190 can help monitor a location and/or status of elderly persons in a semi-autonomous assisted living community. As an elderly person moves throughout the community, their location can be relatively tracked by check-ins with the beacons 190, allowing the community to better locate an elderly person when needed (e.g., when they are late for a check up).

Figure 2:
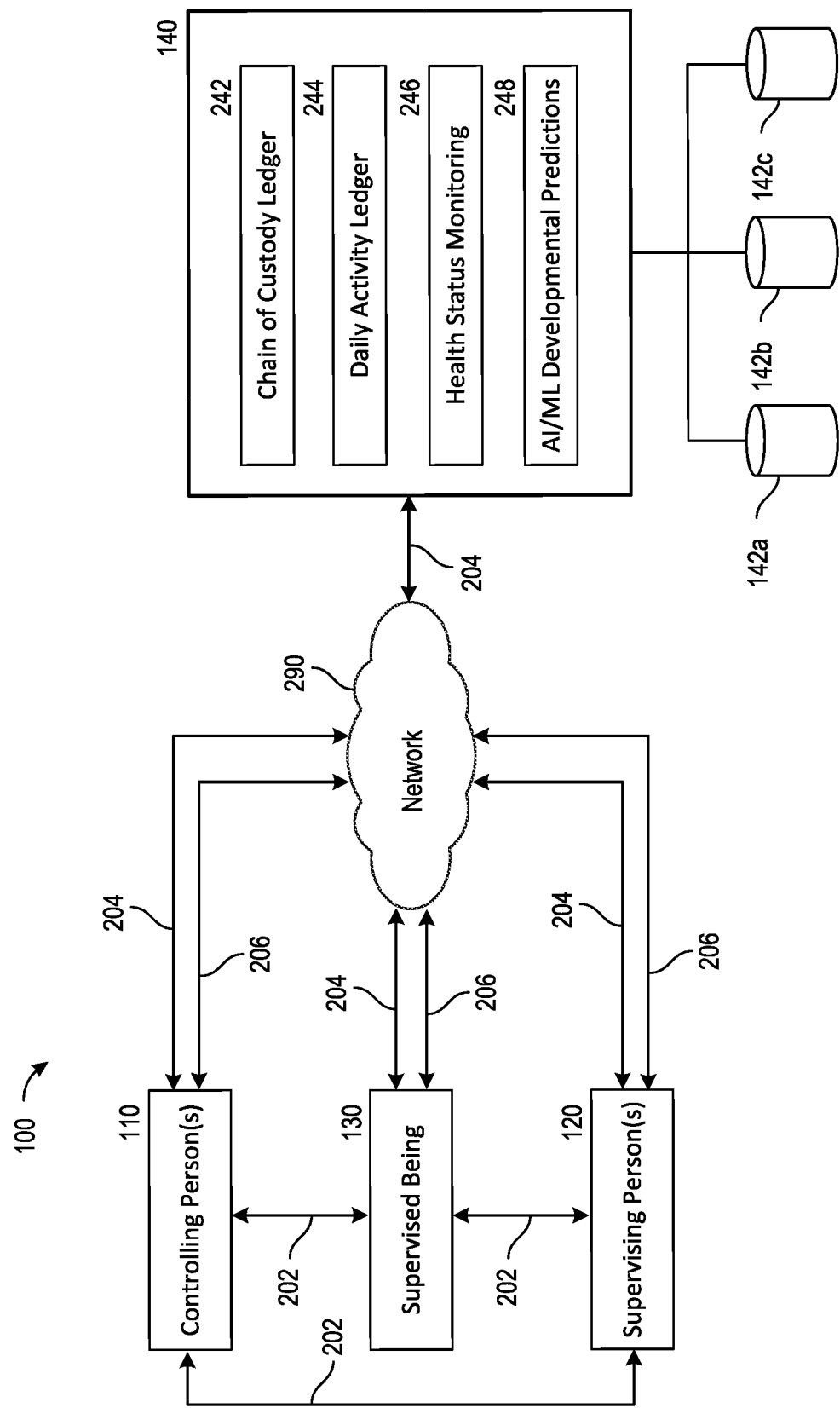
FIG. 2 is a network diagram of the system for monitoring a supervised being in accordance with some implementations of the present technology.

FIG. 2 is a network diagram of the system 100 for monitoring the supervised being 130 in accordance with some implementations of the present technology. As illustrated in FIG. 2, each of the controlling persons 110, the supervising persons 120, and the supervised being 130 can have shortrange communication channels 202 therebetween. As discussed above, the shortrange communication channels 202 can be established over any suitable shortrange wireless standard (e.g., Bluetooth®, Zigbee®, Z-Wave®, Wi-Fi HaLow®, or any other suitable shortrange standard). The shortrange communication channels 202 allow the controlling persons 110, the supervising persons 120, and the supervised being 130 to communicate locally via a relatively low-energy, secure standard. However, the controlling persons 110, the supervising persons 120, and the supervised being 130 are not always within range of each to establish the shortrange communication channels 202. Accordingly, as further illustrated in FIG. 2, each of the controlling persons 110, the supervising persons 120, and the supervised being 130 can also communicate with a network 290 (e.g., an internet network, a cellular network, and so on). To do so, each of the controlling persons 110, the supervising persons 120, and the supervised being 130 can establish an internet communication channel 204 (e.g., a WNIC connecting to WiFi) and/or a cellular communication channel 206.

As further illustrated in FIG. 2, the network 290 is connected to the remote server 140 through an internet communication channel 204. Accordingly, the remote server 140 can communicate with each of the controlling persons 110, the supervising persons 120, and the supervised being 130 over the network, for example to receive data, control rules, and/or facilitate any of the supervisory monitoring actions discussed above (e.g., to activate a geofence boundary). In the illustrated implementation, the remote server 140 includes three databases 142a-142c to store the data, control rules, and/or any relevant communications. For example, in the illustrated implementation, the remote server 140 includes four modules (referred to individually as first-fourth modules 242-248) that can be stored in the databases 142a-142c and executed in response to various activities in the system 100 (e.g., in response to a request from a controlling person 110).

In the first module 242, the remote server 140 maintains a chain of custody ledger that reflects the control over the supervised being. When one responsible person hands-off control (e.g., responsibility for the supervised being) to another responsible person, the change in control over the supervised being is reflected in the chain of custody ledger. For example, when a first parent drops their toddler off for daycare, the parent and the daycare can execute a handoff that is recorded in the chain of custody ledger. Any responsible party (e.g., a second parent) with access to the chain of custody ledger can then see that the daycare is responsible for the toddler. Later, the second parent can pick-up the toddler from daycare and execute another handoff while doing so, and the change in control over the supervised being is reflected in the chain of custody ledger. Afterwards, the first parent can view the change in control through the chain of custody ledger to, for example, confirm the second parent picked-up the toddler. In another example, the chain of custody ledger can be specific to the daycare worker, thereby allowing either of the parents to review which daycare worker is currently responsible for the toddler. The specificity of the chain of custody ledger can, for example, allow the parents to determine which daycare worker was responsible for a toddler when the toddler expresses they had a particularly good or bad day; allows the parents to more quickly locate their child in an emergency; and/or allows the parents to ensure control rules are being followed by the daycare.

In some implementations, the first module 242 includes a process for alerting responsible persons when the chain of custody is broken by an indication that the supervised being 130 is too far away from the person indicated to be currently responsible. In various implementations, the range indicating the chain of custody is broken can be set by the distance for shortrange communications between the supervised being 130 and the responsible person, whether the supervised being 130 and the responsible person are connected to the same network (e.g., connected to the same WiFi), whether the supervised being 130 is still present within a set geofence boundary, a predetermined distance measured using a GPS location of each of the supervised being 130 and the responsible person, and/or any other suitable metric. In some implementations, the first module 242 can include a time-out feature that requires the chain of custody to be broken for more than a predetermined period of time before taking any further action. The predetermined time can be 30 seconds, 60 seconds, 2 minutes, 5 minutes, or any other suitable period. The time out function allows, for example, the responsible person to use the restroom without triggering a break in the chain of custody. Once the chain of custody is broken, the first module 242 can begin recording the GPS location and/or cellular connection of the supervised being 130 and alert the last responsible person in the record of the chain of custody. In some implementations, the first module 242 also alerts the controlling person(s) 110 each time the chain of custody is broken. In some implementations, the first module 242 provides time for an explanation from the last responsible person before alerting the controlling person(s) 110 (e.g., that a handoff occurred and was not properly recorded), record any explanation for later review by the controlling person(s) 110, and/or alert the controlling person(s) 110 after a predetermined amount of time if no explanation is received. In some implementations, the first module 242 also alerts one or more additional persons (e.g., other supervising persons associated with the supervised being 130, other supervising persons and/or controlling persons connected to the network 290 (e.g., other parents) and/or in the vicinity of the supervised being 130, and/or emergency services).

The first module 242 can include a process for alerting responsible persons when the chain of custody is broken by an unrecorded handoff. Purely by way of example, an unrecorded handoff can occur when a controlling person 110 (e.g., a parent) picks up the supervised being 130 (e.g., a toddler) without properly executing the handoff process (e.g., picks up the toddler in a rush). The remote server 140 can detect the break in the chain of custody, for example, when updates from the supervised being 130 are received from a new responsible person (e.g., the controlling person 110) and not the currently responsible person (e.g., the supervising person 120), indicating a shift in who is in the vicinity of the supervised being 130. Once the break in the chain of custody is detected, the first module 242 can include a process for rectifying the chain of custody. Purely by way of example, the first module 242 can require a controlling person 110 with a predetermined level of authorization (e.g., separating parents from older siblings) to approve the currently responsible person and execute a handoff to the currently responsible person on the backend.

In the second module 244, the remote server 140 maintains a record of the daily activity of the supervised being. The record can be updated with data from any of the responsible persons. For example, a parent can update the record of the daily activity to indicate that the supervised being did not sleep well the night before and has been ornery in the morning to help explain poor behavior to other responsible persons. Additionally, or alternatively, the record can be updated with data from the electronic device 132 (FIG. 1), such as bioindicators from the one or more onboard sensors. Accordingly, the record can include an indication of how much exercise the supervised being 130 got during a day, their general health throughout the day, and/or their mood throughout the day. The record can then be accessed by one or more responsible persons (e.g., the controlling persons 110) to monitor the daily physical, mental, and emotional activity of the supervised being 130. Additionally, or alternatively, the record can be accessed by one or more other modules in the remote server 140 to automatically monitor the physical, mental, and emotional activity of supervised being 130.

For example, in the third module 246, the remote server 140 can automatically monitor the health of the supervised being 130 using the record of the daily activity. For example, the remote server 140 can determine when the bioindicators suggest that the supervised being 130 is sick, is overexercised for a period (e.g., a day, week, month, or any other suitable period), is under exercised in the period, has not gotten an appropriate amount of sleep, has experienced a significant mental or emotional event, and the like. Once detected, the remote server 140 can notify the relevant responsible persons of the detected event. In some implementations, the remote server 140 can determine a current medical status of the supervised being 130 from the bioindicators, including when they are healthy and/or have completely normal bioindicators, and make the medical status available to any of the responsible persons. The continuous medical status can provide some piece of mind to the responsible persons regarding the health of the supervised being 130, can help a responsible person make determinations on supervising activities (e.g., whether the supervised being 130 needs an additional nap or additional exercise), and/or can help a responsible person detect a deviation before it happens (e.g., detecting a cold early on). In some implementations, the third module 246 includes predetermined and/or preset alerts that send a notification to a responsible person when a specific health-related event is detected. For example, the controlling persons 110 can be notified when a significant emotional and/or mental event is indicated by the bioindicators, allowing the controlling persons 110 to adequately address the event with the supervised being 130.

In the fourth module 248, the remote server 140 can execute one or more artificial intelligence and/or machine learning (AI/ML) algorithms to review the physical, emotional, and/or mental development of the supervised being 130. For example, the AI/ML algorithms can use the data from the electronic device 132 (FIG. 1) to study the bioindicators for the supervised being 130, evaluate their physical, emotional, and/or mental development, and/or make recommendations to the responsible persons regarding the same. In some implementations, the recommendations include an indication that the supervised being 130 would benefit from additional exercise, additional social interaction, and/or to additional mental stimulation. Additionally, or alternatively, the recommendations can include updates to the nutritional intake of the supervised being 130, suggestions for maintaining better hydration of the supervised being 130, conforming naps and bedtimes to observed sleep patterns for the supervised being 130 decision support articles at important developmental milestones for the supervised being 130, an identification of recurring stressful events for the supervised being 130 and recommendations for addressing the stressful events and/or communicating with the supervised being 130 about the stressful events, and the like. In some implementations, the recommendations include articles on developmental related topics specific to the supervised being 130. For example, the AI/ML algorithms may determine that the supervised being 130 (e.g., a toddler) does not sleep well and recommend articles on improving the sleep of toddlers to the responsible persons.

Examples of the artificial intelligence algorithms include, but are not limited to, case-based reasoning, rule-based systems, artificial neural networks, decision trees, support vector machines, regression analysis, Bayesian networks (e.g., naïve Bayes classifiers), genetic algorithms, cellular automata, fuzzy logic systems, multi-agent systems, swarm intelligence, data mining, machine learning (e.g., supervised learning, unsupervised learning, reinforcement learning), and hybrid systems. Further various machine learning algorithms and techniques are suitable for use with the present technology. In some implementations, the machine learning model is initially trained on a training data set, which is a set of examples used to fit the parameters (e.g., weights of connections between "neurons" in artificial neural networks) of the model. For example, the training data set can include a number of suitable reference sets associated with other supervised beings (e.g., data associated with other toddlers) that are stored in one of the databases 142a-142c.

In some implementations, the machine learning model (e.g., a neural network or a naïve Bayes classifier) may be trained on the training data set using a supervised learning method (e.g., gradient descent or stochastic gradient descent). The training dataset can include pairs of generated "input vectors" with the associated corresponding "answer vector" (commonly denoted as the target). The current model is run with the training data set and produces a result, which is then compared with the target, for each input vector in the training data set. Based on the result of the comparison and the specific learning algorithm being used, the parameters of the model are adjusted. The model fitting can include both variable selection and parameter estimation. The fitted model can be used to predict the responses for the observations in a second data set called the validation data set. The validation data set can provide an unbiased evaluation of a model fit on the training data set while tuning the model parameters. Validation data sets can be used for regularization by early stopping, e.g., by stopping training when the error on the validation data set increases, as this may be a sign of overfitting to the training data set. In some implementations, the error of the validation data set error can fluctuate during training, such that ad-hoc rules may be used to decide when overfitting has truly begun. Finally, a test data set can be used to provide an unbiased evaluation of a final model fit on the training data set.

Example Systems and Methods Related to the Responsible Persons

Figure 3:
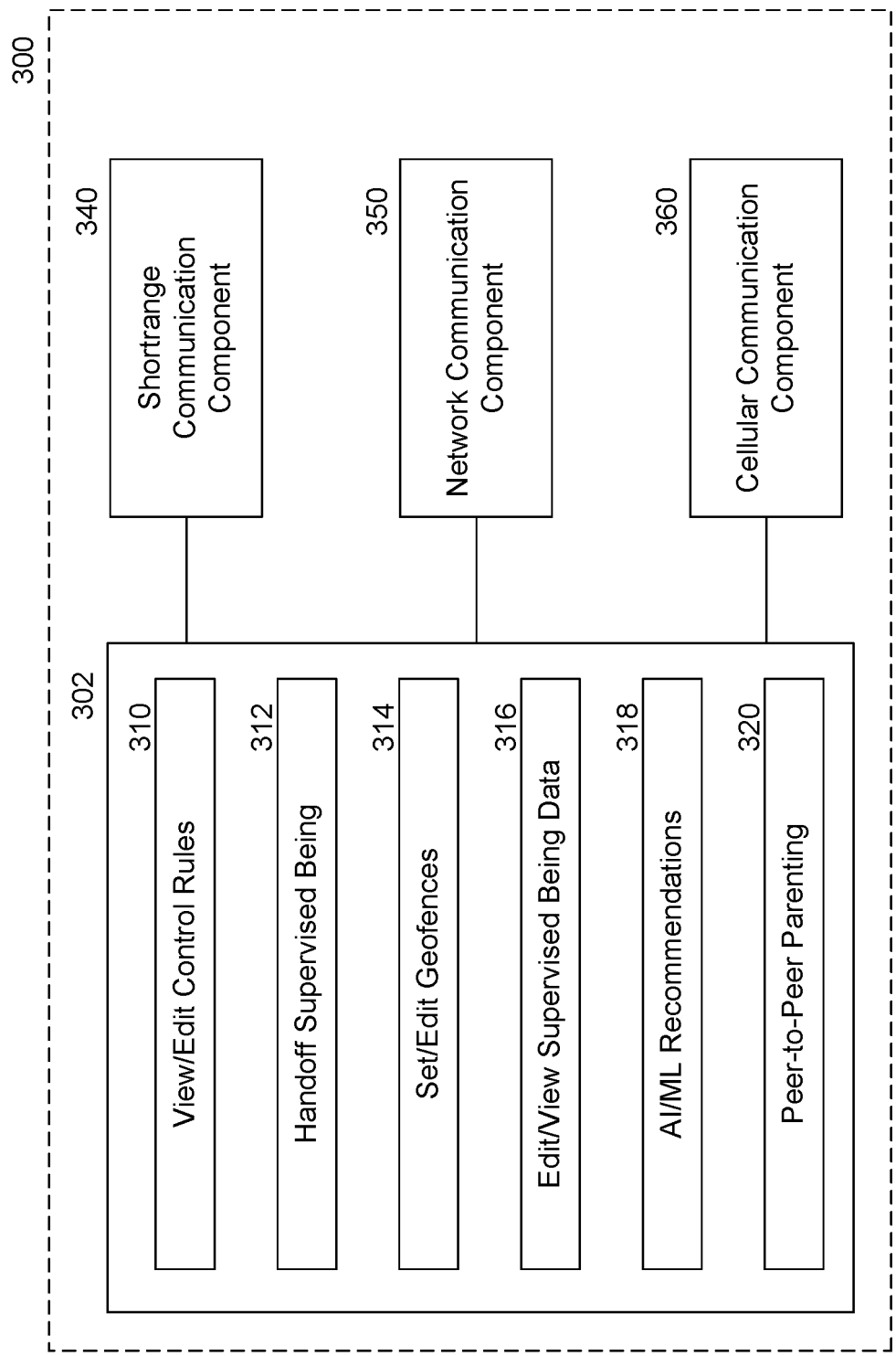
FIG. 3 is a schematic diagram of a platform for a controlling person in the system for monitoring a supervised being in accordance with some implementations of the present technology.

FIG. 3 is a schematic diagram of a subsystem 300 associated with a controlling person in a system for monitoring a supervised being in accordance with some implementations of the present technology. The subsystem 300 can be deployed in the electronic device 112 discussed above with respect to the system 100 of FIG. 1. A processor and/or a storage component are not illustrated in FIG. 3 to avoid obscuring the illustrated components of the subsystem 300. However, one of skill in the art will understand that the subsystem 300 can include one or more processors and any suitable number of storage components to facilitate operation of the subsystem 300 as described herein.

As illustrated in FIG. 3, the subsystem 300 includes an operating platform 302 ("platform 302") with one or more modules (six shown, referred to individually as first-sixth modules 310-320), a shortrange communication component 340, an internet communication component 350, and a cellular communication component 360. The shortrange communication component 340 can communicate over a shortrange wireless standard (e.g., a Bluetooth®, Zigbee®, Z-Wave®, Wi-Fi HaLow®, or any other suitable shortrange standard) to enable the subsystem 300 to communicate directly with other subsystems and devices that are within a local communication range. The internet communication component 350 enables the subsystem 300 to communicate with a network (e.g., the network 290 discussed above with respect to FIG. 2) over a wireless (or wired) internet connection (e.g., a WiFi connection or ethernet connection), allowing the subsystem 300 to connect with other subsystems and devices also connected to the network. Similarly, the cellular communication component 360 enables the subsystem 300 to communicate with the network through a cellular internet connection (e.g., based on a 3G, 4G, LTE, 5G, 6G, or other standard). The platform 302 is operably coupled to each of the shortrange communication component 340, the internet communication component 350, and the cellular communication component 360. Accordingly, any of the modules in the platform 302 can communicate with other subsystems and devices locally and/or over the network. Various examples of the modules are discussed in more detail below.

In the first module 310, a controlling person can set, review, update, and/or edit the control rules related to the supervised being. In some implementations, the first module 310 includes a number of preset prompts for common control rules (e.g., required naptimes per day, nutritional rules, rules related to where the supervised being can be taken without additional permission, rules related to who can be responsible for the supervised being, and the like). The preset prompts can help a controlling person quickly set the control rules as well as help establish a common set of rule types for controlling persons and supervising persons to be aware of. The first module 310 can also include space for custom and/or non-prompted control rules to be entered. The custom and/or non-prompted control rules allow the control rules to be flexible to independent requests from the controlling person and/or the individual needs of the supervised being.

In the second module 312, the controlling person can handoff the control over the supervised being from a controlling person to (and from) a supervising person and/or another controlling person. Various examples of the process for handing off control are discussed in more detail below with respect to FIG. 5.

In the third module 314, the controlling person can set, edit, and/or remove geofence boundaries. In various implementations, the geofence boundaries can be set by drawing a perimeter on a map within a user interface on the subsystem 300, selecting one or more areas within a map with predefined boundaries (e.g., selecting a public park), selecting one or more saved geofence areas, placing and registering one or more waypoints and/or beacons that define the geofence boundary, and/or any other suitable mechanism. Once set, the geofence boundaries can help monitor the supervised being to ensure they remain within the geofence boundary. Various examples of the process for alerting the controlling person (and/or the supervising person) are discussed in more detail below with respect to FIG. 6. When the geofence boundary is no longer needed, the controlling person can then use the third module 314 to remove the geofence boundary.

In the fourth module 316, the controlling person can edit and/or view data related to the supervised being. For example, the fourth module 316 can allow the controlling person to review data from any of the sensors on the electronic device 132 (FIG. 1), as well as any information that the remote server 140 has generated and/or collected based on the sensor data (e.g., information related to estimated child development based on the sensor data). The fourth module 316 can also allow the controlling person to review data uploaded by any other controlling person and/or any of the supervising persons, such as information related to an event such as a breach of the geofence, an injury from an accident (e.g., indicating that the supervised being fell during a recess and received a scrape), a tantrum or other emotional event, and/or any other suitable event. The data uploaded by another controlling person and/or supervising person can also include medical updates. For example, if one of the responsible persons discovers an allergy, they can upload an update that is viewable in the fourth module 316. The data uploaded by another controlling person and/or supervising person can also include developmental data, such as an indication that the supervised being achieved a developmental milestone such as reading, using the restroom alone, expressed object permanence, and the like. The data uploaded by another controlling person and/or supervising person can also include social data, such as pictures of the supervised being during a day trip. For example, if the supervising persons take the supervised being on a day trip to a notable place, they can capture and upload images of the supervised being. The controlling person can then view and/or save the images using the fourth module 316.

In the fifth module 318, the controlling person can view recommendations generated by an artificial intelligence and/or machine learning ("AI/ML") model. The AI/ML recommendations can include suggested activities to maintain and/or guide development of the supervised being based on data from the wearable sensor. Purely by way of example, the AI/ML models may recognize that the supervised being is not getting enough exercise and recommend additional exercise time be incorporated into the child's day. In another example, the AI/ML models may recognize times when the supervised being is more likely to rest well and suggest those times for naps to maximize sleep and recovery for the supervised being during nap time. In yet another example, the AI/ML models may recognize a lack of emotional development in the supervised being and suggest additional social interaction with the supervised being (e.g., from additional talking around the supervised being, additional time spent with other supervised beings, and/or reading additional stories to the supervised being).

In the sixth module 320, the controlling person can connect other controlling persons (referred to as a "peer-to-peer network" of controlling persons) to request help and/or share supervision responsibilities over one or more supervised beings. For example, a parent, acting as a controlling person, can access the sixth module 320 while in a park to connect with other parents to facilitate supervision of groups of children while they play. In another example, the controlling person can access the sixth module 320 module for peer-to-peer help in an emergency, such as when the supervised being has unexplainably broken a geofence boundary and needs to be retrieved. The controlling person can also use the sixth module 320 to share reviews of public spaces, events, care providers, medical providers, and the like. The controlling person can also use the sixth module 320 to share articles related to supervised beings (e.g., articles on child development). The controlling person can also use the sixth module 320 to for various social purposes, such as to establish friend/trusted connections with other controlling persons in a social network framework (e.g., allowing parents on the system 100 (FIG. 1) to connect with other parents on the system 100 for any of the purposes discussed above).

Figure 4:
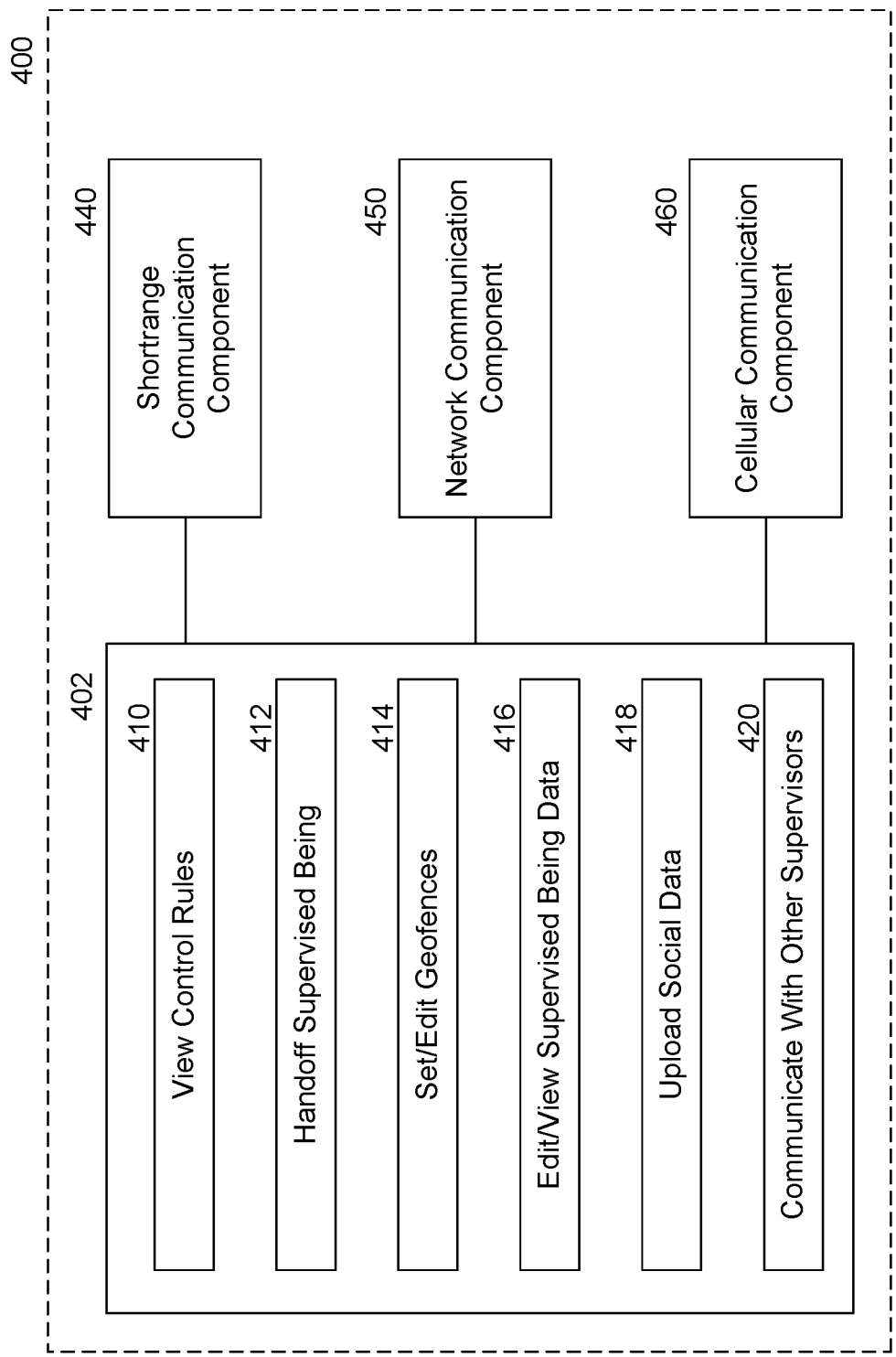
FIG. 4 is a schematic diagram of a platform for a supervising person in the system for monitoring a supervised being in accordance with some implementations of the present technology.

FIG. 4 is a schematic diagram of a subsystem 400 associated with a supervising person in a system for monitoring a supervised being in accordance with some implementations of the present technology. The subsystem 400 can be deployed in the electronic device 112 discussed above with respect to the system 100 of FIG. 1. Like the subsystem 300 discussed above with respect to FIG. 3, the subsystem 400 includes an operating platform 402 ("platform 402") with one or more modules (six shown, referred to individually as first-sixth modules 410-420), a shortrange communication component 440, an internet communication component 450, and a cellular communication component 460. Further, the platform 402 is operably coupled to each of the shortrange communication component 440, the internet communication component 450, and the cellular communication component 460, allowing the modules in the platform 402 to communicate with other subsystems and devices locally and/or over the network. Various examples of the modules are discussed in more detail below.

In the first module 410, a supervising person can view the control rules set by a controlling person. For example, the supervising person can review rules related to where the supervised being can be taken without additional permission, whether the supervised being has a required nutritional diet, and/or whether the supervised being has a required nap time. In some implementations, the supervising person can set additional control rules through the first module 410. For example, the supervising person can add control rules for a subordinate supervising person, for example to further narrow the places the supervised being can be taken without additional permission.

In the second module 412, the supervising person can handoff the control over the supervised being from the supervising person to (and from) another supervising person and/or a controlling person. Various examples of the process for handing off control are discussed in more detail below with respect to FIG. 5.

In the third module 414, the supervising person can set, edit, and/or remove geofence boundaries. The geofence boundaries can be set, edited, and/or removed in a similar manner to any of those discussed above with respect to the third module 314 of FIG. 3. Similarly, in the fourth module 416, the supervising person can edit and/or view data related to the supervised being, such as any of the data discussed above with respect to the fourth module 316 of FIG. 3.

In the fifth module 418, the supervising person can upload social data related to the supervised being. Examples of social data can include pictures of the supervised being, a report on their daily activities (e.g., that a supervised being participated in a particular activity during play time), a report on observations of their favorite activities, who the supervised being interacts with, how the supervised being interacts with others, and/or various other data related to the social activities of the supervised being. The social data can be helpful for the controlling person(s) to understand the supervised being's interests and social development.

In the sixth module 420, the supervising person can communicate with other supervising persons. The communication can allow supervising persons to coordinate the control over one or more supervised beings. For example, the communication can allow supervising persons to account for needed breaks. The communication can also establish a secure channel to communicate regarding physical accidents, to report on broken geofence boundaries, and the like.

Figure 5:
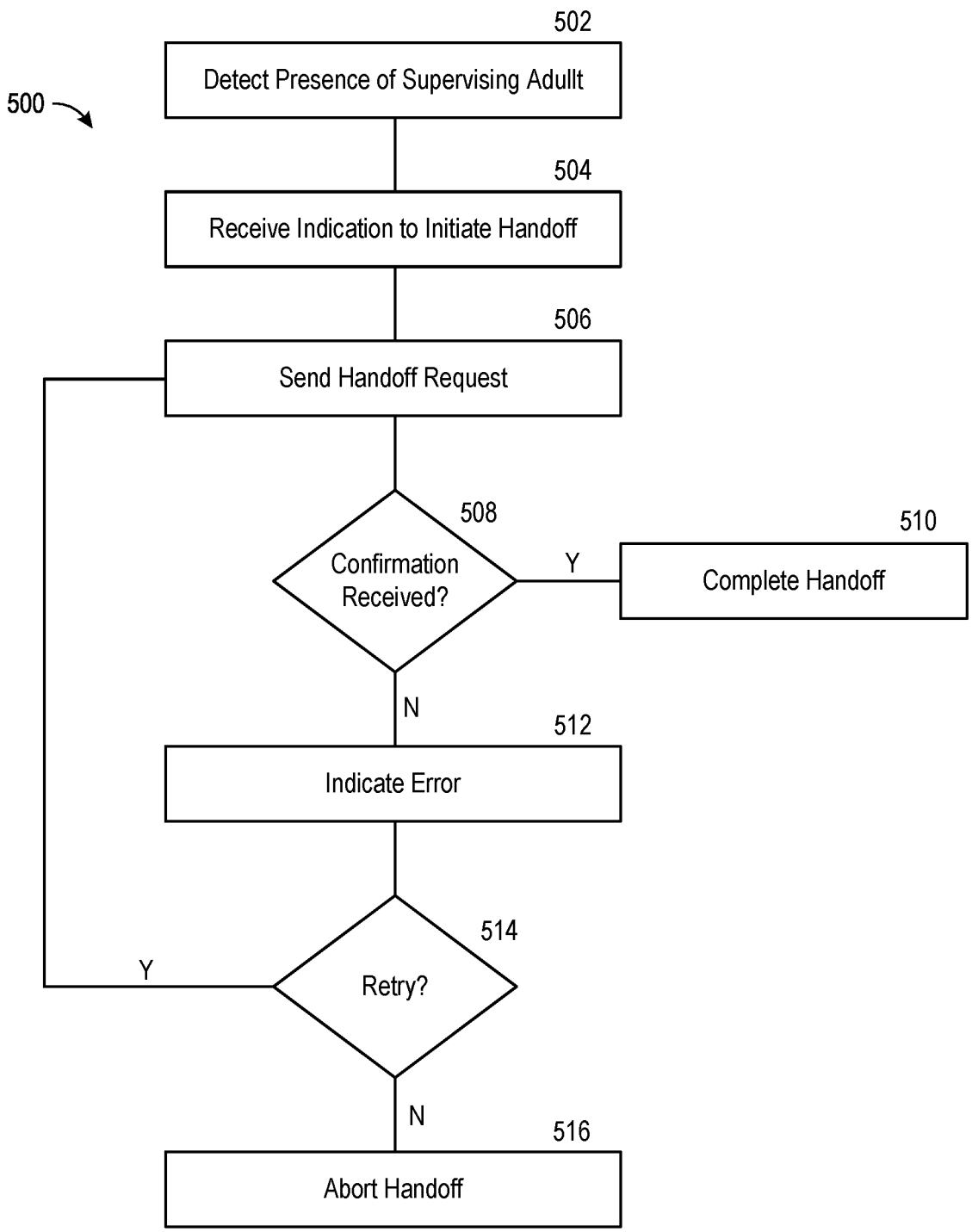
FIG. 5 is a flow diagram of a process for completing a handoff of the supervising responsibilities over a supervised being in accordance with some implementations of the present technology.

FIG. 5 is a flow diagram of a process 500 for completing a handoff of the supervising responsibilities over a supervised being in accordance with some implementations of the present technology. The process 500 can be executed by either of the subsystems 300, 400 described above to facilitate and record a handoff of the supervising responsibilities over of the supervised being. For example, the process 500 can be executed by the subsystem 300 to handoff the supervising responsibilities to a childcare provider. In another example, the process 500 can be executed by the subsystem 400 to handoff the supervising responsibilities from a first childcare provider to a second childcare provider (e.g., while the first childcare provider goes on break).

In the illustrated implementation, the process 500 begins at block 502 by detecting the presence of a receiving party (e.g., a supervising person and/or a controlling person). In various implementations, the presence of the receiving party can be detected using shortrange communication methods (e.g., via Bluetooth® communication), over a network connection (e.g., recognizing other electronic devices connected to the network), using location services enabled on two electronic devices, scanning a QR code associated with the receiving party (e.g., on the electronic device of the receiving party), and/or various other suitable methods. In some implementations, the presence of the receiving party is dependent on the receiving party's availability for a handoff. For example, if the supervising person is busy completing another handoff, their electronic device may appear as unavailable until the other handoff is completed, ensuring that the receiving party is cognitive of the present handoff as it is initiated and completed.

At block 504, the process 500 includes receiving an indication to initiate the handoff from the current supervisor to the receiving party. The handoff request includes an identification of the receiving party that allows the process 500 to identify and communicate with the receiving party (e.g., including an identification of an electronic device associated with the receiving party). In some implementations, the indication comes from an engagement with a user interface on an electronic device associated with the current supervisor, such as through an application on a current supervisor's smartphone. In various other implementations, the indication can be any other suitable gesture, such as a voice command received by the relevant electronic device, scanning a relevant code (e.g., a QR code) associated with the receiving party, aligning a portion of the receiving party's device with a portion of the current supervisor's device, and/or any other suitable gesture.

At block 506, the process 500 includes sending a handoff request to the receiving party. The handoff request can identify the supervised being, the current supervisor, a requested supervisory period, rules for the supervision, an ID for the current supervisor, a passcode for the handoff, a passcode for the supervised being, a passcode for the receiving party, a location for the handoff, and/or any other relevant information. In some implementations, the handoff request is a message sent to the receiving party (e.g., through a cellular messaging service, a push notification, and the like). In some implementations, the handoff request is sent to the receiving party through a user interface associated with the system (e.g., through an application on the electronic device). In some implementations, the handoff request includes a request for confirmation of reception of the supervised being. For example, the handoff request can instruct the receiving party to "read" (e.g., via shortrange communications) a unique identifier stored on a electronic device on the supervised being and communicate the unique identifier back to confirm the handoff. In another example, the confirmation can include an affirmative acknowledgement from the receiving party. In some implementations, the handoff request includes additional data related to the supervision being requested. For example, the handoff request can include an location for the next handoff, the date and time of the hand off, the expected amount of time for the requested supervision, the expected location for the supervision, an ID for the supervised being (e.g., when a current supervisor is responsible for multiple supervisors and/or the receiving party is associated with multiple supervised being, such as in a handoff between a parent with multiple children), a special message (e.g., a heads-up about the supervised being's current behavior, events in the supervised being's life that may affect their behavior, a change to a daily routine (e.g., when a parent will pick up their child early for an appointment), a full day report for the supervised being, and the like), and/or any other information relevant to the subject handoff and/or the expected supervision.

At decision block 508, the process 500 checks whether a confirmation of the handoff was received. In some implementations, the check is completed using a response received to the request to handoff. In some implementations, the check is completed after a predetermined amount of time to engage a timeout process for the request. In various implementations, the predetermined time can be based on a default value (e.g., 10 seconds, 30 seconds, 1 minute, 5 minutes, or any other suitable increment of time), a preferred value set by the current supervisor, a default value set by the receiving party, a default value set by an organization the receiving party works for (e.g., set by a daycare for all daycare workers), and/or set based on other suitable input. In some implementations, the predetermined time is at least partially dependent on the responsible parties involved, the date, the time of day, the location, the proximity of the responsible parties, and/or any other suitable factor. If a confirmation of the handoff was received, the process 500 continues to block 510 to complete the handoff process.

Completing the handoff can include updating a record of the supervising responsibilities to reflect the receiving party. In some implementations, as discussed above, the record is stored in the remote server 140 (FIG. 1). In some implementations, the record in stored on a secure ledger (e.g., a blockchain ledger), to increase the security of the record of the supervising responsibilities over the supervised being. In some such implementations, the ledger is accessible for review through the remote server 140 (FIG. 1). Completing the handoff can also include sending a notification of the completion to one or more parties in the system. For example, in a handoff between a controlling person and a supervising person, each of the parties can receive a confirmation of the handoff. Completing the handoff can also include sending a confirmation to one or more controlling persons, regardless of whether they were involved in the handoff. The confirmation can allow, for example, a parent to know who is responsible for the supervision of their child throughout the day in case they need to contact the supervising person and/or to provide some piece of mind to the parent.

Alternatively, if no confirmation as received at decision block 508, the process 500 continues to block 512 to indicate the error to the current supervisor and to prompt the current supervisor to maintain supervision over the supervised being. In various implementations, the indication of the error can be a push notification, message, or alert in the user interface. In some implementations, the indication of the error includes a reason for the error, such as a timeout of the request to handoff, a denial, a failure to send the request to handoff, a failed delivery of the request to handoff, a rule forbidding the handoff (e.g., when a particular receiving party is not allowed under the control rules for the supervised being), and the like.

At decision block 514, the process 500 checks whether the current supervisor wants to retry the handoff. The check can include prompting the current supervisor via a push notification, message, and/or prompt in the user interface and receiving a response. If the current supervisor indicates to retry the handoff, the process 500 can return to block 506 to send another handoff request to the receiving party. If the current supervisor indicates to not retry, the process 500 continues to block 516. If no response is received within a predetermined period, the process 500 can treat the lack of a response as an indication to not retry and continue to block 516.

At block 516, the process 500 aborts the handoff. In some implementations, the attempted handoff and failure is added to the record of the supervising responsibilities. Recording the attempted handoff and/or failure can help maintain a complete record of the chain of custody and/or help identify gaps in the chain of custody. For example, the record of attempts and/or failures can help identify points where the process 500 may have failed but the supervised being was handed off in the real world. In addition, the record of attempts and/or failures can allow a controlling person to identify attempted, non-allowed handoffs (e.g., where a handoff fails because the receiving party is not authorized). These attempts may reflect a point of discussion with the supervising party responsible when the attempt was made, for example to explain why a particular receiving party is not authorized to supervise the supervised being.

Figure 6:
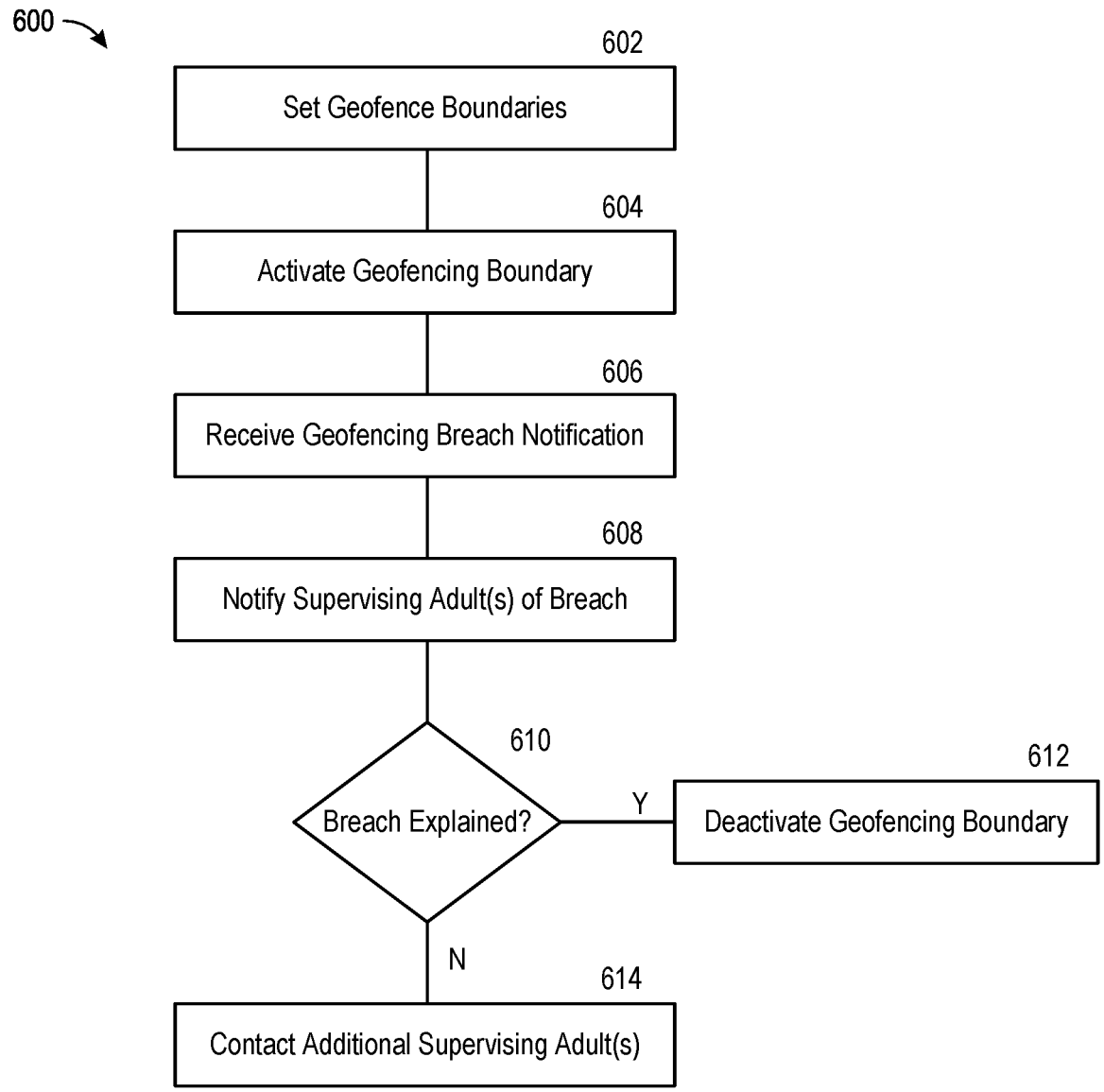
FIG. 6 is a flow diagram of a process for monitoring a geofencing boundary in accordance with some implementations of the present technology.

FIG. 6 is a flow diagram of a process 600 for monitoring a supervised being within a geofencing boundary in accordance with some implementations of the present technology. The process 600 can be executed by either of the subsystems 300, 400 (FIGS. 3 and 4) and/or by a component of the remote server 140 (FIG. 1) to ensure the supervised being stays within a predetermined boundary during a set period. For example, the process 600 can be executed by the subsystem 300 to set a boundary line around a public park during a visit to the park; by the subsystem 400 to set a boundary line around a playground during a recess period; by the remote server 140 during a recurring period (e.g. weekly daycare); and the like.

The process 600 begins at block 602 to set a geofence boundary. The geofence boundary can be set through a user interface by drawing a boundary line on a map, selecting one or more preset boundaries (e.g., selecting a public park in a map that includes preset boundaries for the public park, selecting one or more saved geofences, and the like), indicating a radius around a selected location, indicating a radius around a selected supervising party, placing one or more IoT devices and/or beacons to define a perimeter, and/or any other suitable mechanism. In some implementations, setting the geofence boundary can require that the relevant party have authorization to set the boundary. For example, a controlling person 110 (FIG. 1) may limit the permissions for which supervising persons 120 can set a geofence boundary to require specific supervisors (e.g., a head supervisor) to do so. In some implementations, anew geofence boundary is limited to being within a previously set geofence boundary. For example, a controlling person 110 (FIG. 1) may set a first geofence boundary when dropping their toddler off at a childcare facility, thereby limiting any supervising persons 120 to setting a second geofence boundary within the first geofence boundary (e.g., around a playground or specific room in the childcare facility).

At block 604, the process 600 includes activating the geofencing boundary. Once activated, components of the supervising system (e.g., the system 100 illustrated in FIG. 1) can require that a electronic device (e.g., a wearable device on the supervised being) report on the position of the electronic device. The reports can periodic (e.g., once per minute, twice per minute, once every five minutes, and/or any other suitable interval) or continuous. The report can include an indication of a connection to an electronic device and/or network, allowing the system to roughly determine the position of electronic device. The report can also include an exact location of the electronic device with respect to a network, various electronic devices, and/or on earth (e.g., using GPS coordinates). The reports allow the supervising system to monitor whether the electronic device has breached the geofencing boundary.

If the electronic device remains within the geofencing boundary, no further actions occur in the process 600. In some implementations, the geofencing boundary is then later deactivated based on an indication from a supervising party with the appropriate authorizations. In some implementations, the geofencing boundary is set with a predetermined time window (e.g., during a recess period, during daycare hours, for an hour while at a park, and the like). At the end of the predetermined time window, the geofencing boundary can then be deactivated.

At block 606, the process 600 includes receiving a geofencing breach notification. The geofencing breach notification can include a time stamp for the breach, an indication of where the breach occurred, an indication of the current location of the electronic device, an indication of the adults currently responsible for the supervised being, and/or an indication of nearby adults. The geofencing breach notification can also include data from the wearable sensor, such as data on the supervised being's heart rate, temperature, emotional state, and the like.

At block 608, the process 600 includes notifying the controlling and/or supervising person(s) of the breach. For example, as discussed above, the process 600 can be executed either of the subsystems 300, 400 (FIGS. 3 and 4) and/or by a component of the remote server 140 (FIG. 1). Accordingly, in implementations in which the geofencing breach notification is received by the cloud server and/or the electronic device of a party not currently responsible for the supervised being, the process 600 can send a notification to the currently responsible party at block 608. For example, the controlling person may set the geofencing boundary through their electronic device, which can then receive the geofencing breach notification and notify a supervising person that is currently responsible for the supervised being. In implementations in which the geofencing breach notification is received by the electronic device of the party that is currently responsible, the notification can include any suitable alert (e.g., push notification, alarm sound, voice call, and the like) to direct the attention of the party that is currently responsible.

At decision block 610, the process 600 checks whether the breach of the geofence boundary is explained. If the breach is explained, the process 600 continues to block 612 to deactivate the geofencing boundary; else the process continues to block 614 to notify one or more additional adults. In some implementations, the check includes prompting the currently responsible party for an input on whether the breach is explained. In some implementations, the input includes a yes/no response. In some implementations, the input includes a brief explanation that can be recorded in the system 100 (FIG. 1) and/or sent to interested parties. Purely by way of example, the breach can be cause by a supervised being visiting a restroom outside of a defined geofence while a supervising person is responsible. The explanation can reflect the restroom visit, allowing a controlling person to review the explanation and quickly understand the reason for the geofencing breach. In another example, the explanation can reflect an early departure from a geofenced area when the responsible party forgets to deactivate the geofencing boundary (e.g., when a visit to a park ends early).

As discussed above, if the geofencing boundary is explained, the process continues to block 612. At block 612, the process 600 includes deactivating the geofencing boundary to reflect the explained breach. The deactivation can be recorded in the remote server 140 (FIG. 1), allowing interested parties to review the updated status of the geofencing boundary. In some implementations, the deactivation is temporary. For example, where the breach is explained by a temporary need (e.g., to use a restroom outside the geofencing boundary), the deactivation at block 612 can last a predetermined time reflecting the need. At the end of the predetermined time, the process 600 can return to block 604 to re-activate the geofencing boundary. A continued breach will then result in a geofencing breach notification requiring further explanation. In some implementations, once the geofencing boundary is deactivated at block 612, the process 600 must start again at block 602 to reactivate a geofencing boundary.

Alternatively, if the geofencing boundary is not explained, the process continues to block 614. At block 614, the process 600 includes contacting one or more additional adults. The additional adult(s) can include the controlling persons (e.g., to notify parents of the unexplained breach); other controlling and/or supervising person(s) associated with the currently responsible party (e.g., to notify other childcare providers in a childcare center); other, unrelated adults (e.g., alerting other parents that also use the system 100 (FIG. 1)); and/or emergency responders (e.g., security officers, the police, fire departments, neighborhood watch, and the like) to broaden the network of adults that can respond to the breach. In some implementations, the number and/or type of adults contacted is dependent on inputs from the responsible party and/or a controlling person. For example, when the breach notification indicates that the supervised being is outside a geofenced area but still within a childcare facility, the responsible party can elect to contact other supervising persons (e.g., other childcare providers) but not the controlling persons (e.g., parents) or emergency responders to avoid unnecessary alerts.

In some implementations, the process 600 then returns to decision block 610 to check whether the breach is explained. Continuing the example above, after additional childcare workers are contacted, they may be able to retrieve the supervised being and provide an explanation for the breach. The explanation can then be recorded and/or later reviewed by any interested party (e.g., by a parent reviewing the breach). If the breach is still unexplained, the process 600 can return to block 614 to contact one or more additional adults. In some implementations, the process 600 can continue on a loop between decision block 610 and block 614 and escalate the number and/or type of adult(s) contacted each pass through the loop. Continuing the example above, if none of the childcare workers can explain the breach, the process 600 can contact the controlling person (e.g., a parent); and if the controlling person cannot explain the breach, the process 600 can contact one or more emergency responders (e.g., security officers, the police, community response team, neighborhood watch, and the like). In such implementations, the loop ends either when the breach is explained or the final, most serious group of additional adults (e.g., emergency responders) is contacted.

Figure 7A:
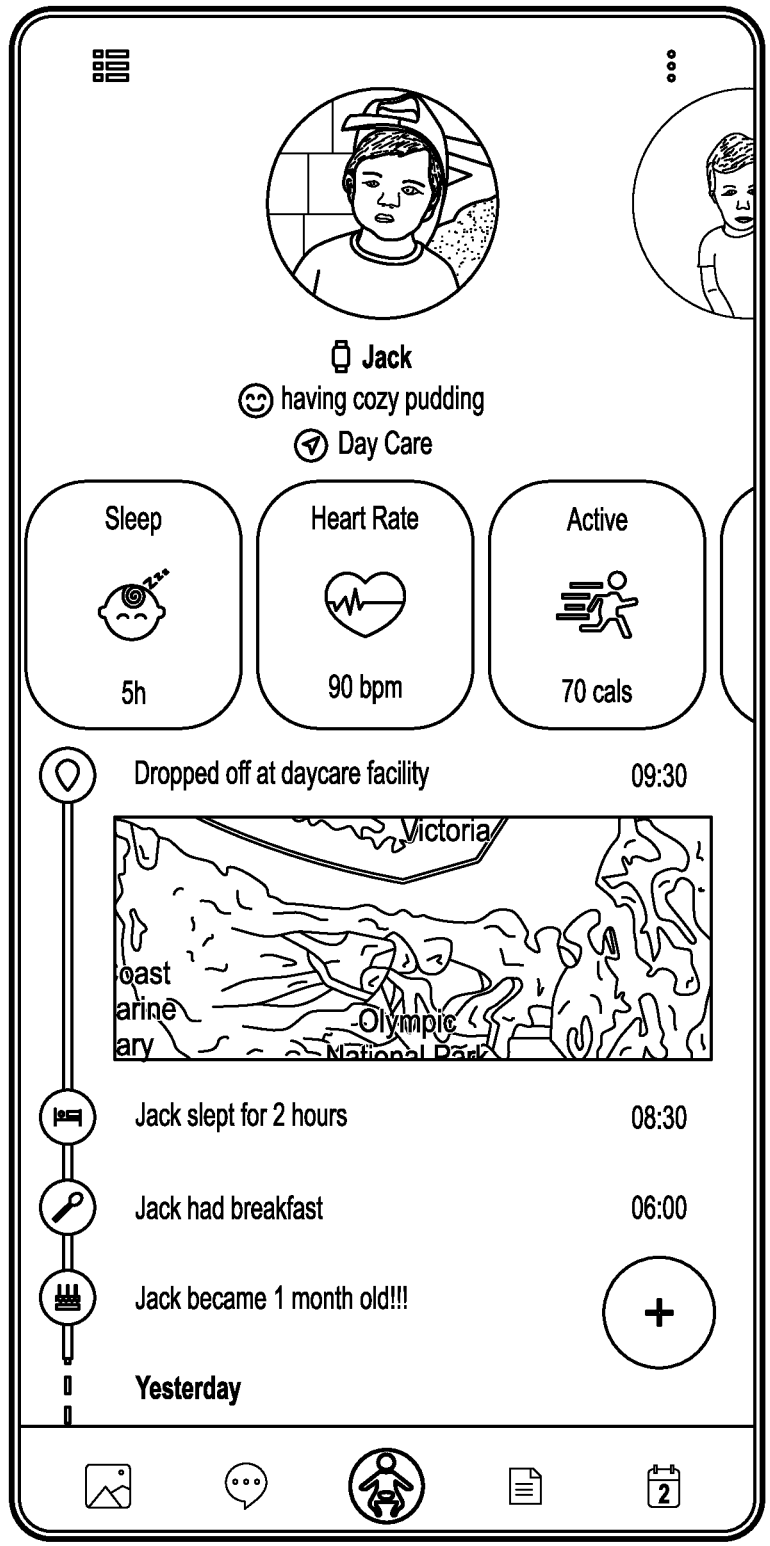
FIGS. 7A-7H are wireframes of various user interfaces associated with the system for monitoring a supervised being in accordance with some implementations of the present technology.

FIGS. 7A-7H are examples of various user interfaces associated with the system for monitoring a supervised being in accordance with some implementations of the present technology. For example, FIG. 7A illustrates an example user interface 700a communicating various information related to the current supervision and status of a toddler. In the illustrated implementation, the user interface 700a includes an indication of the toddler's current mood (e.g., having cozy pudding) and current location (e.g., at daycare). The user interface 700a also includes an indication of various bioindicators from a wearable device on the toddler (e.g., a measure of the amount of sleep the toddler got, when they had their last nap, their current heart rate, and how active they have been). The user interface 700a also includes a record of various relevant events, such as the age of the last handoff of control over the toddler, meals, their age, and the like.

Figure 7B:

FIG. 7B illustrates an example user interface 700b for viewing photos of the supervised being. The photos can be organized into albums by date, category, photographer, location, and/or any other suitable category. Further, as discussed above, the photos can be added by any responsible party with access to the photo albums. For example, the user interface 700b allows parents to review photos of their children that are captured by a daycare worker during a field trip with the children.

Figure 7C:
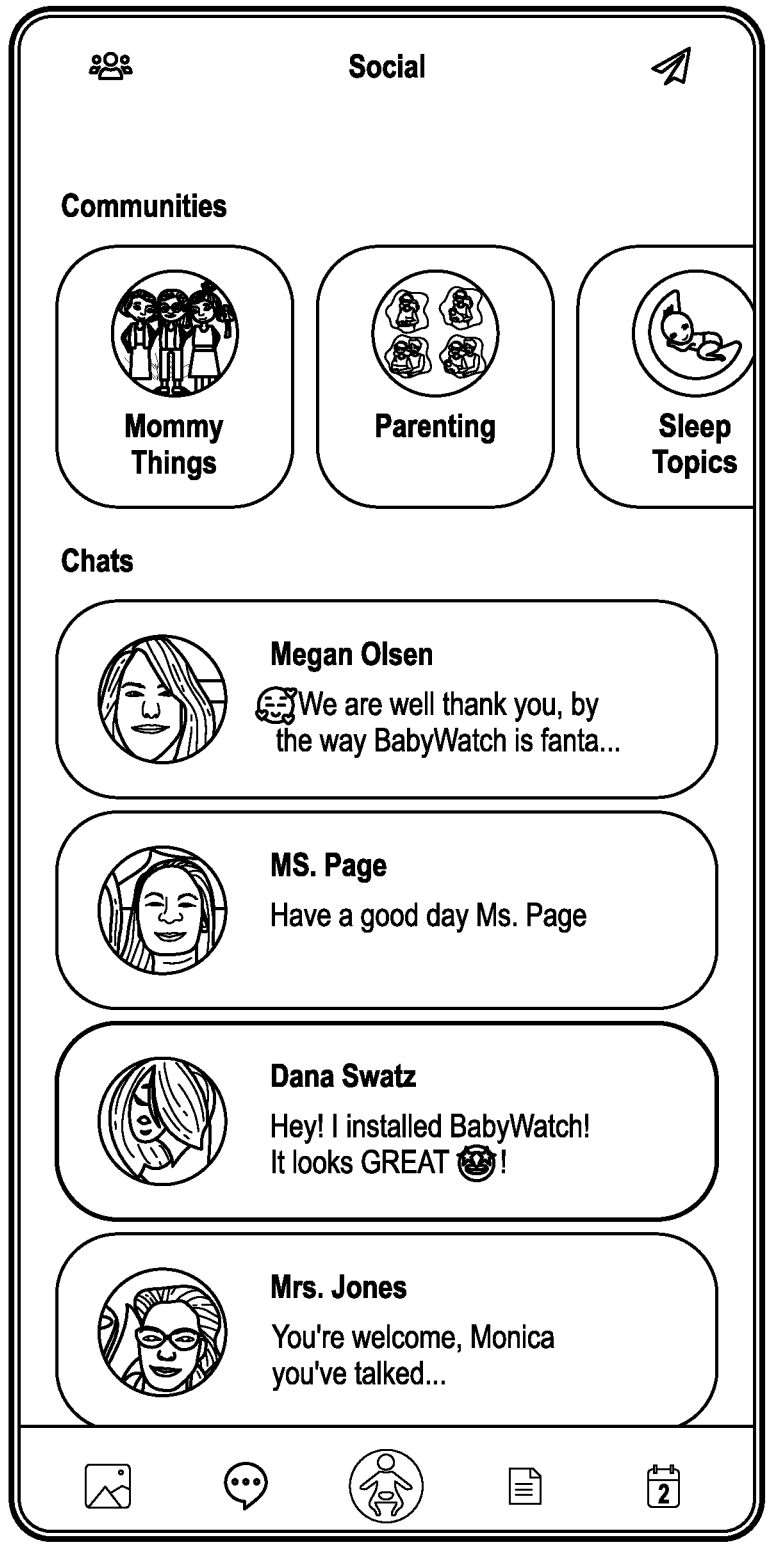

FIG. 7C illustrates an example user interface 700c associated with a peer-to-peer network. In the illustrated implementation, the user interface 700c enables a controlling person to enter into and participate in various communities. The communities can be organized around specific topics, activities, interests, and/or any other suitable category. The user interface 700c also enables the supervised being to connect directly with one or more additional controlling persons and/or one or more supervising persons. Purely by way of example, the user interface 700c allows a parent to connect with another parent to share developmental tips, reviews of activities, locations, and/or childcare providers, and/or to request help (e.g., when a child wanders away). The user interface 700c can also allow a parent to connect with other parents to establish a social network of other parents connected to the system 100 (FIG. 1).

Figure 7D:
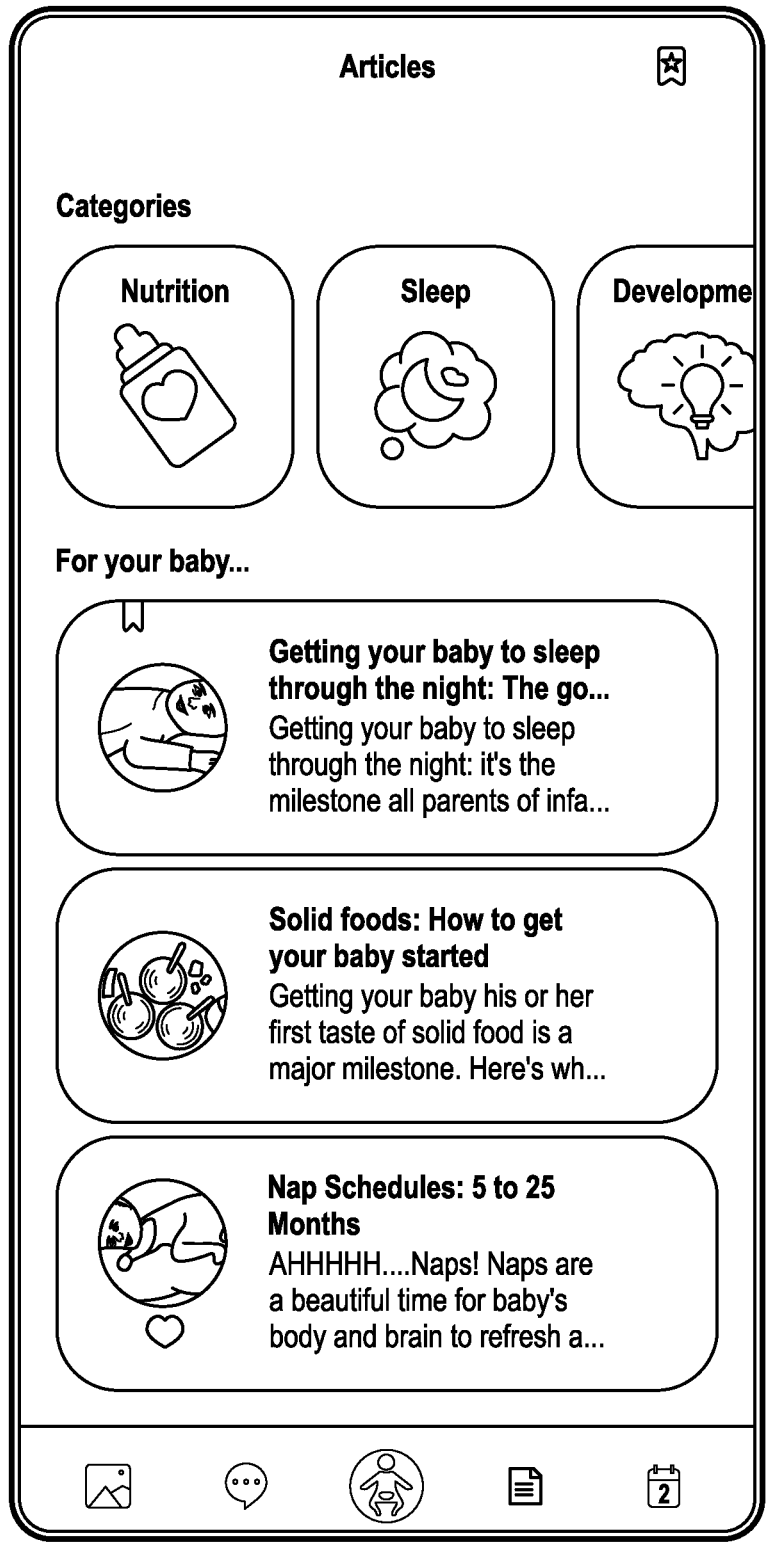
Figure 7E:
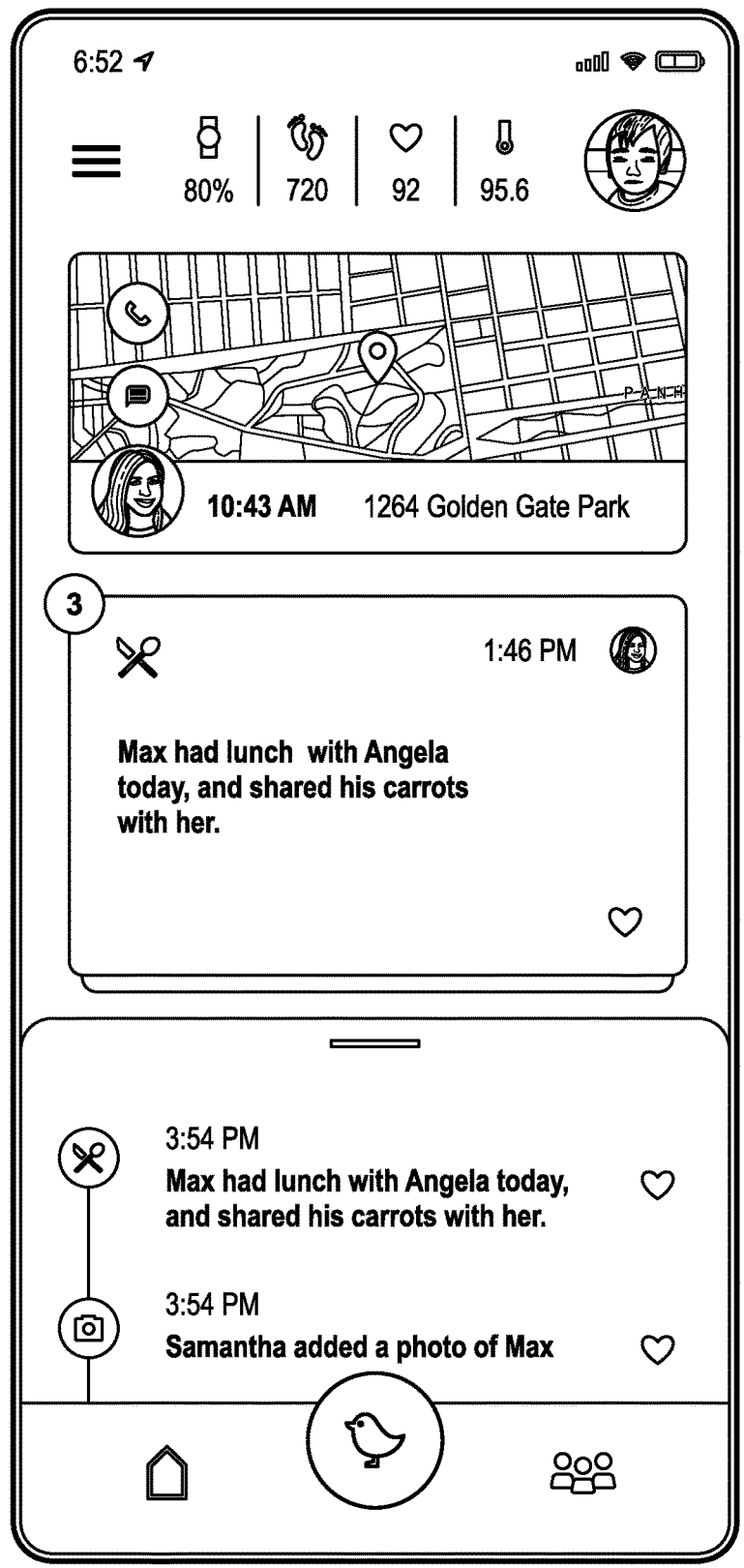
Figure 7F:
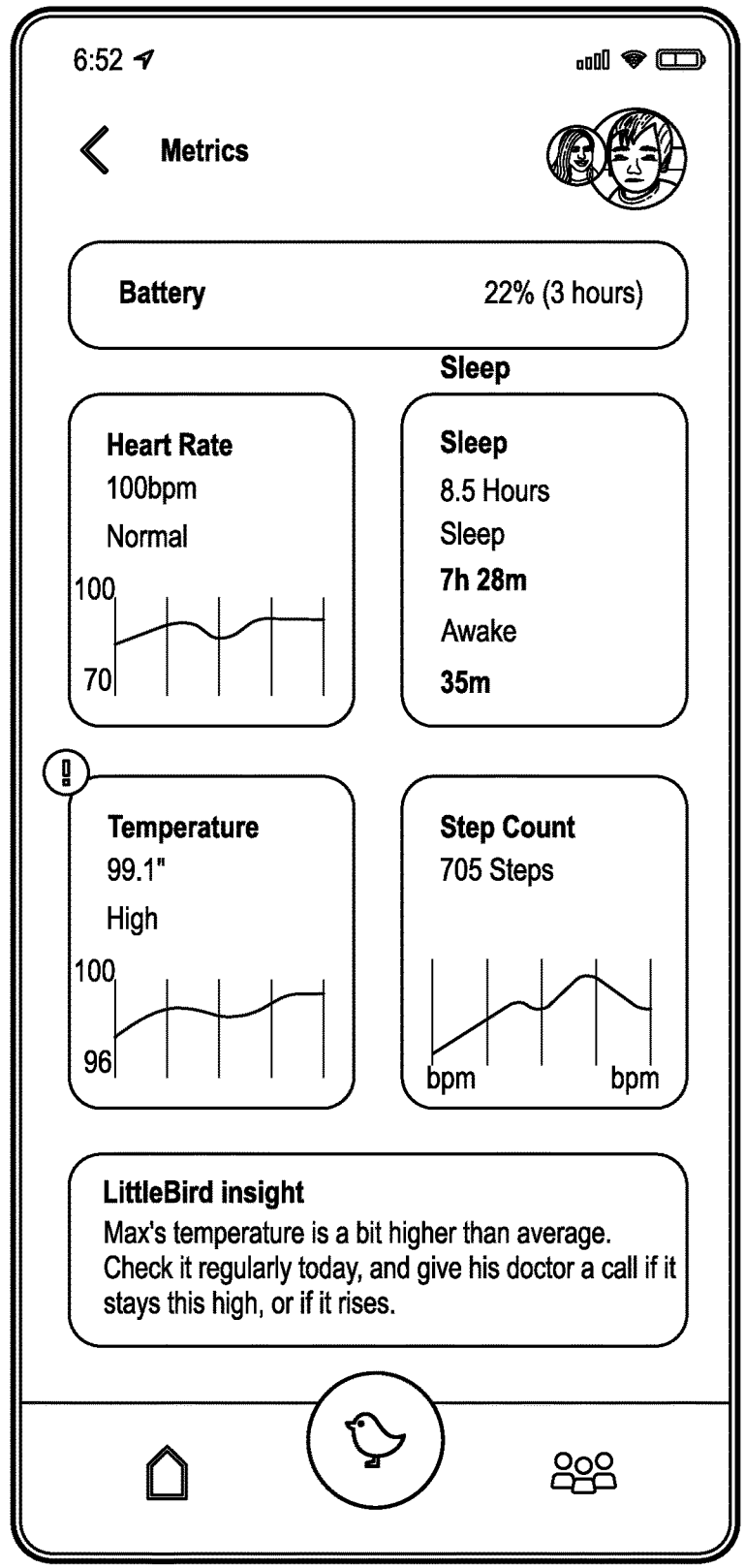
Figure 7G:
Figure 7H:
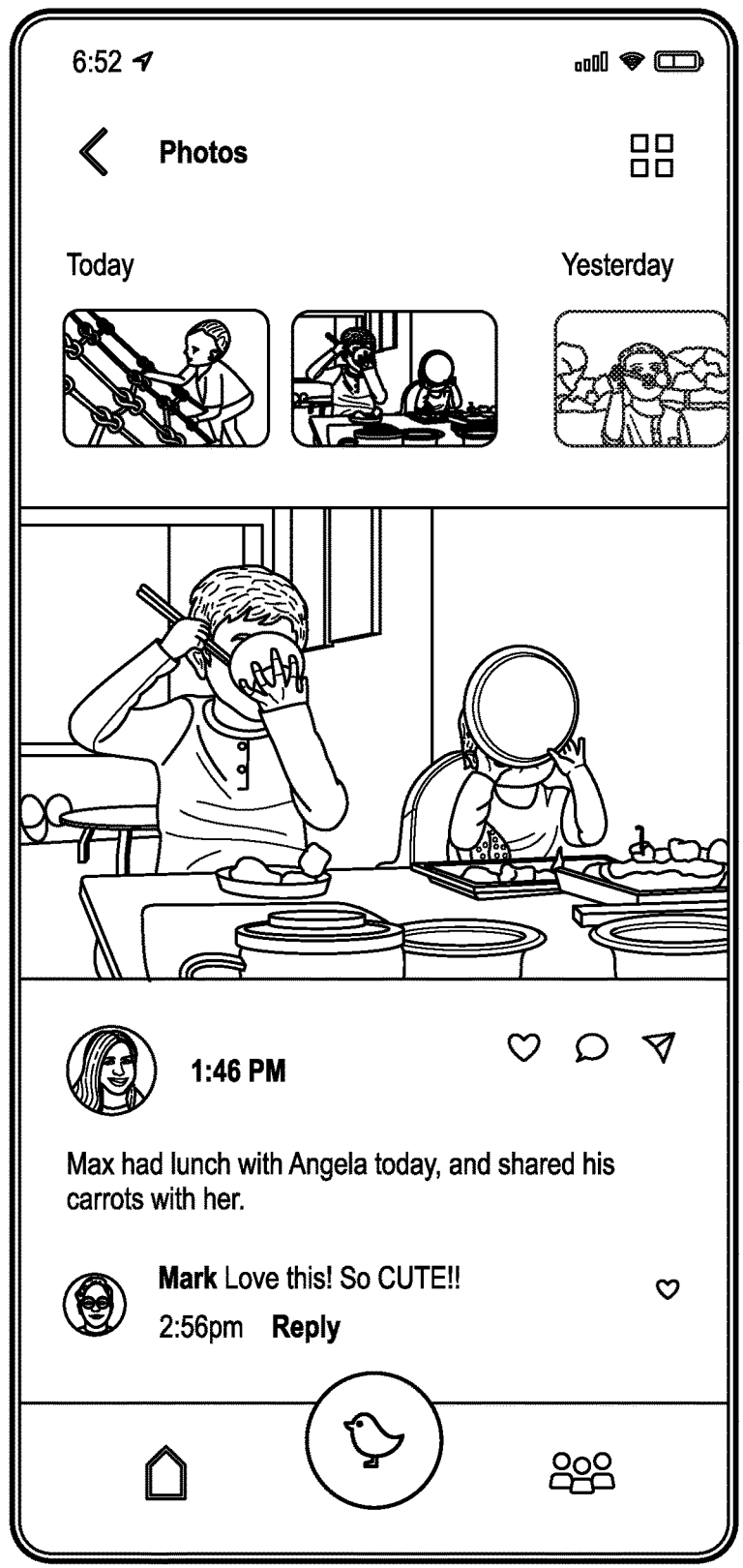

FIG. 7D illustrates an example user interface 700d associated with AI/ML recommendations for controlling persons. In the illustrated implementation, the user interface 700d includes categories of topics that are identified as relevant for a specific controlling parent along with various specific recommendations that are specific to the supervised being. As discussed above, the recommendations can be identified based on data a responsible person uploads to the system regarding the supervised being and/or data collected by an electronic device associated with the supervised being. The recommendations can be related to the physical, emotional, and/or mental development of the supervised being, as well as recommendations for dynamically adjusting supervision of the supervised being over time.

FIGS. 7E-7H illustrate additional examples of user interfaces 700e-700h associated with the system for monitoring a supervised being. For example, each of the user interfaces 700e, 700f communicates additional data related to the supervised being such as their daily activities and/or bioindicators; the user interface 700g provides a direct connection between a controlling person (e.g., a parent) and supervising persons (e.g. childcare providers) to communicate regarding the status of the supervised being; and the user interface 700h can be accessed to view and/or photos of the supervised being.

Example Systems and Methods Related to the Electronic Device

Figure 8:
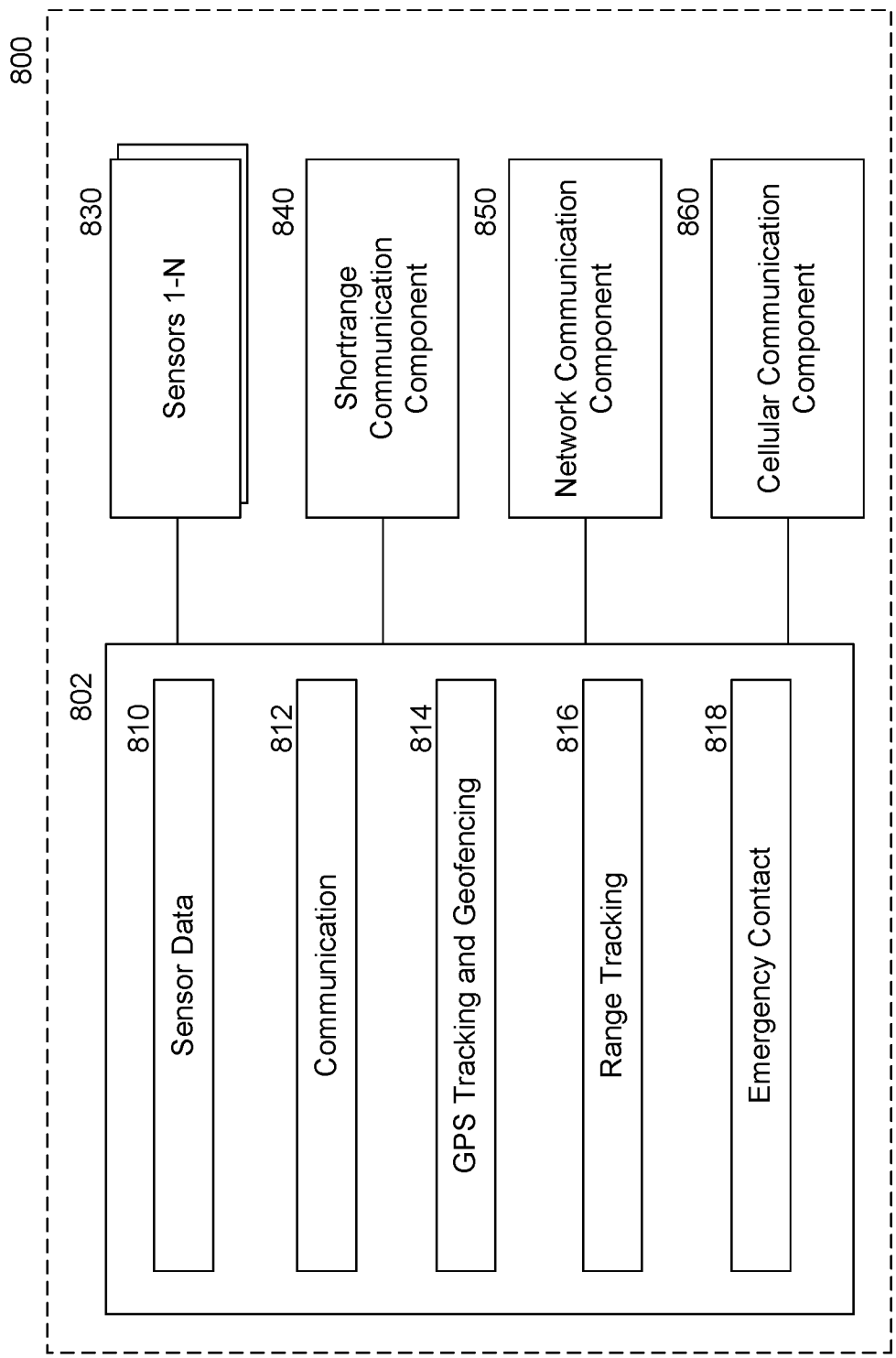
FIG. 8 is a schematic diagram of a platform for a wearable device for use by a supervised being in accordance with some implementations of the present technology.

FIG. 8 is a schematic diagram of a subsystem 800 associated with an electronic device for use on a supervised being in accordance with some implementations of the present technology. The subsystem 800 can be deployed in the electronic device 132 discussed above with respect to the system 100 of FIG. 1. Like the subsystems 300, 400 discussed above with respect to FIGS. 3 and 4, the subsystem 800 can include an operating platform 802 ("platform 802") with one or more modules (six shown, referred to individually as first-sixth modules 810-820), a shortrange communication component 840, an internet communication component 850, and a cellular communication component 860. Further, the subsystem 800 can include one or more sensors 830 (1-N indicated) that collect bioindicators while worn by the supervised being. Purely by way of example, the sensors 830 can include a PPG sensor, an accelerometer, a skin temperature sensor, a skin conductivity sensor, additional hydration sensors, heart-rate variability sensors, resting heart rate sensors, sweat chemical composition sensors, nervous system electrical sensors, air quality sensors, UV exposure sensors, sensors to detect environmental chemicals, blood oxygen and/or pulse oxygen sensors, voice recognition, electrocardiogram (ECG) sensor, pressure sensors, gyroscopes, magnetometers, and/or any combination therein. The PPG sensor allows the subsystem 800 to measure and record the supervised being's heart rate; the accelerometer allows the subsystem 800 to measure and record the supervised being's movement; the skin temperature sensor allows the subsystem 800 to measure and record the supervised being's temperature over time; and the skin conductivity sensor allows the subsystem 800 to measure and record the supervised being's level of psychological or physiological arousal, which is effected by the supervised being's cognitive activity and/or emotions.

As further illustrated in FIG. 8, the platform 802 is operably coupled to each of the one or more sensors 830, the shortrange communication component 840, the internet communication component 850, and the cellular communication component 860, allowing the modules in the platform 802 to communicate with other subsystems and devices locally and/or over a network.

The first module 810 allows the platform 802 to receive, organize, store, and/or communicate the data from the sensors. The data can include numerous different bioindicators, such as any of the bioindicators from the sensors discussed above. In some implementations, the first module 810 also at least partially processes and/or links the data. For example, the first module 810 can receive data from a skin conductivity sensor, process the data to determine related cognitive activity and/or emotions, then communicate and/or store the determined cognitive activity and/or emotions. In another example, the first module 810 can link data from each of the sensors, for example allowing the data to be later reviewed and/or processed together.

The second module 812 allows the platform 802 to control the shortrange communication component 840 to search for a nearby subsystem and/or device (e.g., either of the subsystems 300, 400 discussed above) and/or communicate data from the sensors to the nearby subsystem and/or device.

The third module 814 allows the platform 802 to control the internet communication component 850 to communicate data from the sensors over a network (e.g., the network 290 discussed above). In some implementations, the platform 802 toggles the internet communication component 850 between an on and off position to conserve a battery life of the electronic device and/or otherwise reduce power consumption by the electronic device. For example, while a nearby subsystem and/or device is detected, the platform 802 can rely on a lower power consumption of the shortrange communication component 840 to communicate the sensor data and thereby take advantage of the power of the nearby subsystem and/or device to further communicate the sensor data. If no subsystem and/or device is detected nearby, the platform 802 can activate the internet communication component 850 to search for and connect to an available internet connection.

The fourth module 816 allows the platform 802 to control the cellular communication component 860 to communicate data from the sensors over a cellular network (e.g., thereby connecting to a broader network). In some implementations, the platform 802 toggles the cellular communication component 860 between an on and off position to conserve a battery life of the electronic device and/or otherwise reduce power consumption by the electronic device. For example, while a nearby subsystem and/or device is detected, the platform 802 can rely on a lower power consumption of the shortrange communication component 840 and/or the internet communication component 850 to communicate the sensor data. If no subsystem and/or device is detected nearby and no internet connection is detected, the platform 802 can activate the cellular communication component 860 to search for and connect to an available cellular network.

The fifth module 818 allows the platform 802 to communicate with a GPS satellite to track the location of the subsystem 800 and/or implement one or more geofence boundaries. In some implementations, the platform 802 controls an onboard GPS component to toggle the sensor between on and off positions. For example, while the platform 802 detects a nearby subsystem, device, and/or internet connection, the platform 802 can maintain the GPS component in an off position to conserve the battery life of the electronic device and/or otherwise reduce power consumption by the electronic device. When no such connections are detected, the platform 802 can toggle the GPS component to an on position. In some implementations, the platform 802 toggles the GPS component to an on position whenever a geofence boundary is activated by another component in the system 100 (FIG. 1). The activation of the geofence boundary can be communicated to the platform 802, for example, through any of the shortrange communication component 840, the internet communication component 850, and/or the cellular communication component 860.

The sixth module 820 allows the supervised being to activate an emergency contact function on the electronic device. In some implementations, the sixth module 820 automatically contacts a preselected party when activated (e.g., a controlling person, an emergency responder, and the like) to quickly connect the supervised being with the preselected party. In other implementations, the sixth module 820 allows the supervised being to select who to contact. In some implementations, the sixth module 820 cannot be activated absent certain bioindicators through the sensors 830. For example, unless data from the sensors 830 indicates an elevated heart rate, a high skin temperature, absence from a geofenced area, and/or abnormal mental and/or emotional conditions, the platform 802 can prevent the sixth module 820 from being activated. The requirement of certain bioindicators can help ensure that the supervised being does not superfluously activate the sixth module 820.

Figure 9A:
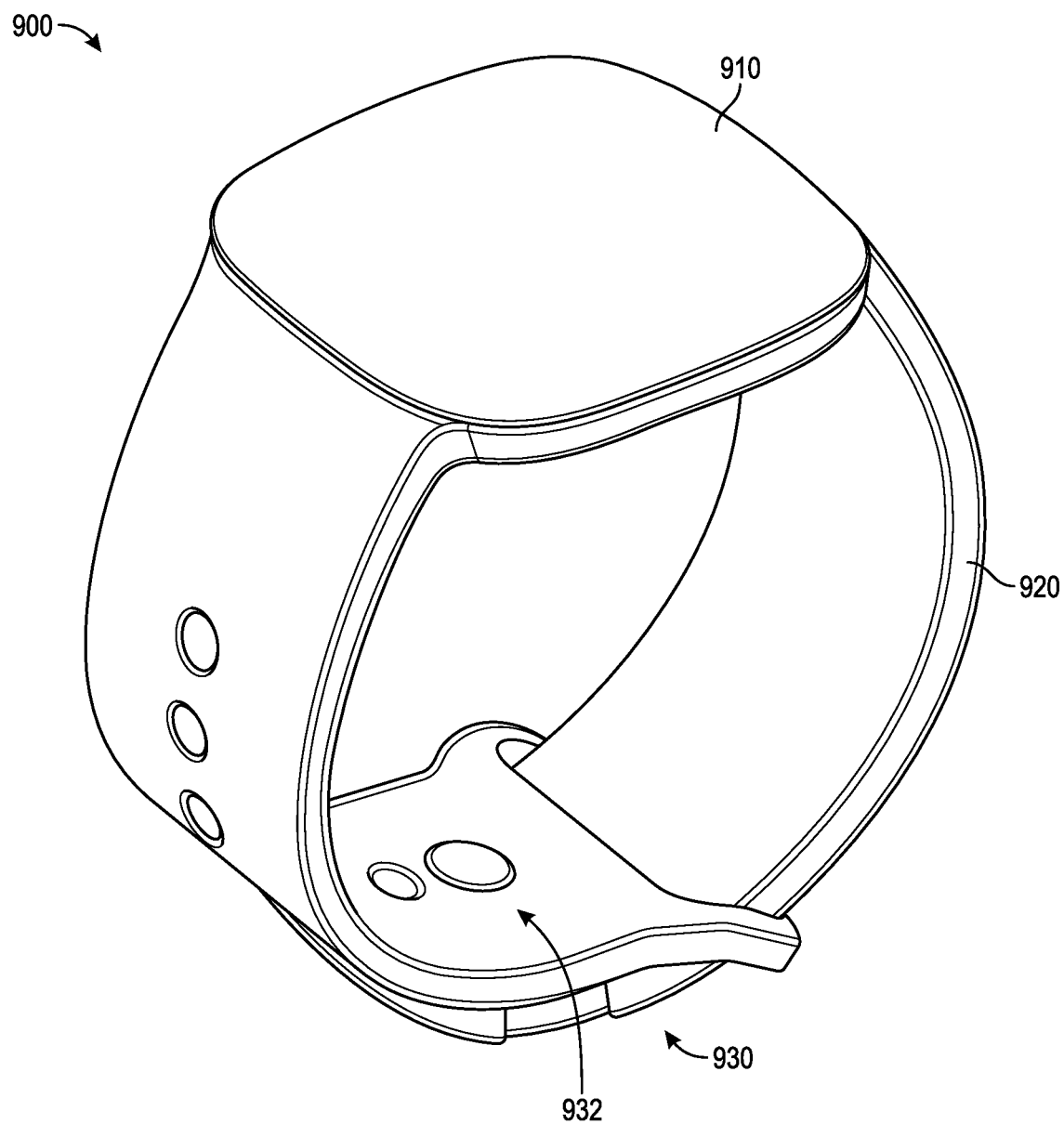
FIGS. 9A-9C are an isometric view, a bottom view, and a side view, respectively of a wearable device for use by a supervised being in accordance with some implementations of the present technology.
Figure 9B:
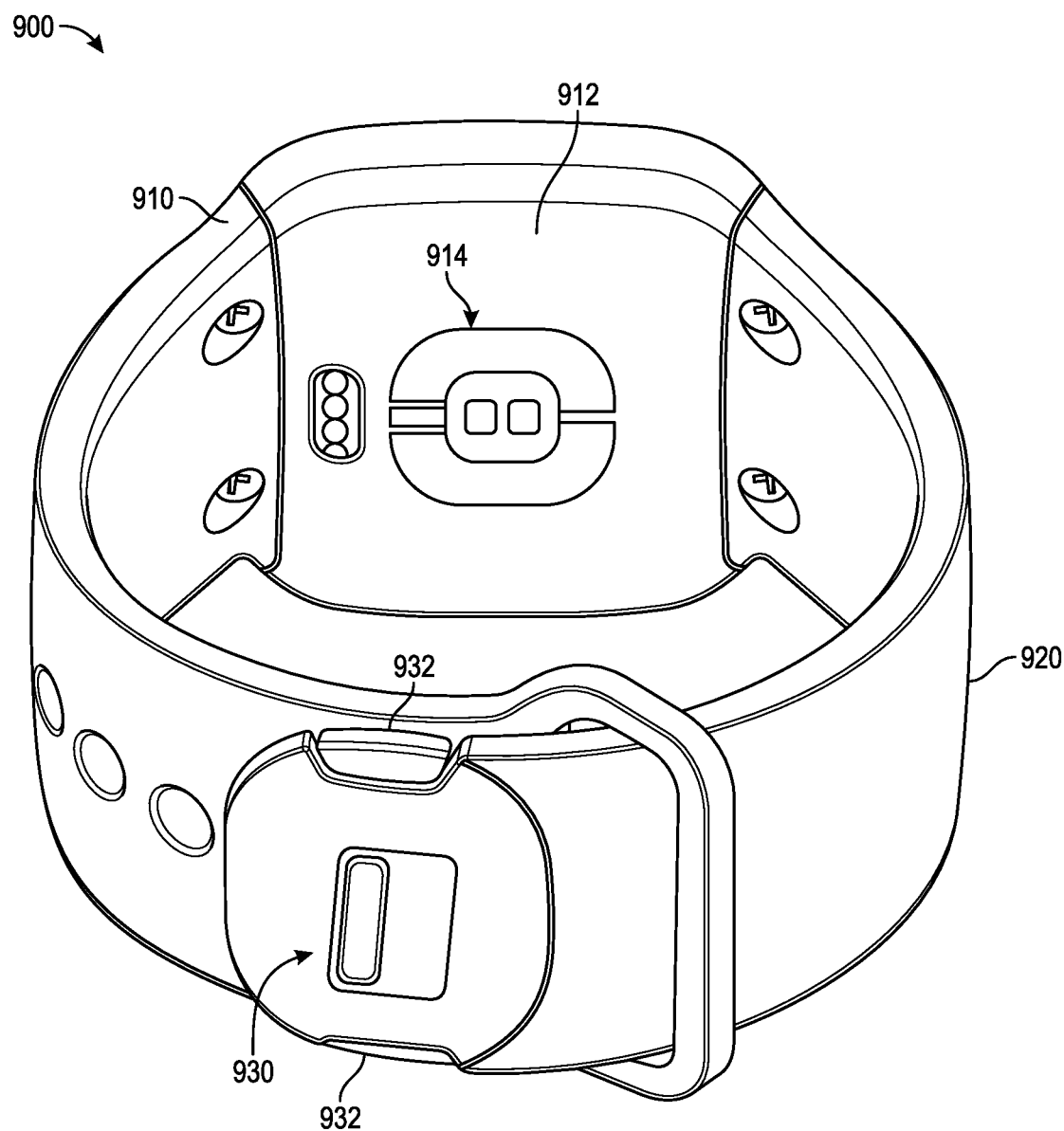
Figure 9C:
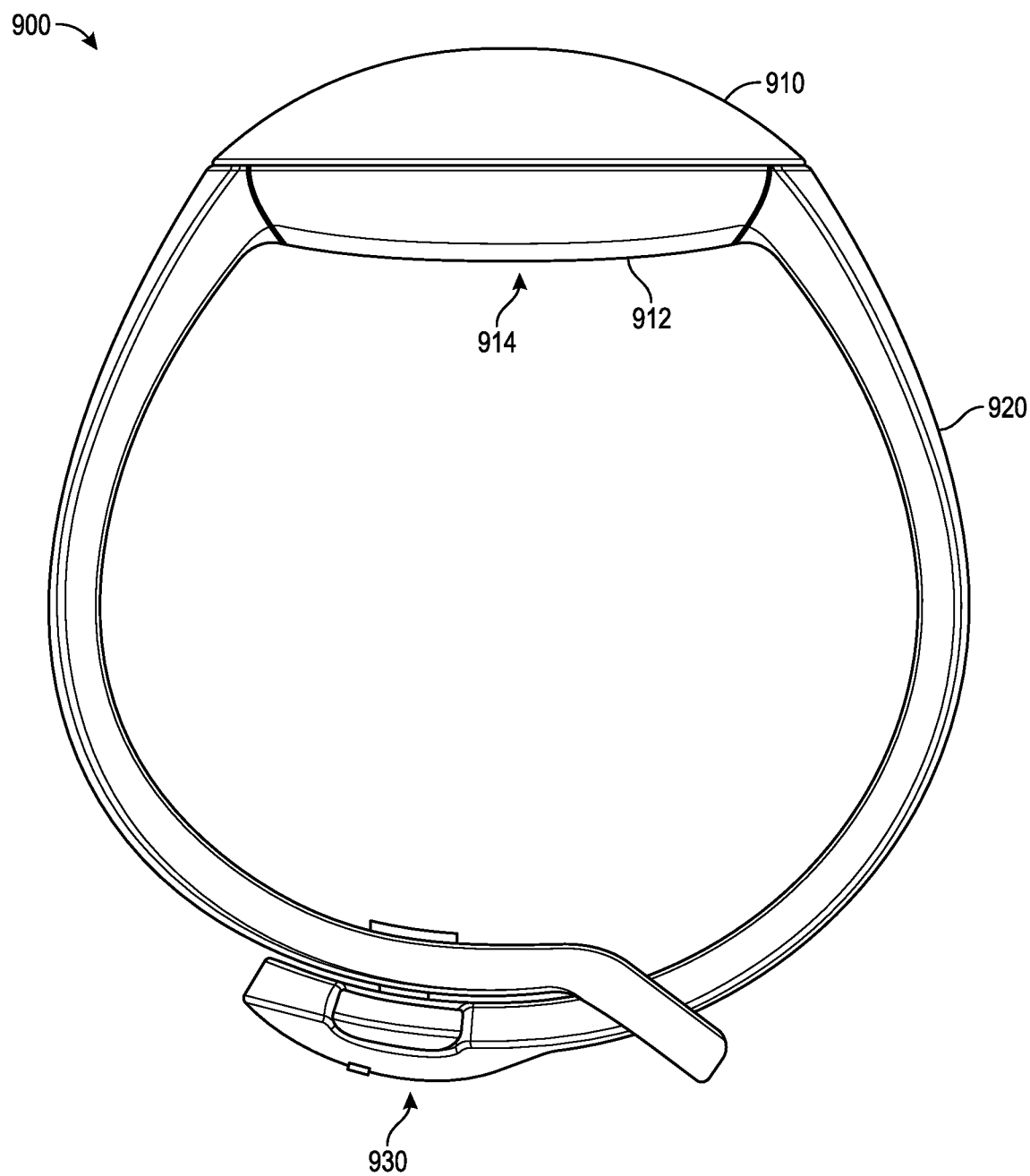

FIGS. 9A-9C are an isometric view, a bottom view, and a side view, respectively of a wearable device 900 for use by a supervised being in accordance with some implementations of the present technology. The wearable device 900 can include the subsystem 800 discussed above with respect to FIG. 8. Further, the wearable device 900 can be deployed as the electronic device 132 discussed above with respect to the system 100 of FIG. 1. As illustrated in FIGS. 9A-9C, the wearable device 900 includes and electronics housing 910 and a flexible strap 920 attached to the electronics housing 910. The electronics housing 910 is designed to sin on top of a wrist and/or on an ankle of the supervised being. Meanwhile, the flexible strap 920 is designed to wrap around the supervised being's wrist and/or ankle to secure the electronics housing on the supervised being. In the illustrated implementation, the wearable device 900 also includes a connecting element 930 on the flexible strap 920 with allows the tightness of the flexible strap 920 around the supervised being's wrist and/or ankle to be adjusted.

In some implementations, the connecting element 930 includes childproof features that prevent the supervised being from removing the wearable device 900. For example, in the illustrated implementation, the connecting element 930 includes a peg and clasp connection that requires force to be applied on two pinchable elements 932 (FIG. 9B) while a peg 934 (FIG. 9A) is pulled outwards. As a result, the connecting element 930 requires two hands to undue, thereby preventing the supervised being from removing the wearable device 900 on their own.

As best illustrated in FIG. 9B, the wearable device 900 includes skin-facing sensors 914 on a lower surface 912 of the electronics housing 910. In various implementations, as discussed above, the skin-facing sensors 914 can include a PPG sensor, a skin temperature sensor, one or more accelerometers, skin conductivity sensors, heart-rate variability sensors, resting heart rate sensors, sweat chemical composition sensors, nervous system electrical sensors, air quality sensors, UV exposure sensors, sensors to detect environmental chemicals, blood oxygen and/or pulse oxygen sensors, voice recognition, electrocardiogram (ECG) sensor, pressure sensors, gyroscopes, magnetometers, and/or any other suitable sensor. In some implementations, as best illustrated in FIG. 9C, the lower surface 912 and the skin-facing sensors 914 can protrude outwardly from the electronics housing 910 with a slightly convex shape. The convex shape of the electronics housing 910 can have at least two functions for the wearable device 900. First, babies, toddlers, and young children can have a slight dip on the top of their wrists that can be at least partially matched by the convex shape of the electronics housing 910. As a result, the skin-facing sensors 914 can maintain better contact with the skin of a supervised being wearing the wearable device 900, thereby allowing the skin-facing sensors 914 to obtain more accurate data. Second, the convex shape of the electronics housing 910 provides more internal space for the electronics of the wearable device 900, thereby allowing the longitudinal footprint of the wearable device 900 to be slightly reduced.

The electronics housing 910 can also include one or more on board power sources (not shown) such as various primary and secondary cell batteries. In some implementations, the electronics housing 910 includes a secondary cell battery that stores enough power to operate the wearable device 900 (and the subsystem thereon), for between about three and about seven days. The long battery life allows the wearable device 900 to be worn to sleep some nights, thereby allowing the skin-facing sensors 914 to continue to collect bioindicator data, for example measuring how well the supervised being is sleeping. In some implementations, the secondary cell battery is fully charged in a period of about an hour, allowing the wearable device 900 to be fully recharged various daily activities that may require removal anyway (e.g., while the supervised being showers). In various implementations, the secondary cell battery can be charged by a wireless charging system (e.g., through inductive chargers) and/or through various cord-based chargers.

Figure 10A:
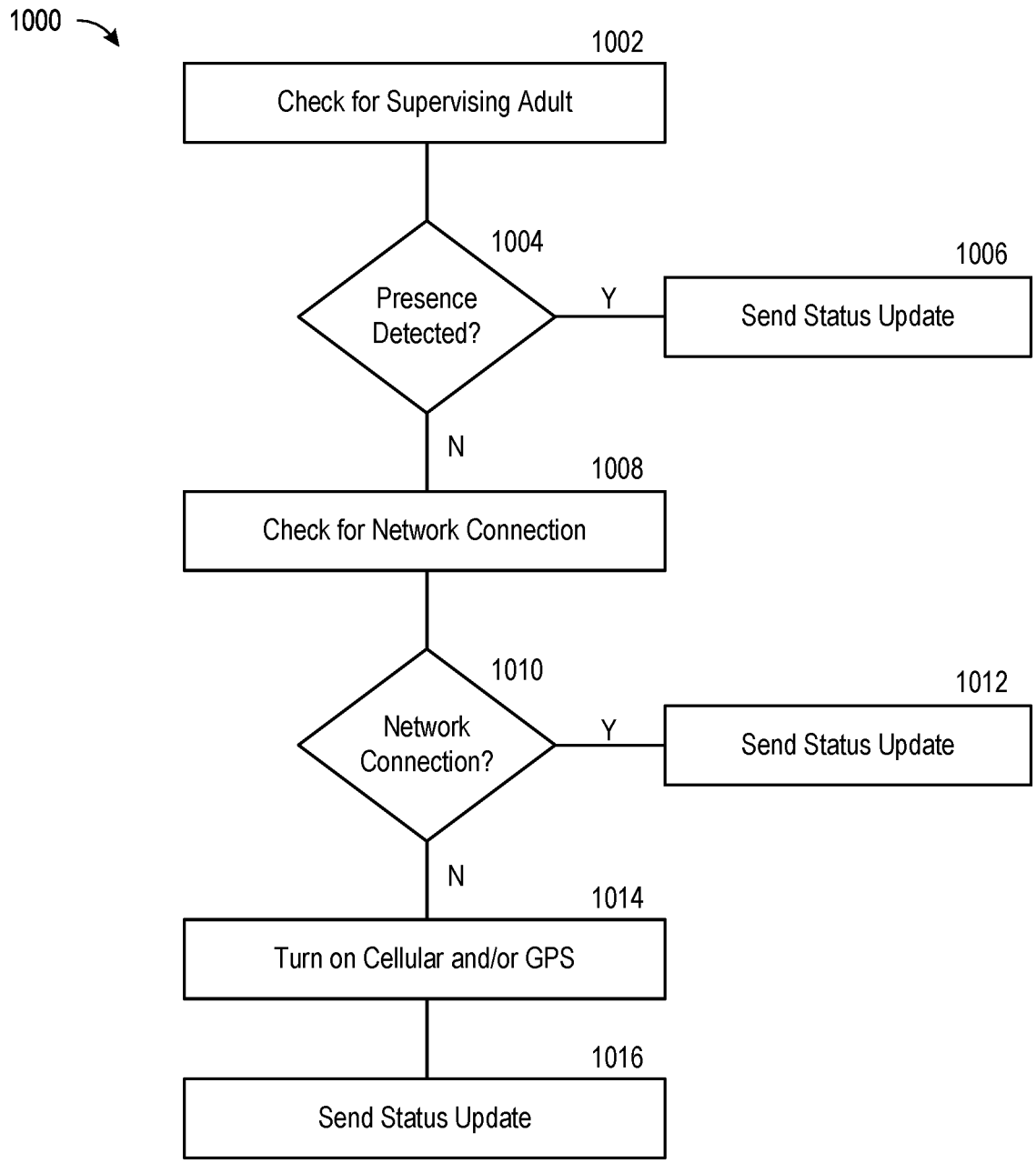
FIG. 10A is a flow diagram of a process for uploading status updates related to a supervised being in accordance with some implementations of the present technology.

FIG. 10A is a flow diagram of a process 1000 for uploading status updates related to a supervised being in accordance with some implementations of the present technology. The process 1000 can be executed by the subsystem 800 discussed above with respect to FIG. 8 (e.g., operating in the electronic device 132 of FIG. 1) to establish communication between the subsystem 800 and another database (e.g., the remote server 140 of FIG. 1) and/or another subsystem (e.g., the subsystems 300, 400 of FIGS. 3 and 4).

The process 1000 begins at block 1002 to check for the presence of a responsible person, such as a controlling person and/or a supervising person, by searching for one of the subsystems 300, 400 of FIGS. 3 and 4. The presence of the responsible person allows the electronic device to communicate the status updates locally using a shortrange communication component (e.g., Bluetooth®) with instructions to forward the status updates to another subsystem (e.g., to the cloud server). In various implementations, checking for the presence of a responsible person can include sending a presence detection signal, checking whether a known device is within a proximity of a shortrange communication component, and/or checking available devices for the device associated with the responsible person.

At decision block 1004, the process 1000 determines whether the presence of the responsible person was detected. If the presence of responsible person was detected, the process 1000 continues to block 1006; else the process continues to block 1008.

At block 1006, the process 1000 includes sending a status update to the responsible person using the shortrange communication component. The status update can include any sensor data that was measured since the last status update, an analysis of the sensor data, an assessment of the condition of the supervised being based on the sensor data, information about the electronic device system (e.g., remaining battery life), and/or any other suitable information. The responsible person can then review the status update and/or forward the status update to a network-connected database (e.g., the remote server 140 of FIG. 1) to be stored. Once stored in the network-connected database, the data from the status update can be reviewed by the controlling persons and/or the supervising persons; analyzed by one or more components of the system (e.g., one or more modules in the cloud sever, accessed by a third party, and the like); and the like.

In some implementations, once the status update has been sent at block 1006, the process 1000 restarts at block 1002. The process 1000 can restart after any suitable time interval (e.g., after one minute, after five minutes, after ten minutes, every half hour, every hour, and/or any other suitable time interval), or can restart instantaneously after sending a status update to continuously send status updates.

As discussed above, the shortrange communication component can use less energy than other components to upload the status updates. Accordingly, as discussed above in reference to FIG. 8, the subsystem 800 can keep other communication components powered off to save battery as long as the presence of the responsible person is detected. Accordingly, using the responsible person to relay the status update to the network-connected database can improve the battery life of the subsystem 800.

At block 1008, the process 1000 includes checking for a network connection, such as a connection to a wireless network. In some implementations, checking for a network connection includes powering an internet communication component (e.g., a WNIC) on then searching for a trusted network connection (e.g., a trusted WiFi connection).

At decision block 1010, the process 1000 the process 1000 determines whether the network connection was detected. If the network connection was detected, the process 1000 continues to block 1012; else the process continues to block 1014.

At block 1012, the process 1000 includes sending the status update using the network connection. The status update can be sent to the responsible person and/or a network-connected database through the network connection. In some implementations, for example, the process 1000 includes sending the status update to the responsible person through the network connection. The responsible person can then review the status update and/or forward the status update to the network-connected database. In some implementations, the process 1000 includes sending the status update directly to the network-connected database. The responsible person can then review the status update through the network-connected database.

As discussed above, once the status update has been sent, the process 1000 can restart at block 1002. In various implementations, the process 1000 can restart after any suitable time interval, or can restart instantaneously after sending a status update to continuously send status updates. In some implementations, the internet communication component remains on until a shortrange wireless connection is detected to efficiently send subsequent status updates.

If no network connection is detected (e.g., because the subsystem 800 is out of range of a wireless connection and/or no wireless connection has been set up), the process 1000 includes turning on a cellular component within at block 1014. As discussed above, powering on the cellular component only after no shortrange connection and no wireless connection is detected can help improve the battery life of a electronic device. Once powered on, the subsystem 800 connects to the network-connected database using the cellular component (e.g., using a 3G connection, 4G connection, LTE connection, 5G connection, 6G connection, and/or any other suitable cellular connection).

At block 1016, the process 1000 includes sending the status update using the cellular component. The status update can be sent to the responsible person to be reviewed and/or forwarded to the network-connected database, and/or can be sent directly to the network-connected database to be reviewed and accessed later.

As discussed above, once the status update has been sent, the process 1000 restarts at block 1002. In various implementations, the process 1000 can restart after any suitable time interval, or can restart instantaneously after sending a status update to continuously send status updates. In some implementations, the cellular component remains on until either a shortrange wireless connection and/or a network connection is detected to efficiently send subsequent status updates.

Figure 10B:
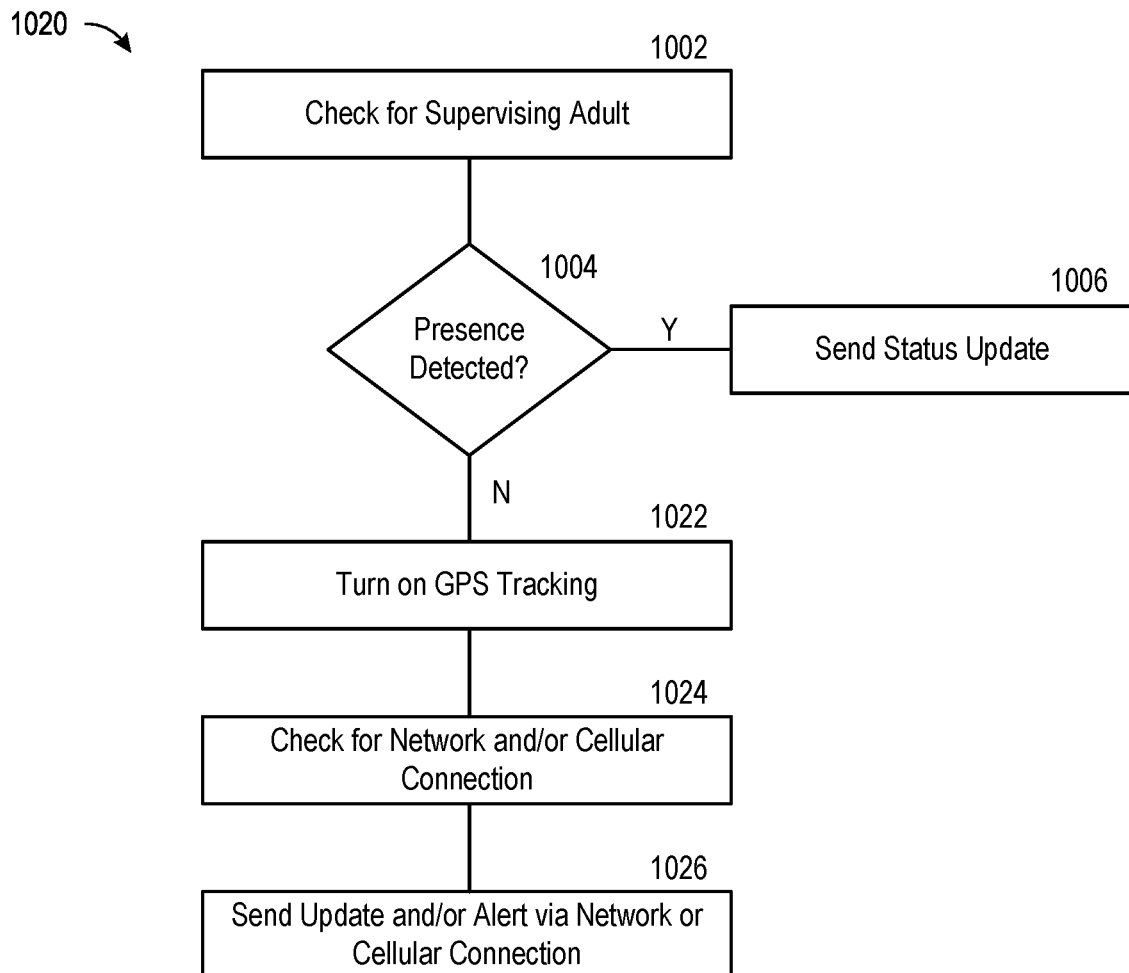
FIG. 10B is a flow diagram of a process for monitoring control a supervised being in accordance with some implementations of the present technology.

FIG. 10B is a flow diagram of a process 1020 for monitoring control over a supervised being in accordance with some implementations of the present technology. The process 1020 can be executed by the subsystem 800 discussed above with respect to FIG. 8 (e.g., operating in the electronic device 132 of FIG. 1) to ensure a supervising person (e.g., associated with the subsystems 300, 400 of FIGS. 3 and 4) is constantly either within a proximity to have control over the supervised or alerted to location of the supervised being.

Similar to the process 1000 of FIG. 10A, the process 1020 begins at block 1002 to check for the presence of a responsible person, such as a controlling person and/or a supervising person, by searching for one of the subsystems 300, 400 of FIGS. 3 and 4. The presence of the responsible person can indicate that the responsible person has control over the supervised being. In various implementations, checking for the presence of a responsible person can include sending a presence detection signal, checking whether a known device is within a proximity of a shortrange communication component, checking available communication devices for the device associated with the responsible person, and/or comparing a shared geographic location of the responsible person to a geographic location of the supervised being to check that the responsible person is within a predetermined proximity (e.g., a distance set by the controlling person) of the supervised being.

At decision block 1004, the process 1000 determines whether the presence of the responsible person was detected. If the presence of responsible person was detected, the process 1000 continues to block 1006; else the process continues to block 1022.

At block 1006, the process 1000 includes sending a status update to the responsible person using the shortrange communication component and/or any other suitable component. As discussed above, the status update can include any sensor data that was measured since the last status update, an analysis of the sensor data, an assessment of the condition of the supervised being based on the sensor data, information about the electronic device (e.g., remaining battery life), and/or any other suitable information. The responsible person can then review the status update and/or forward the status update to a network-connected database (e.g., the remote server 140 of FIG. 1) to be stored. Additionally, the status update can include instructions to update a record of the control over the responsible person (e.g., held by the cloud server). Once stored in the network-connected database, the data from the status update can be reviewed by the controlling persons and/or the supervising persons; analyzed by one or more components of the system Once stored in the network-connected database, the data from the status update can be reviewed by the controlling persons and/or the supervising persons; analyzed by one or more components of the system (e.g., one or more modules in the cloud sever, accessed by a third party, and the like); and the like. Purely by way of example, the record of control can help track when a supervised being was last under the control of the responsible person whenever they lose control, allowing the responsible person (or any other suitable party) to help locate the supervised being.

At block 1022, the process 1020 includes activating GPS tracking to help track the exact location of the supervised being while they are separated from the responsible person. In some implementations, the GPS component in the electronic device is inactive while the supervised being is under the control of the responsible person. In such implementations, the electronic device can conserve energy consumed by the GPS component until it is needed. Then, at block 1022, activating the GPS tracking can include turning the GPS component on. Additionally, the GPS tracking can include packaging GPS data into each status update sent from the electronic device and/or creating an independent stream of the GPS data to provide real-time (or near real-time) indications of the geographic location of the supervised being.

At block 1024, the process 1020 includes checking for a network and/or cellular connection. As discussed above, the checks can occur sequentially. For example, in some implementations of block 1024, the process 1020 includes checking for a network connection by powering an internet communication component (e.g., a WNIC) on, then searching for a trusted network connection (e.g., a trusted WiFi connection). If no network connection is detected (e.g., because the electronic device is out of range of a wireless connection and/or no wireless connection has been set up), the process 1020 includes turning a cellular component on and connecting to the cloud server using the cellular component (e.g., using a 3G connection, 4G connection, LTE connection, 5G connection, 6G connection, and/or any other suitable cellular connection).

At block 1026, the process 1020 includes sending an update on the geographic location of the electronic device to the cloud server using the network and/or cellular connection. In some implementations, the update also includes data from the sensor(s) on the electronic device, an analysis based on the data from the sensor(s), and the like. The updates can be sent to the cloud server to make the updates viewable by a variety of responsible persons and/or accessible (or shareable) to a third party (e.g., a police or fire department). In some implementations, the process 1020 includes sending continuous updates (e.g., every millisecond, every half second, every second, every five seconds, every thirty seconds, and/or after any other suitable period) to provide real time (or near real time) information on the location of the supervised being.

Additionally, or alternatively, at block 1026, the process 1020 includes sending an alert through the network and/or cellular connection. In some implementations, the alert is sent to the cloud server, which can then take action to alert one or more responsible persons (e.g., the responsible person currently in control over the supervised being, another supervising person, a parent or other legal guardian, an emergency contact, and the like) to the separation between the responsible person and the supervised being and/or to the location of the supervised being. In some implementations, the alert is sent directly to one or more responsible persons (e.g., sending a text message to the currently responsible person and/or a parent or other legal guardian). The alert can then, for example, prompt the one or more responsible persons to track the geographic location of the supervised being.

Figure 10C:
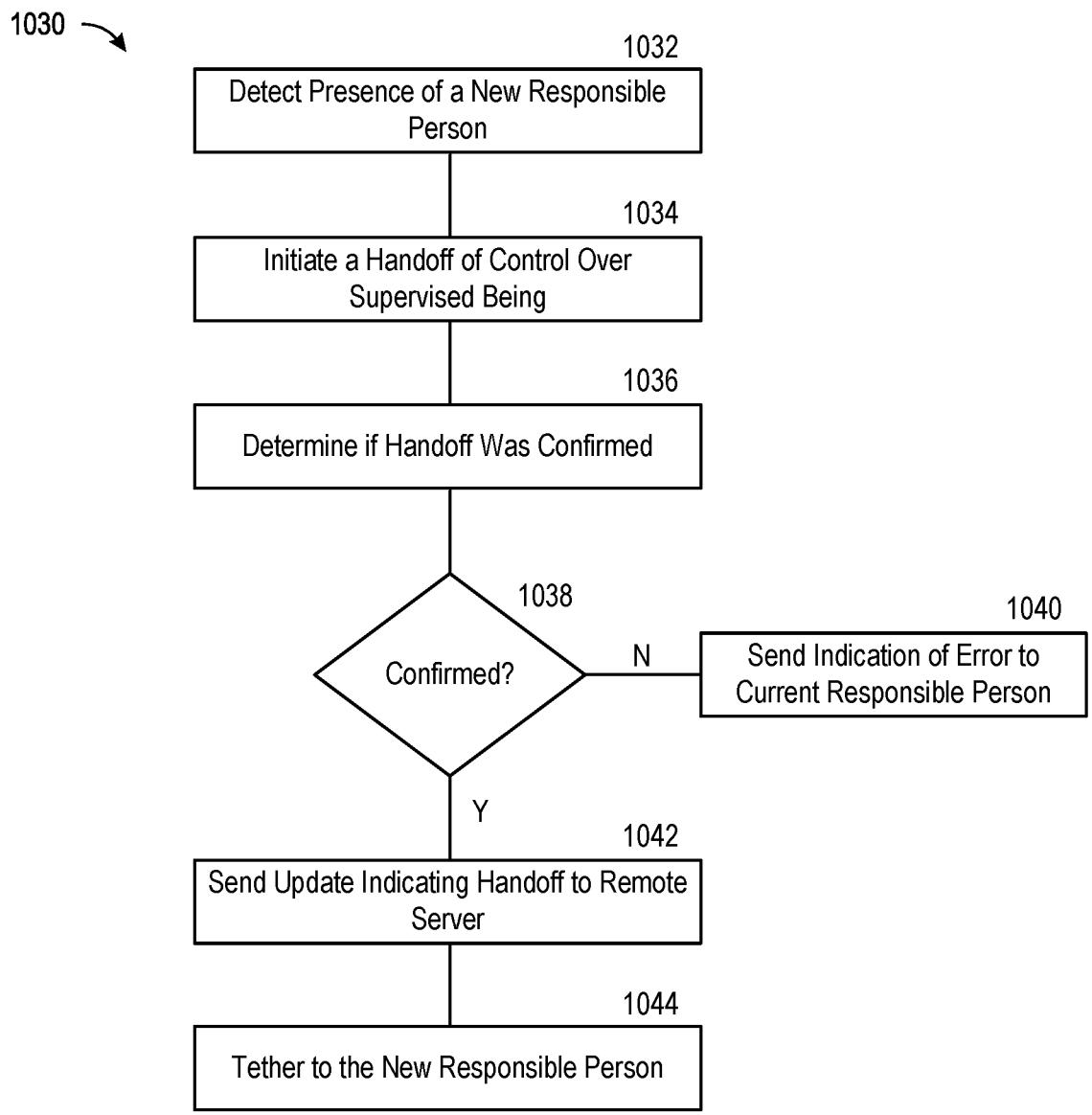
FIG. 10C is a flow diagram of a process for facilitating a handoff of control over a supervised being in accordance with some implementations of the present technology.

FIG. 10C is a flow diagram of a process 1030 for facilitating a handoff of control over a supervised being in accordance with some implementations of the present technology. The process 1030 can be executed by the subsystem 800 discussed above with respect to FIG. 8 (e.g., operating in the electronic device 132 of FIG. 1) to help facilitate a handoff of control over (e.g., responsibility for supervision of) the supervised being. Purely by way of example, the process 1030 can be executed when a parent drops their child off at daycare, when a daycare rotates care providers, and/or when a parent comes to pick their child up from daycare.

The process 1030 begins at block 1032 with detecting a presence of a new responsible person. The presence can be detected through the shortrange communication component in the electronic device and a corresponding shortrange communication component associated with the new responsible person (e.g., via the shortrange communication component in the responsible person's phone and under the control of one of the subsystems 300, 400 of FIGS. 3 and 4). In some implementations, the detection process of block 1032 is generally similar to the checking process described above with reference to block 1002 (e.g., FIG. 10A). Purely by way of example, the electronic device can send periodically out a presence detection signal, then detect the presence of a new responsible person when a response is received from a new subsystem. As a result, the process 1030 can detect when a new responsible person is within a vicinity (e.g., in range of the shortrange communication component) of the supervised being.

At block 1034, the process 1030 includes initiating a handoff of the control over the supervised being from a first responsible person (e.g., a currently responsible person) to a second responsible person (e.g., the new responsible person). In various implementations, initiating the handoff can include sending a prompt to the first responsible person indicating the presence of the second responsible person within a vicinity of the supervised being and/or sending a prompt to the second responsible person indicating the presence of the supervised being and their current assignment to the first responsible person. The prompt can confirm that the first supervising person wants to handoff control over the supervised being to the second responsible person; confirm that the second responsible person wants to accept control over the supervised being; and/or receive an indication from the first and/or second responsible person declining the handoff.

At block 1036, the process 1030 includes determining if the handoff was confirmed. IN some implementations, the electronic device receives a notification from the first and/or second responsible person when the handoff is complete. In such implementations, the notification can help the electronic device keep track of who to send status updates to (e.g., using the process 1000 of FIG. 10A) and/or whose presence to check for (e.g., using the process 1020 of FIG. 10B). In some implementations, the electronic device sends a prompt to one of the first and/or second responsible persons to confirm whether the handoff was complete. In some implementations, if either of the first and/or second responsible persons fail to respond to the prompt (or any ensuing messages) within a predetermined time (e.g., a timeout period), the process 1030 can send a second prompt and/or determine that the handoff was not confirmed. In some implementations, the electronic device checks a record of control at the cloud server to determine whether the handoff was confirmed.

At decision block 1038, the process 1030 checks whether the handoff was confirmed. If the handoff was confirmed, the process 1030 continues to block 1040; else the process continues to block 1042.

At block 1040, responsive to determining that the handoff was not confirmed, the process 1030 includes sending an indication of an error to the first responsible person. The indication of the error alerts the first responsible person that no handoff occurred (e.g., thereby confirming that they still have control over the supervised being). Additionally, the indication of the error can include a cause for the error in the handoff, such as the handoff timing out based on a slow response from the second responsible person, the second responsible person declining the handoff, the supervised being becoming too far away from the second responsible person, and the like. In some implementations, the indication of the error also includes a prompt allowing the first supervising person to send a new request for the handoff.

At block 1042, responsive to determining the handoff was confirmed, the process 1030 includes sending an update indicating the handoff to the cloud server (e.g., via a shortrange message to the second responsible person with instructions to forward the update and/or in a direct message via a network and/or cellular communication component). The update can prompt the cloud server to update a record of control over the supervised being to reflect the handoff. As a result, purely by way of example, a third responsible person (e.g., a parent) can view the handoff (e.g., between two daycare providers) to monitor and/or review who is responsible for a child.

At block 1044, the process 1030 includes tethering the electronic device (and the subsystem thereon) to the second responsible person (e.g., to the subsystem in the second responsible person's smartphone). Tethering to the second responsible person can change which responsible person status updates are sent to, which responsible person is searched for to monitor control over the supervised being, and/or which responsible person is alerted by detected events and/or detected separations. In some implementations, the process 1030 implements block 1044 before implementing block 1042. In some implementations, the process 1030 implements block 1042 and block 1044 generally simultaneously.

Figure 11A:
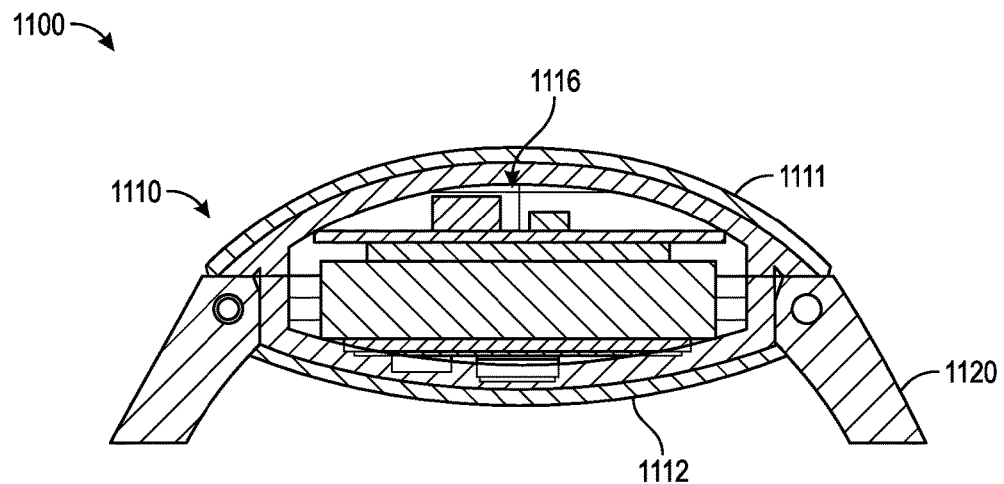
FIGS. 11A and 11B are a cross-sectional and an isometric view, respectively, of a wearable device for use by a supervised being in accordance with some implementations of the present technology.
Figure 11B:
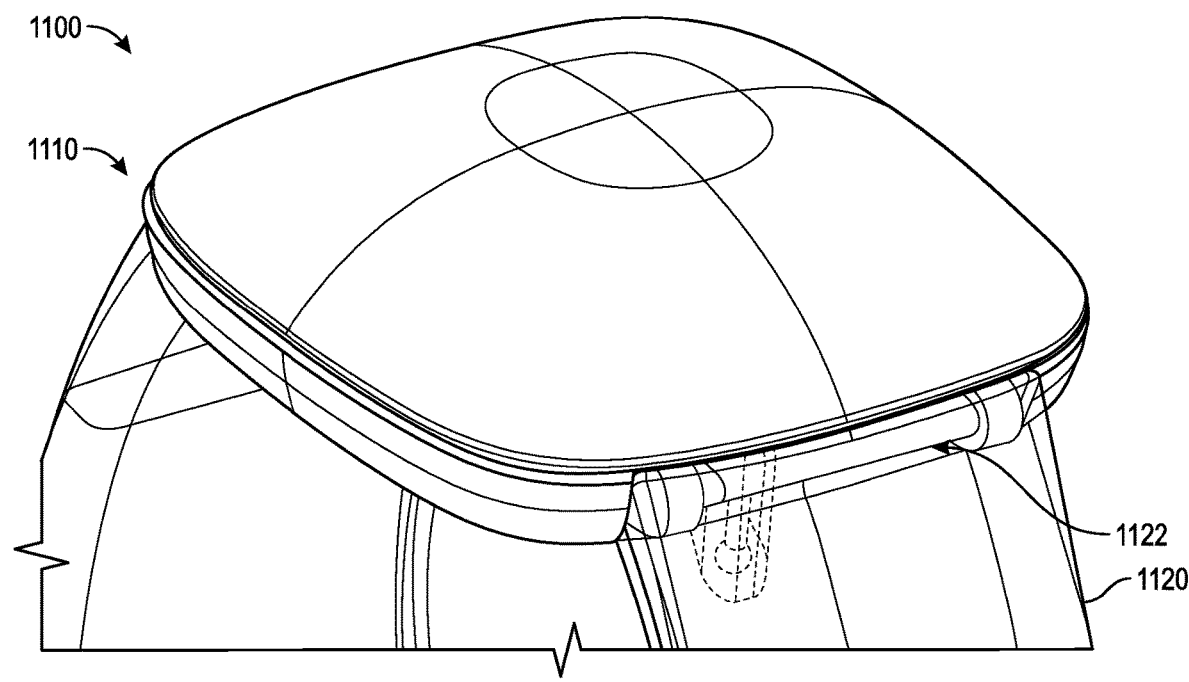

FIGS. 11A and 11B are a cross-sectional and an isometric view, respectively, of a wearable device 1100 for use by a supervised being in accordance with some implementations of the present technology. FIGS. 11A and 11B illustrate additional details on the organization of components within the wearable device 1100. For example, as illustrated, the wearable device 1100 includes an electronics housing 1110 that includes an upper portion 1111 and a lower portion 1112 joined to the upper portion 1111, thereby creating an internal space for electronics 1116 that is protected from physical impacts and/or potential contaminants (e.g., water, dirt, sweat, and the like).

In some implementations, the upper portion 1111 and the lower portion 1112 are joined by ultrasonic welder. The ultrasonic welder can create a strong, complete seal between the upper portion 1111 and the lower portion 1112 without the use of any potentially harmful chemicals at the joint. As a result, the electronics housing 1110 can be sealed from contaminants without introducing a potential source of harm to a supervised being wearing the wearable device 1100. Further, because the ultrasonic welder does not require additional materials to seal the joint between the upper portion 1111 and the lower portion 1112, the ultrasonic welding process can help save space for the electronics 1116. In various implementations, the upper portion 1111 and the lower portion 1112 can be joined by a compression bonding process, an O-ring connection, and/or an adhesive bonding process.

As further illustrated in FIGS. 11A and 11B, the electronics housing 1110 is connected to a flexible strap 1120 by a spring bar component 1122. Spring bars are commonly used to join watch faces to wrist straps because they form a reliable connection and partially bias the straps toward the wearer's wrist. Accordingly, for example, the spring bar component 1122 can help facilitate attaching the flexible strap 1120 around the wrist (or ankle) of the supervised being.

Figure 12A:
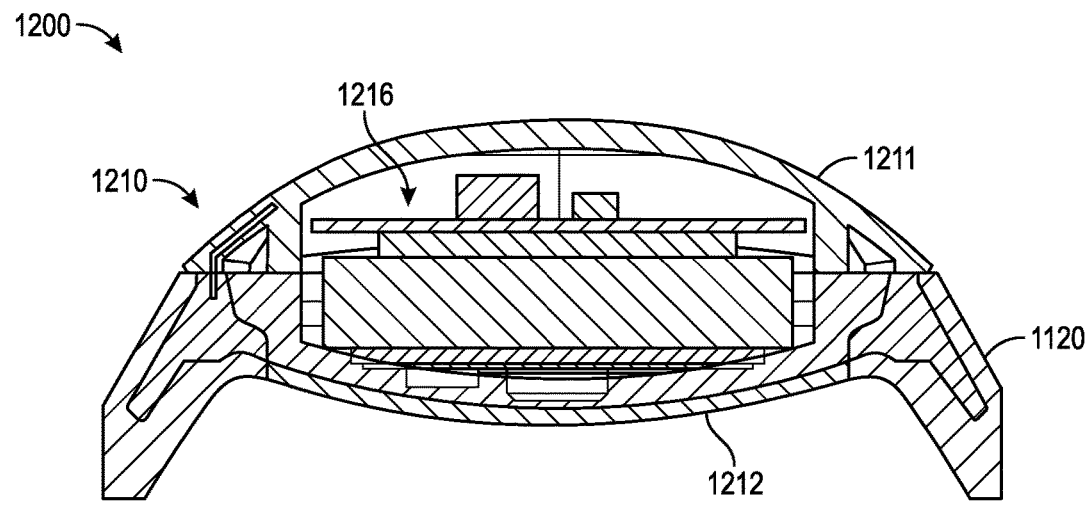
FIGS. 12A and 12B are a cross-sectional and a bottom view, respectively, of a wearable device for use by a supervised being in accordance with some implementations of the present technology.
Figure 12B:
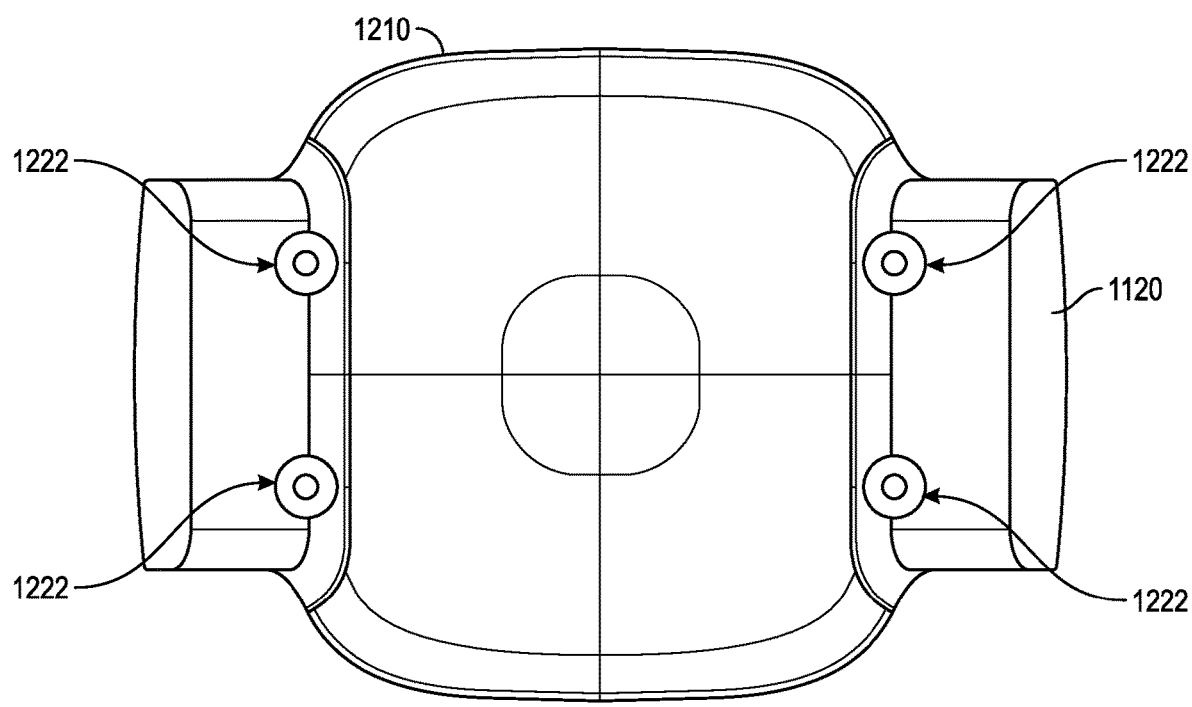

FIGS. 12A and 12B are a cross-sectional and a bottom view, respectively, of a electronic device 1200 for use by a supervised being in accordance with some implementations of the present technology. As illustrated in FIGS. 12A and 12B, the electronic device 1200 is generally similar to the electronic device 1100 discussed above with respect to FIGS. 11A and 11B. For example, the electronic device 1200 includes an electronics housing 1210 with an upper portion 1211 and a lower portion 1212, as well as a flexible strap 1220 connected to the electronics housing 1210. As best illustrated in FIG. 12B, however, the flexible strap 1220 is attached to the electronics housing 1210 with one or more fasteners 1222 (e.g., screws, bolts, pins, and the like). In some implementations, the fasteners 1222 allow the flexible strap 1220 to be quickly and easily swapped, for example to change sizes as the supervised being grows and/or as the flexible strap 1220 wears out. In some implementations, the fasteners 1222 can save space for the electronics 1226 within the electronics housing 1210, thereby helping to reduce the overall footprint of the electronic device 1200.

Figure 15A:
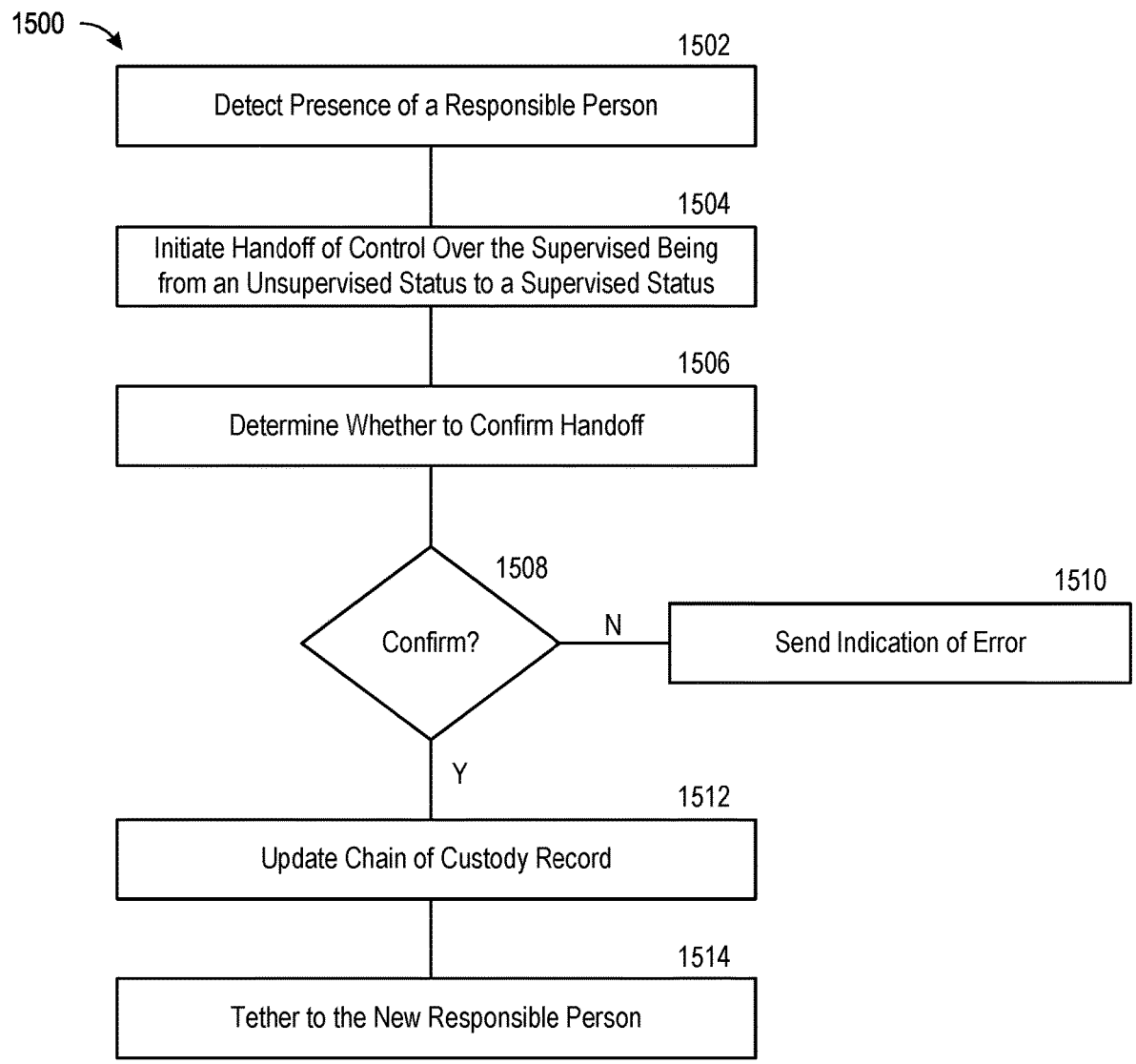
FIGS. 15A-15C are a flow diagrams of processes for completing a handoff of the supervising responsibilities and/or control over a supervised being in accordance with further implementations of the present technology.
Figure 15B:
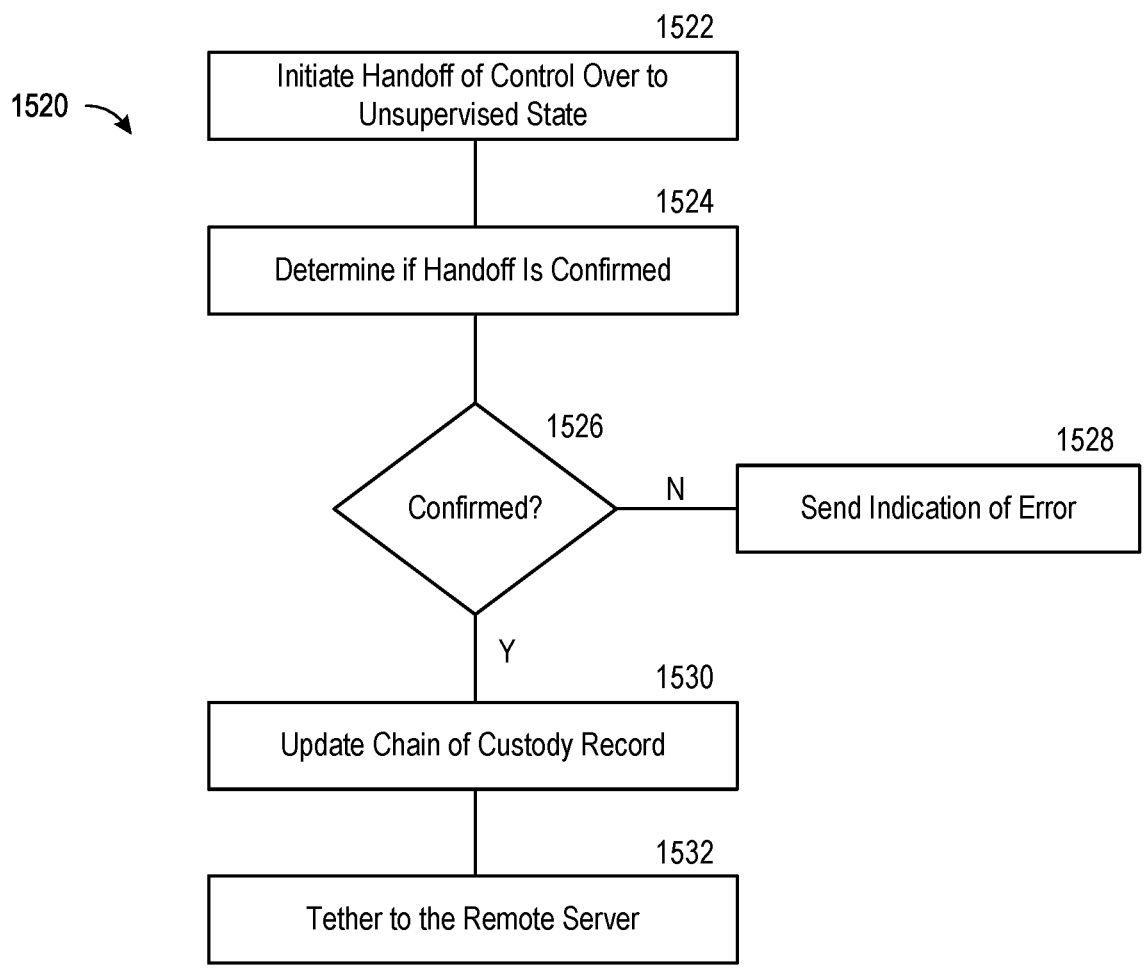
Figure 15C:
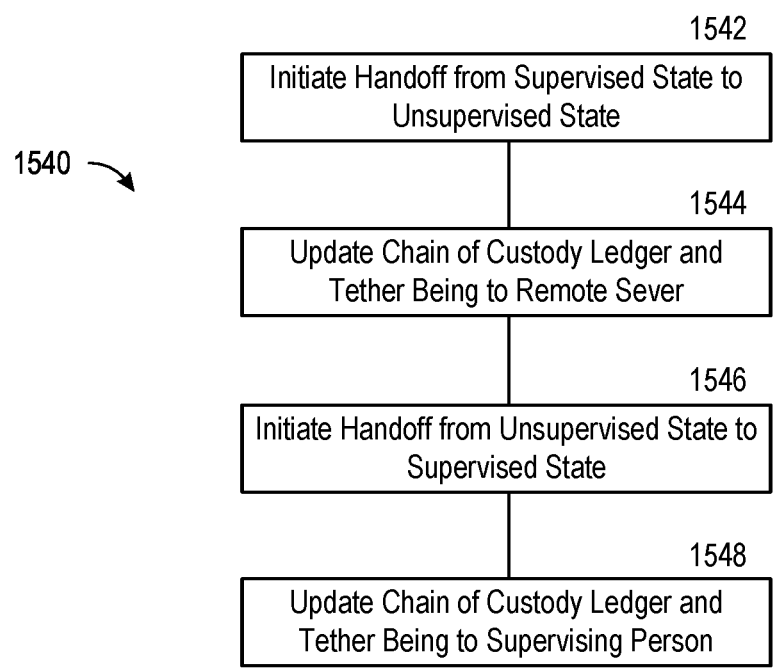

FIGS. 15A-15C are a flow diagrams of processes 1500, 1520, 1540 for completing a handoff of the supervising responsibilities and/or control over a supervised being in accordance with further implementations of the present technology. In particular, FIGS. 15A-15C illustrate various processes 1500, 1520, 1540 for transitioning a supervised being between various supervised and unsupervised states in accordance with some embodiments of the present technology. The unsupervised states can be useful, for example, to help monitor the care of pets, livestock elderly people, differently abled persons, and/or various other beings that transition between periods of supervision and non-supervision. In various embodiments, the processes 1500, 1520, 1540 can be executed by either of the subsystems 300, 400, 800 described above and/or the subsystem 1600 described below in conjunction with the server 140 of FIG. 1 to facilitate and record a handoff of the supervising responsibilities over of the supervised being. Purely by way of example, the process 1500 of FIG. 15A can be implemented at least in part by the subsystem 800 of FIG. 8 and/or the remote server 140 of FIG. 2 to automatically tether an elderly person to various care providers as they move throughout an assisted living community. In another example, the process 1520 of FIG. 15B can be implemented at least in part by the subsystem 400 of FIG. 4, on behalf of a pet sitter, to initiate control over a pet during a drop-in visit.

The process 1500 illustrated in FIG. 15A begins at block 1502 by detecting a presence of a responsible person (e.g., a controlling person and/or a supervising person). In various implementations, detecting the presence of the responsible person can include receiving a response to a presence detection signal, checking whether a known device (e.g., that includes one of the subsystems 300, 400 of FIGS. 3 and 4) is within a proximity of a shortrange communication component, detecting motion within a proximity of the supervised being and searching for an electronic device, receiving a presence detection signal from a device associated with the responsible person, receiving an indication from the device associated with the responsible person that they are in the vicinity of the supervised being, and/or receiving geographic location information (e.g., GPS signals) from the supervising person and/or the responsible person.

At block 1504, the process 1500 includes initiating a handoff of the control over the supervised being from an unsupervised status (also referred to herein as an "unsupervised status") to a supervised status (also referred to herein as a "supervised state"). In various implementations, initiating the handoff can include sending a prompt to the detected responsible person indicating the indicating the presence of the supervised being and/or their current unsupervised status. The prompt can confirm that the detected responsible person wants to accept control over the supervised being. In some implementations, initiating the handoff includes sending a prompt to one or more other responsible persons (e.g., a controlling person, such as a pet owner, primary care provider, and the like) to confirm that the handoff is acceptable. Additionally, or alternatively, initiating the handoff can include sending a prompt to a remote server (e.g., the remote server 140 of FIG. 2) to check the handoff against one or more control rules (or initiating the check when the process 1500 is implemented by the remote server).

At block 1506, the process 1500 includes determining whether to confirm the handoff. In various implementations, the determination can be based at least partially on whether a confirmation of the handoff was received from the detected responsible person (e.g., whether the detected responsible person confirmed they want to accept control over the supervised being), whether a confirmation of the handoff was received from the other responsible person(s) (e.g., whether a controlling person confirms the handoff is acceptable), and/or whether the handoff complies with the control rules. For example, determining whether to confirm the handoff can include receiving a confirmation from the detected responsible person that they will accept control over the responsible person, then checking whether the handoff complies with the control rules for the handoff. The control rules can include time constraints for the handoff requiring the handoff to occur within a preset window (e.g., between 11:00 AM and 1:00 PM), rules for who can take control over the supervised being (e.g., approved care providers, pet sitters, and the like), geographic locations for the control (e.g., requiring an elderly person be in a recreational area of an assisted living community before a care provider can assume control over the elderly person), and/or any other suitable control rules. In a specific, non-limiting example, the control rules can require a handoff for a drop-in visit from a pet sitter occur between 11:00 AM and 2:00 PM based on a scheduled booking with the pet sitter. As a result, the handoff can be declined when the pet sitter arrives too early (e.g., and therefore would be leaving the animal unattended after the drop-in visit for too long) and/or arrives late and therefore is not worth paying to visit with the animal before the pet owner will return).

At decision block 1508, the process 1500 checks whether the handoff was confirmed. If the handoff was confirmed, the process 1500 continues to block 1512; else the process continues to block 1510.

At block 1510, responsive to determining that the handoff was not confirmed, the process 1500 includes sending an indication of an error to the detected responsible person, the other responsible person (e.g., the controlling person), and/or any other suitable recipient. The indication of the error alerts the detected responsible person and/or the other responsible person that no handoff occurred (e.g., thereby indicating that the supervised being remains in the unsupervised status). Additionally, the indication of the error can include a cause for the error in the handoff, such as the handoff being declined by the other responsible person, an explanation for why the other responsible person declined the handoff, a confirmation the detected responsible person declined the handoff request, an indication that the handoff failed one of the control rules (e.g., because the handoff was initiated before the preset window, after the preset window, and the like), a time-out at the remote server while processing the request, and/or various other suitable explanations. In some implementations, the indication of the error also includes a prompt allowing the detected responsible person and/or any other suitable recipient to initiate a new request for the handoff. For example, a pet-sitter that arrives a few minutes too early for a drop-in visit according to the control rules can restart the handoff request at the appropriate time.

At block 1512, responsive to determining the handoff was confirmed, the process 1500 includes updating a chain of custody record. In some implementations, the remote server implements all, or part, of the process 1500 and updates the chain of custody record stored thereon. In some implementations, updating the chain of custody record includes indicating the handoff to the remote server (e.g., via a shortrange message to the detected responsible person with instructions to forward the update and/or in a direct message via a network and/or cellular communication component, via a network connection, and the like). The update can prompt the remote server to update the chain of custody record of to reflect the change from the unsupervised status to the supervised status under the control of the detected responsible person. As a result, purely by way of example, the other responsible person (e.g., a pet owner, parent or guardian, and the like) can view the handoff and/or view the current status of the supervised being (e.g., an elderly parent, a pet, and the like).

At optional block 1514, the process 1500 includes tethering an electronic device (and the subsystem thereon) associated with the supervised being to the detected responsible person (e.g., to the subsystem in the responsible person's smartphone). Tethering to the detected responsible person can change how status updates are sent the remote server from an electronic device associated with the supervised being (e.g., from a network or cellular component to a shortrange component), which responsible person is searched for to monitor control over the supervised being, and/or which responsible person is alerted by detected events and/or detected separations. Purely by way of example, a pet can be wearing an electronic device that measures a location of the pet and/or various bioindicators of the pet (e.g., heart rate, exercise levels, skin conductivity, and/or the like). While the pet is unsupervised, the electronic device can communicate updates to the remote server through a network connection (e.g., via a home wifi connection) and/or a cellular connection. When a pet sitter comes for a drop-in, the electronic device can tether to the pet sitter's smartphone, allowing the electronic device to continue to send updates via a shortrange communication component while the pet sitter takes the pet on a walk.

FIG. 15B illustrates a process 1520 for placing the supervised being in the unsupervised status (e.g., when a pet owner leaves their pet, after a drop-in visit with a pet, when an elderly person wants to leave an assisted living facility (e.g., for a day trip), when livestock is dropped in a grazing location, and/or the like). The process 1520 begins at block 1522 by initiating a handoff from the supervised status to the unsupervised status. Block 1522 can be implemented in response to a request from a responsible person currently supervising the supervised being. In some implementations, initiating the handoff includes sending a request to a remote server and/or a controlling person to request the handoff.

The request allows the remote server to check if the handoff complies with one or more control rules for the supervised being, such as preset time frames for the handoff (e.g., at least a preset time after the responsible person took control over the supervised being, such as thirty minutes, one hour, and/or any other suitable time; between 1:00 PM and 4:00 PM; and the like), that the supervised being is in an acceptable geographic location (e.g., checking that a pet is within a home when the pet sitter leaves, that livestock is being dropped in an approved grazing location, and the like), and/or various other suitable control rules. Additionally, or alternatively, the request allows a controlling person to veto a handoff to the unsupervised status (e.g., when they can see that a pet sitter has not been at the drop-in for as long as they paid for, when a guardian does not want an elderly person leaving a care facility, and/or the like).

At block 1524, the process includes determining if the handoff is confirmed. In various implementations, determining if the handoff is confirmed can include confirming the handoff with the remote server based on the control rules discussed above and/or confirming the handoff with a controlling person. At decision block 1526, the handoff was confirmed, the process 1500 continues to block 1530; else the process continues to block 1528.

At block 1528, responsive to determining that the handoff was not confirmed, the process 1520 includes sending an indication of an error to the currently responsible person and/or any other suitable recipient (e.g., the controlling person). The indication of the error alerts the currently responsible person the handoff failed (e.g., thereby indicating that the supervised being remains in the supervised status under their control). Additionally, the indication of the error can include a cause for the error in the handoff, such as the handoff being declined by the controlling person, an explanation for why the controlling person declined the handoff, an indication that the handoff failed one of the control rules (e.g., because the handoff was initiated before the preset window (e.g., before a pet sitter spent thirty minutes with the pet), after the preset window (e.g., after a curfew at an assisted living facility), and the like), a time-out at the remote server while processing the request, and/or various other suitable explanations. In some implementations, the indication of the error also includes a prompt allowing the currently responsible person to re-initiate the handoff. For example, a pet-sitter that initiated the handoff before spending an agreed-upon time (e.g., a paid amount of time) with the pet can re-initiate the handoff after the appropriate period.

At block 1530, responsive to determining the handoff was confirmed, the process 1520 includes updating a chain of custody record. In some implementations, the remote server implements all, or part, of the process 1520 and updates the chain of custody record stored thereon. In some implementations, updating the chain of custody record includes indicating the confirmed handoff to the remote server (e.g., via a network and/or cellular communication component, via a network connection, and the like). The update can prompt the remote server to update the chain of custory record of to reflect the change from the supervised status to the unsupervised status. As a result, purely by way of example, the another responsible person (e.g., a pet owner, parent or guardian, and the like) can view the handoff and/or view the current status of the supervised being (e.g., an elderly parent, a pet, and the like).

At optional block 1532, the process 1520 includes tethering an electronic device (and the subsystem thereon) associated with the supervised being to the remote server (e.g., via a network and/or cellular communication component). Tethering directly to the remote server can change how status updates are sent the remote server from the electronic device associated with the supervised being and/or which responsible person(s) are alerted in response to detected events (e.g., stress events). Purely by way of example, when an elderly person is in an unsupervised state, they can wear an electronic device (e.g., of the type discussed above with reference to FIGS. 8-12B). The electronic device can monitor bioindicators for the elderly person, which may be used to help detect an emergency and/or one or more stress events. When the elderly person is in the unsupervised status, the updates sent to the remote server can prompt the remote server to alert a controlling person (e.g., a guardian and/or loved one) and/or one or more emergency contacts. When the elderly person is in the supervised status, the updates can prompt the remote server to alert the responsible person.

FIG. 15C illustrates a process 1540 for tracking the status of a semi-autonomous supervised being in accordance with further embodiments of the present technology. The process 1540 can be useful, for example, for a supervised being that repeatedly goes in and out of a supervised status (e.g., livestock moving between fields, an elderly person in an assisted living community, a pet that has one or more drop-in visits while pet owners are away, and the like). The process 1540 can be implanted by a subsystem on an electronic device (e.g., the subsystem 800 of FIG. 8), a remote server (e.g., the remote server 140), and/or another suitable device to automatically (or conveniently) track the status of the supervised being. As discussed in more detail below, the process 1540 includes steps generally similar to some of the steps of the processes 1500, 1520, discussed above with reference to FIGS. 15A and 15B.

The process 1540 begins at block 1542 by initiating a handoff from a supervised state (also referred to herein as a "supervised status") to an unsupervised state (also referred to herein as a "unsupervised status"). Block 1542 can be implemented in response to a detected departure of a responsible person (e.g., when a pet owner leaves their home for the day) and/or a detected departure of a supervised being (e.g., when an elderly person leaves an assisted living neighborhood, when an elderly person leaves s supervised room in an assisted living community, when livestock roams from a supervised field to an unsupervised field, and the like). The detection can be based on a loss of communication between one or more electronic devices via a shortrange communication component (e.g., loss of proximity detection), GPS signals, an active input from the responsible person and/or the supervised being, and/or various other suitable detection mechanism. Similar to the discussions above, initiating the handoff can include sending a prompt to the remote server (e.g., the remote server 140 of FIG. 1, or initiating a prompt at the remote server) to confirm the handoff complies with one or more control rules and/or sending a prompt to the electronic device associated with the responsible person to confirm they want to complete a handoff. Additionally, or alternatively, the initiating the handoff can include sending a prompt to the electronic device associated with the supervised being to confirm the handoff. The prompt to the supervised being can allow, for example, an elderly person in an assisted living facility to conveniently check themselves out when leaving the facility for the day. In some implementations, the process 1540 initiates the handoff at block 1542 in response to a request from a current responsible person and/or a request from a supervised being. For example, the request can be received from an elderly person at an assisted living facility in order to check out for an errand and/or day trip. In another example, the request can be from a pet owner as they leave their home for the day.

At block 1544 the process 1540 includes updating a chain of custody ledger and tethering the electronic device associated with the supervised being to the remote server. The process 1540 at block 1544 can be generally similar to the process 1520 at blocks 1530 and 1532 discussed above with reference to FIG. 15B. For example, when remote server implements all, or part, of the process 1540, the remote server can execute a script to update the chain of custody record stored thereon. In other implementations, updating the chain of custody record includes indicating the handoff to the remote server (e.g., via a network and/or cellular connection). The update can prompt the remote server to update the chain of custody record of to reflect the change from the supervised state to the unsupervised state. Further, similar to the discussion above, tethering the electronic device associated with the supervised being to remote server can change how status updates (e.g., measured bioindicators) are sent to the remote server from the electronic device and/or which responsible person(s) are alerted in response to detected events (e.g., stress events). Purely by way of example, when an elderly person is in an unsupervised state, they can wear an electronic device (e.g., of the type discussed above with reference to FIGS. 8-12B). The electronic device can monitor bioindicators for the elderly person, which may be used to help detect an emergency and/or one or more stress events. When the elderly person is in the unsupervised status, the updates sent to the remote server can prompt the remote server to alert a controlling person (e.g., a guardian and/or loved one) and/or one or more emergency contacts. When the elderly person is in the supervised status, the updates can prompt the remote server to alert a currently responsible person.

At block 1546, the process 1540 includes initiating a handoff from the unsupervised state to the supervised state. The initiation at block 1546 can be made in response to detecting a responsible person in a vicinity of the supervised being (e.g., within shortrange communication range), a prompt from a responsible person (e.g., requesting control over the supervised being), a location of the supervised being (e.g., as an elderly person enters a supervised region of an assisted living facility, as livestock enters a supervised field, and the like), a preset time (e.g., a time selected for an appointment with a doctor, a time scheduled for a drop-in visit from a pet sitter, and the like), and/or any other suitable trigger. Initiating the handoff can be generally similar to the process 1500 at block 1504 discussed above with reference to FIG. 15A. for example, initiating the handoff can include confirming the handoff complies with one or more control rules, confirming the responsible person will take control over the supervised being, and the like.

At block 1548, the process 1540 includes updating the chain of custody ledger and tethering the electronic device associated with the supervised being to the new responsible person (e.g., and an electronic device associated with the responsible person). The process 1540 at block 1548 can be generally similar to the process 1500 at blocks 1512 and 1514 discussed above with reference to FIG. 15A. For example, the process 1540 can include sending a prompt to the remote server and/or executing a script at the remote server to update a chain of custody stored thereon. Further, the process 1540 can include coupling a shortrange communication component of the electronic device associated with the supervised being to the electronic device associated with the new responsible person. The coupling can allow the electronic device associated with the supervised being to communicate updates (e.g., bioindicators) to the remote server via the electronic device associated with the new responsible person.

Figure 16:
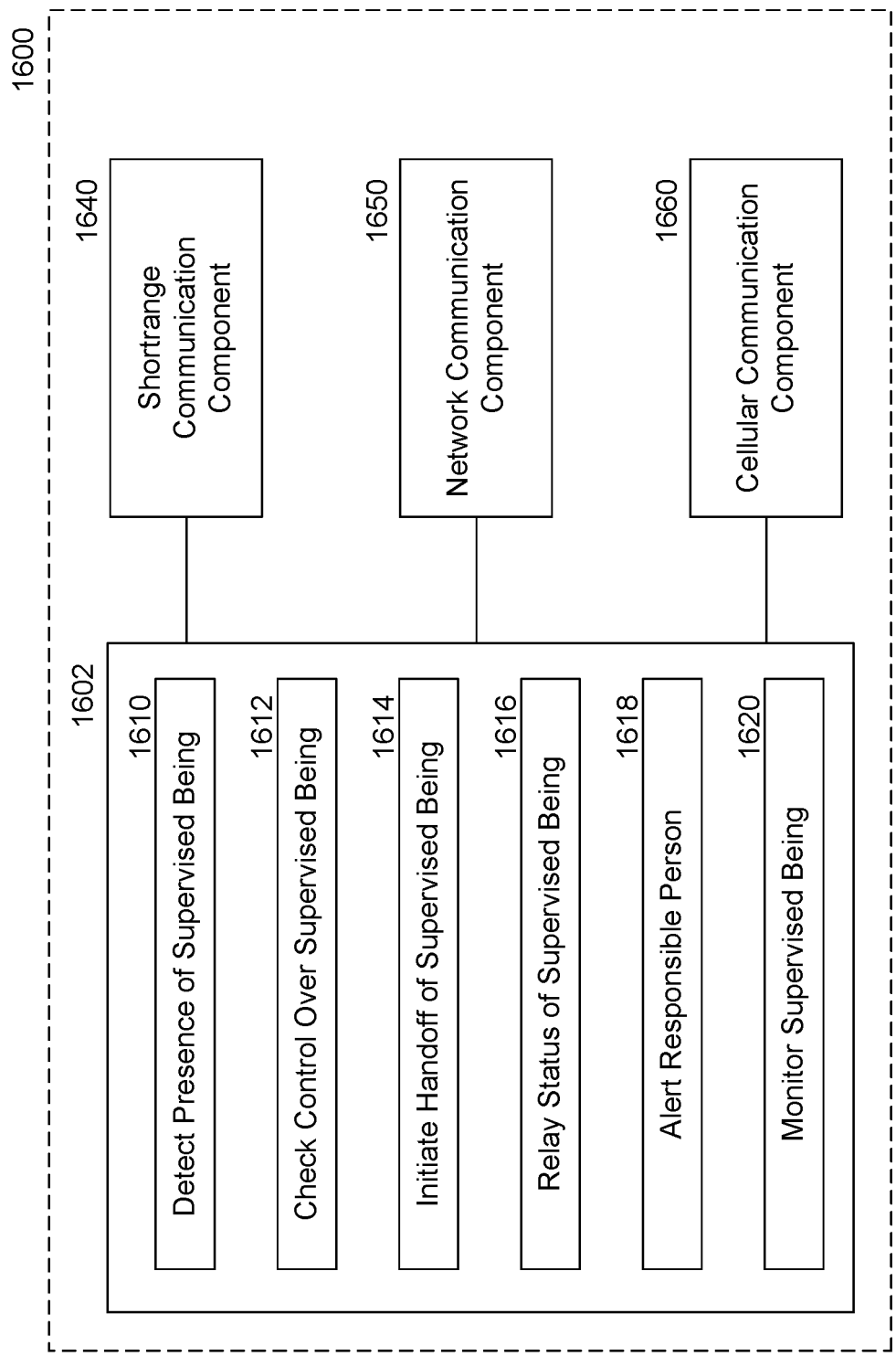
FIG. 16 is a schematic diagram of a platform for a field-deployed electronic device for monitoring a supervised being in accordance with some implementations of the present technology.

FIG. 16 is a schematic diagram of a subsystem 1600 for a field-deployed electronic device for monitoring a supervised being in accordance with some implementations of the present technology. The subsystem 1600 can be deployed in the beacons 190 discussed above with respect to the system 100 of FIG. 1. Similar to the subsystems 300, 400, 800 discussed above with respect to FIGS. 3, 4, and 8 the subsystem 1600 can include an operating platform 1602 ("platform 1602") with one or more modules (six shown, referred to individually as first-sixth modules 1610-1620), a shortrange communication component 1640, a network communication component 1650, and a cellular communication component 1660. As further illustrated in FIG. 16, the platform 1602 is operably coupled to each of the shortrange communication component 1640, the network communication component 1650, and the cellular communication component 1660, allowing the modules in the platform 1602 to communicate with other subsystems and devices locally and/or over a network.

The first module 1610 allows the platform 1602 to detect a presence of a supervised being. In various implementations, the detection can be based at least partially on proximity signals received from an electronic device on the supervised being (e.g., via the shortrange communication component 1640), radiofrequency identification (RFID) reads, motion sensors, heat sensors, image sensors and image analysis modules, and/or various other suitable mechanisms. The detection can prompt the platform 1602 to establish communication with the supervised being to support various other functions of the subsystem 1600.

In the second module 1612, the platform 1602 checks control over the supervised being. For example, the second module 1612 can control the network communication component 1650 and/or the cellular communication component 1660 to communicate with a remote server (e.g., the remote server 140 of FIG. 1) to check a chain of custody ledger for the supervised being.

In the third module 1614, the platform 1602 can initiate and/or execute a handoff of control over and/or the status of the supervised being. The initiation (or execution) can be generally similar to the processes 1500, 1520, 1540 discussed above with reference to FIGS. 15A-15C in response to the detection of the supervised being in the first module 1610. For example, after detecting the supervised being, the platform 1602 can implement the third module 1614 by sending a request for the handoff to a remote server. The request allows the remote server (e.g., the remote server 140 of FIG. 1) can confirm that the handoff complies with one or more control rules. For example, the remote server can confirm that the time, location, requested status change (e.g., from a supervised status to an unsupervised status), and the like comply with control rules for the supervised being. In a specific, non-limiting example, the supervised being can be a livestock animal detected moving into a new field, which can be unsupervised, under different control (e.g., supervised by another rancher), more (or less) remote than the previous field, have other livestock currently grazing, and/or the like. In this example, the remote server can confirm that the livestock is allowed to move into the new field based on the control rules and, if so, approve the handoff. If the livestock is not approved, the remote server can deny the handoff and alert the platform 1602 and/or the currently responsible person.

Additionally, or alternatively, the platform 1602 can implement the third module 1614 by sending a request for the handoff to a currently responsible person (e.g., based on a result from the second module 1612). The request can allow the currently responsible person to approve or deny the handoff and/or to track the status of the supervised being. Returning to the specific example above, the handoff request can allow a currently responsible person (e.g., a rancher) to better track the movement of their livestock.

In another specific, non-limiting example, the third module 1614 can help track the movement of an elderly person in an assisted living community. Beacons throughout the community can detect their movement in the first module 1610 while the third module 1614 can update their status as they move. For example, the third module 1614 can transition the elderly person between supervised and unsupervised statuses as they enter and leave supervised areas (e.g., recreational areas), transition the elderly person from a first supervising person (e.g., a care provider responsible for a recreational area) to a second supervising person (e.g., a care provider responsible for a food hall), and the like. Additionally, or alternatively, the third module 1614 can help ensure that the movement of the elderly person complies with control rules for the elderly person (e.g., such that they are in a supervised status when required based on their needs, that an appropriate care provider is supervising them, and the like). Additionally, or alternatively, the third module 1614 can help ensure that the care providers in the assisted living community are alerted as they become responsible (or not responsible) for an elderly person as they move around.

In the fourth module 1616, the platform 1602 can relay the status of a supervised being to one or more responsible persons. The platform 1602 can implement the fourth module 1616 to alert multiple responsible persons associated with a supervised being when their status changes (e.g., from a supervised status to an unsupervised status). In a specific, non-limiting example, the fourth module 1616 can relay status changes for an elderly person to one or more caregivers as the elderly person moves throughout an assisted living facility. Additionally, or alternatively, the fourth module 1616 can relay the status changes to a guardian (e.g., a child or other guardian). In some implementations, the responsible persons alerted are dependent on the status change itself. Returning to the example above, only the caregivers may be alerted when the status of the supervised being changes from supervised by a first caregiver to a second caregiver, but a guardian may be alerted when the status changes to unsupervised.

In the fifth module 1618, the platform 1602 can alert one or more responsible person(s) to a location and/or physical status of the supervised being. For example, the alert can indicate that the supervised being was detected in an unauthorized location (e.g., when livestock moves to a field that is not safe, closed, and/or otherwise unauthorized). In another example, the alert can be based on one or more bioindicators received from an electronic device on the supervised being (e.g., indicating that the supervised being experienced (or is experiencing) a health or stress event). The alert can allow the responsible person(s) to view the location, physical status, and the like and respond appropriately. In a specific, non-limiting example, the alert can indicate that an elderly person in an assisted living community is having a health event (e.g., heart attack, stroke, and the like), allowing caregivers in the community to quickly provide necessary medical care. In another specific, non-limiting example, the alert can indicate that a livestock animal suffered an injury, allowing a rancher to locate the livestock and provide (or obtain) necessary medical care.

In the sixth module 1620, the platform 1602 can monitor a supervised being in a vicinity of the subsystem 1600. In some implementations, monitoring the supervised being includes tethering the supervised being (e.g., via an electronic device associated with the supervised being) to receive updates on the supervised being (e.g., bioindicators, analyses of bioindicators, stored bioindicators, location data, travel data, and the like). Additionally, or alternatively, the subsystem 1600 can include one or more sensors (e.g., cameras, thermal sensors, skin temperature sensors, hydration sensors, fluid dispensing sensors, food dispensing sensors, motion sensors, motion trackers, microphones and other audio sensors, and/or the like) that record the supervised being. In such implementations, the sixth module 1620 can allow the platform 1602 to analyze information from the sensors to monitor the supervised being (e.g., monitor activity levels, stress levels, hydration levels, how much food a supervised being has consumed, how much water a supervised being has consumed, skin temperature, and/or various other suitable factors). The information can then be relayed to the remote server to be accessible by various responsible persons and/or sent directly to one or more responsible persons to update them on the physical status of a supervised being.

Figure 17:
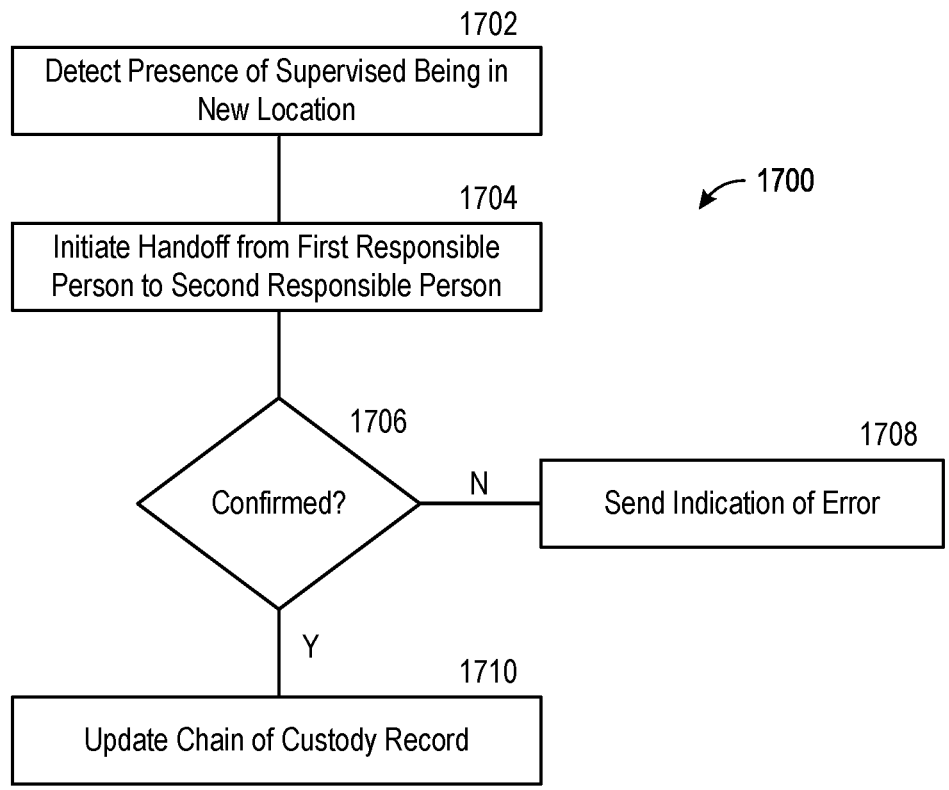
FIG. 17 is a flow diagram of a process for completing a handoff of remote supervision responsibilities and/or control over a supervised being in accordance with further implementations of the present technology.

FIG. 17 is a flow diagram of a process 1700 for completing a handoff of remote supervision responsibilities and/or remote control over a supervised being in accordance with further implementations of the present technology. The process 1700 can be implemented to help track the status of supervised beings that do not require constant supervision, such as elderly persons, older children, pets, livestock, and the like. In some implementations, the process 1700 can be executed by the subsystem 1600 of FIG. 16 and/or the server 140 of FIG. 1 to remotely facilitate and record a handoff of the supervising responsibilities over of the supervised being.

The process 1700 begins at block 1702 by detecting a presence of the supervised being in a new location. In various implementations, detecting the presence of the supervised being can include receiving a response to a presence detection signal (e.g., at the subsystem 1600 of FIG. 16), receiving a presence detection signal (e.g., from the subsystem 800 of FIG. 8), detecting motion and identifying the supervised being (e.g., by searching for an electronic device, using one or more biomarkers, probabilistic determinations, and the like) and/or otherwise physically identifying the supervised being (e.g., monitoring a door, gate, and/or the like that is only actioned by the supervised being), reading a nearby RFID tag, receiving geographic location information (e.g., GPS signals) from the supervised being indicating they are nearby, and/or the like. In a specific, non-limiting example, detecting the supervised being can include detecting motion in a vicinity of a field-deployed beacon then sending proximity signals to search for an electronic device (or RFID tag) associated with the supervised being near the beacon.

At block 1704, the process 1700 includes initiating the handoff of control over the supervised being. In some implementations, the handoff transfers the supervised being from control by a first responsible person to a second responsible person when the supervised being is detected in a new location controlled by the second responsible person. In a specific, non-limiting example, as livestock moves between fields, the livestock may roam between fields controlled and/or otherwise supervised by different ranchers (or other suitable parties). In this example, field-deployed beacons can initiate the handoff between relevant responsible persons to keep the responsible persons apprised of who has control over the livestock at any given time. In another specific, non-limiting example, various zones of an assisted living community may be controlled and/or otherwise supervised by different caregivers. For example, a first caregiver can supervise a food area while a second caregiver supervises a recreational hall. In this example, the field-deployed beacons can initiate the handoff between relevant caregivers as elderly persons move throughout the community. In some implementations, the handoff transfers the supervised being from a supervised state to an unsupervised state (or vice versa) as the supervised person is detected in new locations. In a specific, non-limiting example, a field-deployed beacon can detect an elderly person leaving an assisted living community (e.g., to run errands, go on a day trip, and the like) and transfer the elderly person to an unsupervised status as they leave.

In various embodiments, the initiation process at block 1704 can be generally similar to the initiating processes discussed above with reference to FIGS. 15A-15C. For example, initiating the handoff can include sending a prompt to the remote server (e.g., the remote server 140 of FIG. 1) to confirm the handoff complies with one or more control rules. The control rules can include authorized and/or unauthorized locations for the supervised being (e.g., fields or ranch locations livestock is not allowed to travel to, for example while keeping two bulls separated), allowed times for the handoff, one or more authorized responsible persons (or unauthorized responsible persons), required bioindicators for the handoff (e.g., requiring an elderly person to have suitable bioindicators before entering a recreational area, such as a suitable heart rate, hydration level, skin conductivity level and the like before engaging in physical exercise), and/or any other suitable control rules. Additionally, or alternatively, initiating the handoff can include sending a prompt to the electronic device associated with the first and/or to the second responsible person confirm the handoff. The prompt can allow the first and/or second responsible person to review the handoff. For example, the second responsible person may not be able to accept the handoff when they are already fully engaged supervising one or more other supervised beings. In another example, the first supervised being may not want to transfer control over the supervised being (e.g., when they have undesirably wandered off). Additionally, or alternatively, initiating the handoff can include sending a prompt to the electronic device associated with the supervised being to confirm the handoff. The prompt to the supervised being can allow, for example, an elderly person in an assisted living facility to confirm they want to transfer their supervision between caregivers (or to transfer to an unsupervised state).

At decision block 1706, the process 1700 checks whether a confirmation of the handoff was received. If the handoff was confirmed, the process 1700 proceeds to block 1710, else the process proceeds to block 1708. The confirmation can be received from the remote server (e.g., when the handoff complies with the control rules for the supervised being), the first responsible person, the second responsible person, and/or the supervised being in response the prompts. In some implementations, the handoff is only confirmed if every party prompted for the handoff confirms the handoff. Said another way, if any of the remote server, first responsible person, the second responsible person, and/or the supervised being denies the handoff, the handoff is not confirmed and the process 1700 proceeds to block 1708.

When the handoff is not confirmed, at block 1708, the process 1700 includes sending an indication of error to the remote server, first responsible person, the second responsible person, and/or the supervised being. The indication of error can alert, for example, the first or second responsible person that the other responsible person declined the handoff and/or that the handoff does not comply with the control rules at the remote server. For example, when the second responsible person cannot accept the supervision of the supervised being, the indication of error can alert the first responsible person to retrieve the supervised being from the detected location. In some implementations, the indication of error includes an explanation for the error. For example, the second responsible person can indicate that they are overloaded when they decline the handoff request to help indicate a reason for the declined handoff to the first responsible person.

When the handoff is confirmed, at block 1710, the process 1700 includes updating a chain of custody record at the remote server. Similar to the processes discussed above, updating the chain of custody record can include sending a prompt to the remote server reflecting the handoff. In some implementations, the prompt also includes a record of the location of the handoff (e.g., a location of a field-deployed beacon), allowing the record to roughly track movement of the supervised being. The update can allow any responsible person with access to the chain of custody record to review the current status of the supervised being, when handoffs occurred, who has been responsible for the supervised being and when, where handoffs occurred, and the like.

Suitable Computer Environments

Figure 13:
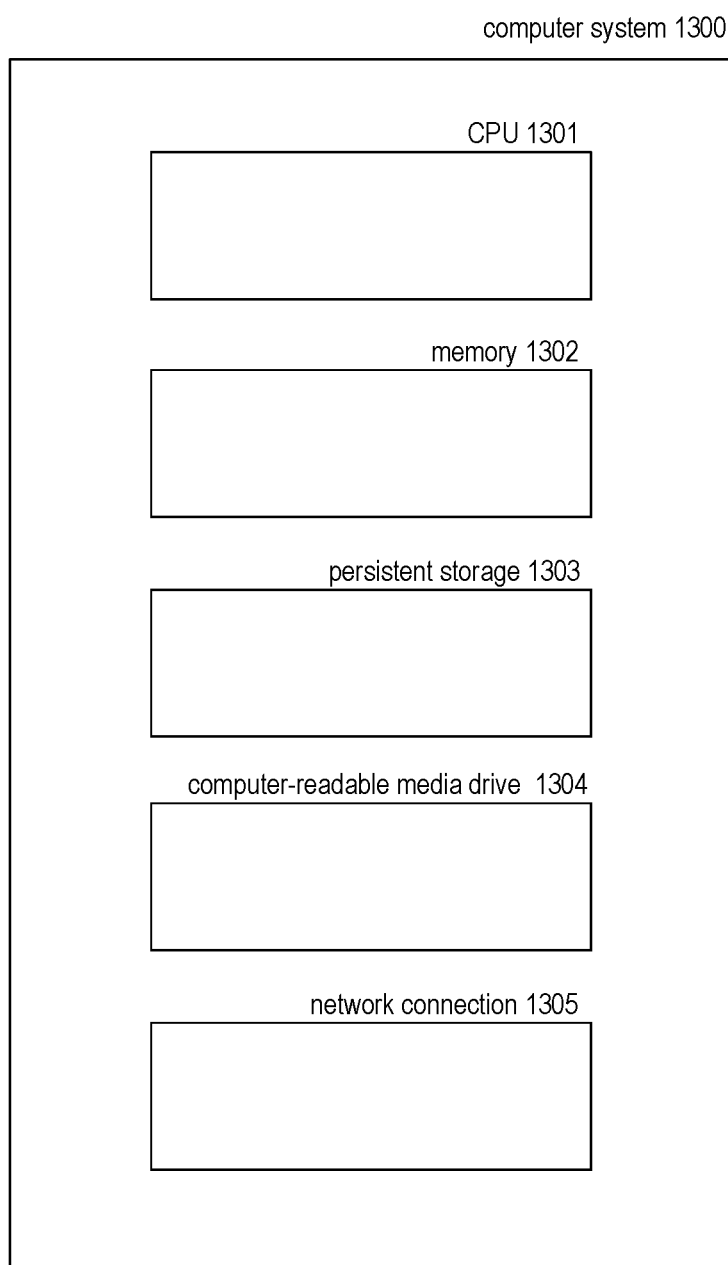
FIG. 13 is a block diagram showing some of the components typically incorporated in at least some of the computer systems and other devices on which the disclosed system operates in accordance with some implementations of the present technology.

FIG. 13 is a block diagram showing some of the components typically incorporated in at least some of the computer systems and other devices on which the disclosed system operates. In various implementations, these computer systems and other devices 1300 can include server computer systems, desktop computer systems, laptop computer systems, netbooks, mobile phones, personal digital assistants, televisions, cameras, unmanned aerial vehicle computers, aerial vehicle computers, satellite computers, electronic media players, etc. In various implementations, the computer systems and devices include zero or more of each of the following: a central processing unit (CPU) 1301 for executing computer programs; a computer memory 1302 for storing programs and data while they are being used, including the facility and associated data, an operating system including a kernel, and device drivers; a persistent storage device 1303, such as a hard drive or flash drive for persistently storing programs and data; computer-readable media drives 1304 that are tangible storage means that do not include a transitory, propagating signal, such as a floppy, CD-ROM, or DVD drive, for reading programs and data stored on a computer-readable medium; and a network connection 1305 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 14:
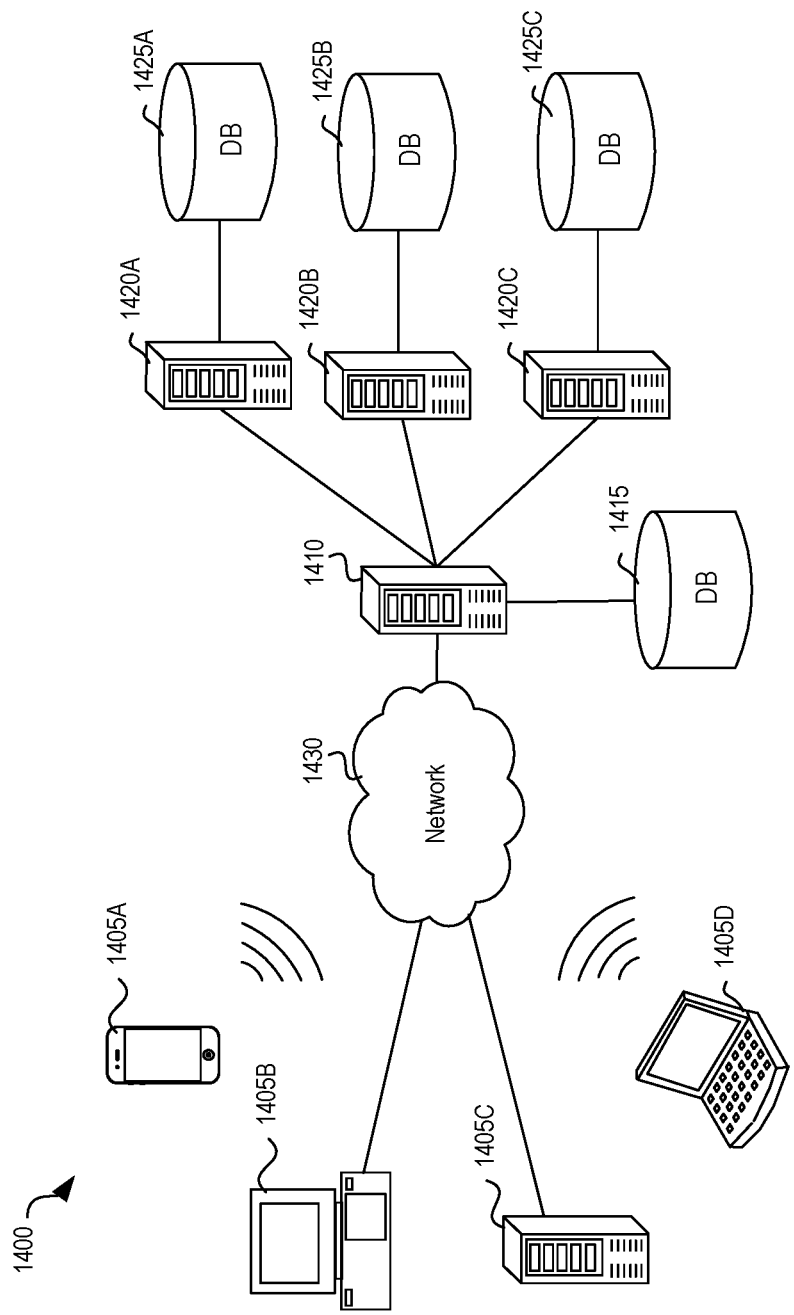
FIG. 14 is a system diagram illustrating an example of a computing environment in which the disclosed system operates in some implementations of the present technology.

FIG. 14 is a system diagram illustrating an example of a computing environment 1400 in which the disclosed system operates in some implementations of the present technology. In some implementations, the environment 1400 (sometime also referred to as "system 1400") includes one or more client computing devices 1405A-D, examples of which can host the system 1400. Client computing devices 1405 operate in a networked environment using logical connections through network 1430 to one or more remote computers, such as a server computing device.

In some implementations, server 1410 is an edge server which receives client requests and coordinates fulfillment of those requests through other servers, such as servers 1420A-C. In some implementations, server computing devices 1410 and 1420 comprise computing systems, such as the system 1400. Though each server computing device 1410 and 1420 is displayed logically as a single server, server computing devices can each be a distributed computing environment encompassing multiple computing devices located at the same or at geographically disparate physical locations. In some implementations, each server 1420 corresponds to a group of servers.

Client computing devices 1405 and server computing devices 1410 and 1420 can each act as a server or client to other server or client devices. In some implementations, servers (1410, 1420A-C) connect to a corresponding database (1415, 1425A-C). As discussed above, each server 1420 can correspond to a group of servers, and each of these servers can share a database or can have its own database. Databases 1415 and 1425 warehouse (e.g., store) information such as home information, biomass measurements, image measurements, carbon estimates, and so on. Though databases 1415 and 1425 are displayed logically as single units, databases 1415 and 1425 can each be a distributed computing environment encompassing multiple computing devices, can be located within their corresponding server, or can be located at the same or at geographically disparate physical locations.

Network 1430 can be a local area network (LAN) or a wide area network (WAN), or other wired or wireless networks. In some implementations, network 1430 is the Internet or some other public or private network. Client computing devices 1405 are connected to network 1430 through a network interface, such as by wired or wireless communication. While the connections between server 1410 and servers 1420 are shown as separate connections, these connections can be any kind of local, wide area, wired, or wireless network, including network 1430 or a separate public or private network.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A wearable device for improved monitoring of control over a supervised being, the wearable device comprising:
an electronics housing;
a shortrange wireless component communicably couplable to two or more remote subsystems, the two or more remote subsystems including at least a first remote subsystem and a second remote subsystem;
at least one long range communication component communicably couplable to a remote server; and
an operating platform implemented a processor within the electronics housing, wherein the operating platform comprises one or more modules to control the wearable device to:
detect a presence of the second remote subsystem in a vicinity of the wearable device;
initiate a handoff of the control over the supervised being from a user of the first remote subsystem to a user of the second remote subsystem; and
determine whether a confirmation of the handoff was received from the second remote subsystem, wherein:
responsive to the confirmation of the handoff being received, the operating platform is further configured to send an update indicating the handoff to the remote server to update an indicator of the control over the supervised being, and
responsive to the confirmation of the handoff not being received, the operating platform is further configured to send an indication of an error to the user of the first remote subsystem.

2. The wearable device of example 1 wherein initiating the handoff comprises sending a prompt to the user of the first remote subsystem indicating the presence of the second remote subsystem in the vicinity of the wearable device.

3. The wearable device of example 2 wherein the prompt enables the user of the first remote subsystem to send a request for the handoff to the user of the second remote subsystem.

4. The wearable device of any of examples 1-3 wherein initiating the handoff comprises sending a prompt to the user of the second remote subsystem requesting the user of the second remote subsystem to assume control over the supervised being.

5. The wearable device of any of examples 1-4 wherein, when the confirmation of the handoff is received, the operating platform is further configured to tether the wearable device to the second remote subsystem enabling transmission of updates related to the supervised being to the second remote subsystem.

6. The wearable device of example 5 wherein the updates include information related to at least one of: a geographic location of the supervised being, a presence of the supervised being within a preset geofence boundary, a health status of the supervised being, or a developmental status of the supervised being.

7. The wearable device of any of examples 1-6, further comprising one or more sensors carried by the electronics housing and positioned to collect data related to bioindicators, wherein the bioindicators are at least partially indicative of a health and/or developmental status of the supervised being.

8. The wearable device of any of examples 1-7 wherein, when confirmation of the handoff was received, the operating platform is further configured to:
determine a supervision status based on a second detection of the presence of the second remote subsystem within a vicinity of the supervised being;
wherein, when the presence of the second remote subsystem is not identified in the second detection, the operating platform is further configured to send a status update to the remote server via the at least one long range communication component, wherein the status update includes an indication of a lack of control over the supervised being.

9. The wearable device of any of examples 1-8 wherein, when confirmation of the handoff was received, the operating platform is further configured to:

determine a supervision status based on a second detection of the presence of the second remote subsystem within a vicinity of the supervised being;

wherein, when the presence of the second remote subsystem is not identified in the second detection, the operating platform is further configured to send a status update to the first remote subsystem via the at least one long range communication component, wherein the status update includes an indication of a lack of control over the supervised being.

10. The wearable device of any of examples 1-9, further comprising at least one strap coupled to the electronics housing and positioned to secure the wearable device to the supervised being, wherein the at least one strap includes a buckle with a childproof locking mechanism.

11. A non-transitory computer-readable storage medium storing instructions that, when executed by a computing system, cause the computing system to perform operations for monitoring of control over a supervised being, the operations comprising:

detecting a presence of a first user device having a subsystem configured to communicate with a wearable device on the supervised being;

receiving, from a user of a second user device, an indication to generate a handoff request to switch control over the supervised being from the second user device to the first user device;

sending the handoff request to the first user device; and determining whether a confirmation was received from the first user device in response to the handoff request, wherein:

responsive to the confirmation being received, the operations further comprise sending an update indicating an occurrence of the switch of the control over the supervised being to a remote server communicably coupled to the second user device, and responsive to the confirmation not being received, the operations further comprise indicating an error to the user of the second user device.

12. The non-transitory computer-readable storage medium of example 11 wherein the update is configured to alter a chain of custody related to the supervised being stored in the remote server.

13. The non-transitory computer-readable storage medium of any of examples 11 and 12 wherein detecting the presence of the first user device is based on communication between shortrange wireless components in the first user device and the second user device.

14. The non-transitory computer-readable storage medium of any of examples 11-13 wherein the operations further comprise:

receiving, from the user of the second user device, a specification of a geofence boundary and an indication to activate the geofence boundary; and sending, to the remote server, the specification of the geofence boundary and the indication to monitor a geographic location of the wearable device for compliance with the geofence boundary.

15. The non-transitory computer-readable storage medium of example 14 wherein the operations further comprise receiving, from the remote server, a notification indicating a breach of the geofence boundary by the wearable device.

16. The non-transitory computer-readable storage medium of example 15 wherein the operations further comprise receiving, from the first user device, an explanation for the breach.

17. The non-transitory computer-readable storage medium of any of examples 15 and 16 wherein the operations further comprise sending, to the remote server, an indication to deactivate the geofence boundary.

18. A wearable device for monitoring health and development of a supervised being, the wearable device comprising:

an electronics housing;

one or more sensors carried by the electronics housing and positioned to collect data related to bioindicators, wherein the bioindicators are at least partially indicative of a health and/or developmental status of the supervised being;

a shortrange wireless component communicably couplable to at least one remote subsystem;

at least one long range communication component communicably couplable to a remote server; and an operating platform implemented a processor within the electronics housing, wherein the operating platform comprises one or more modules to control the wearable device to:

receive the data related to the bioindicators from the one or more sensors;

generate a status update based on the data related to the bioindicators; and check for a presence of the at least one remote subsystem within a communication range of the shortrange wireless component, wherein:

responsive to the presence of the at least one remote subsystem being detected, the operating platform is further configured to transmit the status update to the detected remote subsystem via the shortrange wireless component; and responsive to the presence of the at least one remote subsystem not being detected, the operating platform is further configured to transmit the status update to the remote server via the at least one long range communication component.

19. The wearable device of example 18 wherein the at least one long range communication component has a default mode disconnected from the remote server to conserve energy at the wearable device, and wherein if the presence of the at least one remote subsystem is not detected, the operating platform is further configured to establish a connection between the at least one long range communication component and the remote server before transmitting the status update.

20. The wearable device of any of examples 18 and 19 wherein, if the presence of the at least one remote subsystem is not detected, the operating platform is further configured to transmit an indication of a lack of control over the supervised being to the remote server.

21. The wearable device of any of examples 18-20 wherein, responsive to the presence of the at least one remote subsystem being detected, the status update includes instructions to the at least one remote subsystem for forwarding the status update to the remote server.

22. The wearable device of any of examples 18-21 wherein, responsive to the presence of the at least one remote subsystem being detected, the at least one remote subsystem is configured to:
  receive the status update from the wearable device; and
  transmit the status update to the remote server.
23. The wearable device of any of examples 18-22 wherein the status update includes at least one of (1) the data related to the bioindicators, or (2) an assessment of a current health and/or developmental status of the supervised being based on the bioindicators.
24. The wearable device of any of examples 18-23 wherein generating the status update comprises determining whether any of the bioindicators in the data from the one or more sensors depart from a baseline status for the supervised being.
25. The wearable device of any of examples 18-24 wherein generating the status update comprises determining at least one of: a skin temperature for the supervised being, a skin conductivity for the supervised being, a pulse of the supervised being, and movement of the supervised being.
26. The wearable device of any of examples 18-25 wherein generating the status update comprises determining whether the supervised being experienced a significant physical, emotional, or mental event.
27. The wearable device of any of examples 18-26 wherein the status update includes the data related to the bioindicators from the one or more sensors on the wearable device, and wherein the remote server is configured to:
  process the data from the one or more sensors; and
  update the record of the status of the supervised being based on the processed data.
28. The wearable device of example 27 wherein processing the data from the one or more sensors includes determining whether any of the bioindicators in the data from the one or more sensors depart from a baseline status for the supervised being.
29. The wearable device of any of examples 27 and 28 wherein processing the data from the one or more sensors includes determining at least one of: a skin temperature for the supervised being, a skin conductivity for the supervised being, a pulse of the supervised being, and movement of the supervised being.
30. The wearable device of any of examples 27-29 wherein processing the data from the one or more sensors includes determining whether the supervised being experienced a significant physical, emotional, or mental event.
31. The wearable device of any of examples 18-30 wherein the status update allows the remote server to monitor the health and/or developmental status of the supervised being and recommend one or more supervisory activities to a user of the at least one remote subsystem.
32. The wearable device of any of examples 18-31 wherein the status update allows the remote server to monitor the health and/or developmental status of the supervised being and recommend one or more articles related to child development to a user of the first subsystem and the second subsystem.
33. A system for monitoring control over a supervised being, the system comprising:
  a cloud server having at least one database storing a record of the control over the supervised being;
  a first subsystem communicably coupled to the cloud server through at least one first communication component; and
  a second subsystem communicably coupled to the cloud server through at least one second communication component, wherein the second subsystem is configured to:
    detect a presence of the first subsystem;
    receive, from a user of the second subsystem, an indication to handoff control over the supervised being from the second subsystem to the first subsystem;
    send a handoff request to the first subsystem; and
    determine whether a confirmation of the handoff request was received from the first subsystem, wherein:
      if the confirmation of the handoff request was received, the second subsystem is further configured to send an update indicating the handoff to the record of the control over the supervised being to the cloud server, and
      if the confirmation of the handoff request was not received, the second subsystem is further configured to indicate an error to the user of the second subsystem.
34. The system of example 33 wherein the cloud server is configured to:
  receive the update indicating the handoff to the record of the control over the supervised being; and
  store an updated record of the control over the supervised being based on the indicated handoff.
35. The system of example 34 wherein the updated record of the control over the supervised being is accessible by the first subsystem and the second subsystem.
36. The system of any of examples 33-35 wherein the first subsystem further includes a first shortrange wireless component, wherein the second subsystem further includes a second shortrange wireless component, and wherein detecting the presence of the first subsystem is based on communication between the first shortrange wireless component and the second shortrange wireless component.
37. The system of any of examples 33-36, further comprising a wearable electronic device configured to be worn by the supervised being, the wearable electronic device comprising:
  an electronics housing;
  a third subsystem carried by electronics carried by the electronics housing, wherein the third subsystem comprises:
    a shortrange wireless component communicably couplable to the first subsystem and the second subsystem to detect a presence at least one of the first subsystem or the second subsystem; and
    at least one third communication component communicably couplable to the cloud server.
38. The system of example 37 wherein the third subsystem is configured to:
  determine a supervision status based on the detection of the presence of at least one of the first subsystem or the second subsystem;
  wherein, when the presence of at least one of the first subsystem or the second subsystem is not detected, the third subsystem is further configured to send a status update to the cloud server via the at least one third communication component, wherein the status update includes an indication of a lack of supervision over the supervised being.

39. The system of any of examples 33-38, further comprising a wearable electronic device configured to be worn by the supervised being, the wearable electronic device including:
an electronics housing;
a GPS component carried by the electronics housing; and
a third subsystem carried by electronics carried by the electronics housing, wherein the third subsystem includes at least one third communication component configured to transmit data from the GPS component to the cloud server.

40. The system of example 39 wherein the cloud server is configured to:
receive, from one of the first subsystem and the second subsystem, a definition of a geofence boundary and an indication to activate the geofence boundary;
receive, from the third subsystem, the data from the GPS component; and
when the data from the GPS component indicates that the electronic device is outside of the geofence boundary, transmit, to at least one of the first subsystem and the second subsystem, a notification of a geofencing breach.

41. The system of any of examples 33-40 wherein the second subsystem is configured to:
receive, from the user of the second subsystem, an indication of a geofence boundary;
transmit, to the cloud server, an activation signal to enforce the indicated geofence boundary;
receive, from the cloud server, a notification of a breach of the indicated geofence boundary; and
receive, from the user of the second subsystem, inputs related to whether the breach of the indicated geofence boundary is explained,
wherein:
if the breach of the indicated geofence boundary is explained, the second subsystem is configured to transmit an explanation to the cloud server; and
if the breach of the indicated geofence boundary is not explained, the second subsystem is configured to transmit an indication of no explanation to the cloud server.

42. The system of example 41 wherein, if the breach of the indicated geofence boundary is explained, the cloud server is configured to deactivate the indicated geofence boundary.

43. The system of any of examples 33-42 wherein the first subsystem is configured to: receive, from a user of the first subsystem, an indication of a geofence boundary;
transmit, to the cloud server, an activation signal to enforce the indicated geofence boundary;
receive, from the cloud server, a notification of a breach of the indicated geofence boundary; and
receive, from the user of the first subsystem, inputs related to whether the breach of the indicated geofence boundary is explained,
wherein:
if the breach of the indicated geofence boundary is explained, the first subsystem is further configured to transmit an explanation to the cloud server; and
if the breach of the indicated geofence boundary is not explained, the first subsystem is further configured to transmit a help signal to the second subsystem.

44. The system of any of examples 33-43, further comprising:
a fourth subsystem communicably coupled to the cloud server through at least one fourth communication component;
wherein the first subsystem is configured to:
detect a presence of the fourth subsystem;
receive, from a user of the fourth subsystem, an indication to handoff control over the supervised being from the second subsystem to the fourth subsystem;
send a second handoff request to the fourth subsystem; and
determine whether a confirmation of the second handoff request was received from the fourth subsystem, wherein:
if the confirmation of the second handoff request was received, the first subsystem is further configured to send a second update indicating the record of the control over the supervised being to the cloud server, and
if the confirmation of the second handoff request was not received, the first subsystem is further configured to indicate an error to the user of the first subsystem.

45. A system for monitoring the health and development of a supervised being, the system comprising:
a cloud server having at least one database storing a record of a status of the supervised being, wherein the status includes data related to health and development of the supervised being;
a first subsystem communicably coupled to the cloud server through at least one first communication component;
a second subsystem communicably coupled to the cloud server through at least one second communication component; and
a wearable electronic device configured to be worn by the supervised being, the wearable electronic device including:
an electronics housing;
one or more sensors carried by the electronics housing and positioned to collect data related to bioindicators, wherein the bioindicators are at least partially indicative of the status of the supervised being; and
a third subsystem carried by the electronics housing, wherein the third subsystem comprises:
a shortrange wireless component communicably couplable to the first subsystem and the second subsystem to transmit a status update to at least one of first subsystem or the second subsystem, wherein status update includes the data from the one or more sensors;
at least one third communication component communicably couplable to transmit the status update to the cloud server.

46. The system of example 45 wherein the third subsystem is further configured to check for a presence of at least one of the first subsystem or the second subsystem within a communication range of the third subsystem using the shortrange wireless component, wherein:
if the presence of at least one of the first subsystem or the second subsystem is detected within the communication range of the third subsystem, the third subsystem is further configured transmit the status update to the detected subsystem via the shortrange wireless component; and if the presence of at least one of the first subsystem or the second subsystem is not detected within the communication range of the third subsystem, the third subsystem is further configured to transmit the status update to the cloud server via the at least one third communication component.

47. The system of example 46 wherein the at least one third communication component has a default mode disconnected from the cloud server to conserve energy at the third subsystem, and wherein if the presence of at least one of the first subsystem or the second subsystem is not detected within the communication range of the third subsystem, the third subsystem is further configured to communicably couple the at least one third communication component to the cloud server before transmitting the status update.

48. The system of any of examples 45-47 wherein the at least one third communication component includes a wireless network communication component and a cellular communication component.

49. The system of any of examples 45-48 wherein, when detected within the communication range of the third subsystem, the first subsystem and the second subsystem are each configured to:
receive the status update from the wearable device; and
transmit the status update to the cloud server.

50. The system of any of examples 45-49 wherein the cloud server is configured to:
receive the status update from the wearable device;
process the data from the one or more sensors; and update the record of the status of the supervised being based on the processed data.

51. The system of example 50 wherein processing the data from the one or more sensors includes determining whether any of the bioindicators in the data from the one or more sensors depart from a baseline status for the supervised being.

52. The system of any of examples 50 and 51 wherein processing the data from the one or more sensors includes determining at least one of: a skin temperature for the supervised being, a skin conductivity for the supervised being, a pulse of the supervised being, and movement of the supervised being.

53. The system of any of examples 50-52 wherein processing the data from the one or more sensors includes determining whether the supervised being experienced a significant physical, emotional, or mental event.

54. The system of any of examples 50-53 wherein the cloud server is further configured to review the record of the status of the supervised being and recommend one or more supervisory activities to a user of the first subsystem and the second subsystem.

55. The system of any of examples 50-54 wherein the cloud server is further configured to review the record of the status of the supervised being and recommend one or more articles related to child development to a user of the first subsystem and the second subsystem.

56. A method for monitoring control over a pet, the method comprising:
detecting a presence of a user device associated with a responsible person in a vicinity of an electronic device associated with the pet;
initiating a handoff of the control over the pet from a first state to a second state associated with the responsible person; and
determining whether to confirm or deny the handoff, wherein:
responsive to a determination to confirm the handoff, the method further comprises updating a record of the control over the pet, and
responsive to a determination to deny the handoff, the method further comprises sending an indication of an error to the user device associated with the responsible person.

57. The method of example 56 wherein the responsible person is a second responsible person, wherein the first state is associated with a first responsible person, and wherein determining whether to confirm or deny the handoff comprises:
sending, to a user device associated with the first responsible person, a request to transfer the control over the pet to the second responsible person; and
receiving, from the user device associated with the first responsible person, a response to the request, wherein the response accepts the request or declines the request.

58. The method of any of examples 56 and 57 wherein the first state is an unsupervised state, wherein determining whether to confirm or deny the handoff comprises confirming the handoff complies with one or more control rules set by an owner of the pet, and wherein the one or more control rules include an indication of authorized responsible persons for the handoff.

59. The method of example 58 wherein, responsive to a determination to deny the handoff, the method further comprises sending an indication of an unauthorized party to a user device associated with owner.

60. The method of any of examples 58 and 59 wherein the one or more control rules further include an acceptable timeframe for the handoff.

61. The method of any of examples 56-60 wherein determining whether to confirm or deny the handoff comprises:
sending, to the user device associated with the responsible person, a request for the responsible person to assume the control over the pet; and
receiving, from the user device associated with the responsible person, a response to the request, wherein the response accepts the request or declines the request.

62. The method of any of examples 56-61 wherein, responsive to a determination to confirm the handoff, the method further comprises tethering the electronic device associated with the pet to the user device associated with the responsible person.

63. The method of any of examples 56-62 wherein, responsive to a determination to confirm the handoff, the method further comprises sending a notification to a user device associated with an owner of the pet indicating the handoff.

64. The method of any of examples 56-63 wherein the first state in an unsupervised state and the second state is a supervised state, and wherein the method further comprises:
receiving, from the user device associated with the responsible person, a departing handoff request to transfer the control over the pet from the supervised state to the unsupervised state; and
determining whether to confirm or deny the departing handoff request, wherein:
responsive to a determination to confirm the departing handoff request, the method further comprises updating the record of the control over the pet, and
responsive to a determination to deny the departing handoff request, the method further comprises sending an indication of an error to the user device associated with the detected responsible person.

65. The method of example 64 wherein determining whether to confirm or deny the departing handoff request comprises confirming the departing handoff request complies with one or more control rules set by an owner of the pet.

66. A non-transitory computer-readable storage medium storing instructions that, when executed by a computing system on a user device associated with a responsible person, cause the computing system to perform operations for recording control over an animal, the operations comprising:
initiating a first handoff of the control over the animal from a first state to a second state, wherein the second state is associated with supervision from the responsible person;
sending, to a remote server, a first update to a chain of custody record stored at the remote server, wherein the first update indicates an occurrence of the first handoff from the first state to the second state;
receiving, from the responsible person, a request to initiate a second handoff of the control over the animal from the second state to a third state;
sending an indication of the request for the second handoff to the remote server; and
determining whether a confirmation was received from the remote server in response to the indication of the second handoff, wherein:
responsive to the confirmation being received, the operations further comprise sending, to the remote server, a second update to the chain of custody record, wherein the second update indicates an occurrence of the second handoff from the second state to the third state; and
responsive to the confirmation not being received, the operations further comprise indicating an error to the responsible person.

67. The non-transitory computer-readable storage medium of example 66 wherein the responsible person is a first responsible person, wherein the first state is associated with supervision from an owner of the animal, and wherein the third state is associated with a second responsible person.

68. The non-transitory computer-readable storage medium of example 67 wherein the indication of the request for the second handoff provides an identification of the second responsible person to allow the remote server to check the identification against one or more control rules for the control over the animal.

69. The non-transitory computer-readable storage medium of any of examples 66-68 wherein the first state is associated with supervision from an owner of the animal, and wherein the third state is associated with an unsupervised state for the animal.

70. The non-transitory computer-readable storage medium of example 14 wherein the indication of the request for the second handoff is configured to prompt the remote server to check one or more control rules for the animal to confirm or deny the second handoff.

71. The non-transitory computer-readable storage medium of example 15 wherein the one or more control rules include an approved timeframe for the second handoff.

72. The non-transitory computer-readable storage medium of any of examples 66-71 wherein, while the animal is in the second state, the operations further comprise:
receiving, from a shortrange wireless component on an electronic device associated with the animal, information related to a status of the animal; and
sending, to the remote server, the information related to the status of the animal.

73. An electronic device for improved monitoring of control over an animal, the electronic device comprising:
an electronics housing;
a shortrange wireless component communicably couplable to a remote subsystem on a portable electronic device associated with the animal;
at least one long range communication component communicably couplable to a remote server; and
an operating platform implemented by a processor within the electronics housing, wherein the operating platform comprises one or more modules to control the electronic device to:
detect a presence of the portable electronic device associated with the animal in a vicinity of the electronic device;
initiate a handoff of the control over the animal from a first responsible person to a second responsible person associated with the electronic device; and
determine whether a confirmation of the handoff was received, wherein:
responsive to the confirmation of the handoff being received, the operating platform is further configured to send an update indicating the handoff to the remote server to update a record of the control over the animal, and
responsive to the confirmation of the handoff not being received, the operating platform is further configured to send an indication of an error to at least one of the first responsible person and/or the second responsible person.

74. The electronic device of example 73 wherein initiating the handoff of the control over the animal comprises sending a prompt to a user device associated with the second responsible person requesting that the second responsible person assume control over the animal.

75. The electronic device of any of examples 73 and 74 wherein, after detecting a presence of the portable electronic device, the one or more modules further control the electronic device to:
receive one or more updates from the portable electronic device, wherein the one or more updates include at least one of: a current geographic location of the animal, a record of previous geographic locations of the animal, a record of detected interactions with an electronic device associated with the first responsible person, and a health status of the animal; and
send the one or more updates to the remote server to update a status of the animal stored at the remote server.

Conclusion

From the foregoing, it will be appreciated that specific implementations of the technology have been described herein for purposes of illustration, but well-known structures and functions have not been shown or described in detail to avoid unnecessarily obscuring the description of the implementations of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular implementations may also be combined or eliminated in other implementations. Furthermore, although advantages associated with certain implementations of the technology have been described in the context of those implementations, other implementations may also exhibit such advantages, and not all implementations need necessarily exhibit such advantages to fall within the scope of the technology. Accordingly, the disclosure and associated technology can encompass other implementations not expressly shown or described herein.

We claim:

1. A method for administering control over a pet, the method comprising:
    detecting a presence of a user device associated with a responsible person in a vicinity of an electronic device associated with the pet;
    initiating a handoff of the control over the pet from a first state to a second state associated with the responsible person; and
    determining whether to confirm or deny the handoff, wherein:
        responsive to a determination to confirm the handoff, the method further comprises updating a record of the control over the pet, and
        responsive to a determination to deny the handoff, the method further comprises sending an indication of an error to the user device associated with the responsible person.

2. The method of claim 1 wherein the responsible person is a second responsible person, wherein the first state is associated with a first responsible person, and wherein determining whether to confirm or deny the handoff comprises:
    sending, to a user device associated with the first responsible person, a request to transfer the control over the pet to the second responsible person; and
    receiving, from the user device associated with the first responsible person, a response to the request, wherein the response indicates an acceptance of the request or a rejection of the request.

3. The method of claim 1 wherein the first state is an unsupervised state, wherein determining whether to confirm or deny the handoff comprises confirming the handoff complies with one or more control rules set by an owner of the pet, and wherein the one or more control rules include an indication of authorized responsible persons for the handoff.

4. The method of claim 3 wherein, responsive to a determination to deny the handoff, the method further comprises sending an indication of an unauthorized party to a user device associated with owner.

5. The method of claim 3 wherein the one or more control rules further include an acceptable timeframe for the handoff.

6. The method of claim 1 wherein determining whether to confirm or deny the handoff comprises:
    sending, to the user device associated with the responsible person, a request for the responsible person to assume the control over the pet; and
    receiving, from the user device associated with the responsible person, a response to the request, wherein the response accepts the request or declines the request.

7. The method of claim 1 wherein, responsive to a determination to confirm the handoff, the method further comprises tethering the electronic device associated with the pet to the user device associated with the responsible person.

8. The method of claim 1 wherein, responsive to a determination to confirm the handoff, the method further comprises sending a notification to a user device associated with an owner of the pet indicating the handoff.

9. The method of claim 1 wherein the first state in an unsupervised state and the second state is a supervised state, and wherein the method further comprises:
    receiving, from the user device associated with the responsible person, a departing handoff request to transfer the control over the pet from the supervised state to the unsupervised state; and
    determining whether to confirm or deny the departing handoff request, wherein:
        responsive to a determination to confirm the departing handoff request, the method further comprises updating the record of the control over the pet, and
        responsive to a determination to deny the departing handoff request, the method further comprises sending an indication of an error to the user device associated with the detected responsible person.

10. The method of claim 9 wherein determining whether to confirm or deny the departing handoff request comprises confirming the departing handoff request complies with one or more control rules set by an owner of the pet.

11. A non-transitory computer-readable storage medium storing instructions that, when executed by a computing system on a user device associated with a responsible person, cause the computing system to perform operations for recording control over an animal, the operations comprising:
    initiating a first handoff of the control over the animal from a first state to a second state, wherein the second state is associated with supervision from the responsible person;
    sending, to a remote server, a first update to a chain of custody record stored at the remote server, wherein the first update indicates an occurrence of the first handoff from the first state to the second state;
    receiving, from the responsible person, a request to initiate a second handoff of the control over the animal from the second state to a third state;
    sending an indication of the request for the second handoff to the remote server; and
    determining whether a confirmation was received from the remote server in response to the indication of the second handoff, wherein:

responsive to the confirmation being received, the operations further comprise sending, to the remote server, a second update to the chain of custody record, wherein the second update indicates an occurrence of the second handoff from the second state to the third state; and responsive to the confirmation not being received, the operations further comprise indicating an error to the responsible person.

12. The non-transitory computer-readable storage medium of claim 11 wherein the responsible person is a first responsible person, wherein the first state is associated with supervision from an owner of the animal, and wherein the third state is associated with a second responsible person.

13. The non-transitory computer-readable storage medium of claim 12 wherein the indication of the request for the second handoff provides an identification of the second responsible person to allow the remote server to check the identification against one or more control rules for the control over the animal.

14. The non-transitory computer-readable storage medium of claim 11 wherein the first state is associated with supervision from an owner of the animal, and wherein the third state is associated with an unsupervised state for the animal.

15. The non-transitory computer-readable storage medium of claim 14 wherein the indication of the request for the second handoff is configured to prompt the remote server to check one or more control rules for the animal to confirm or deny the second handoff.

16. The non-transitory computer-readable storage medium of claim 15 wherein the one or more control rules include an approved timeframe for the second handoff.

17. The non-transitory computer-readable storage medium of claim 11 wherein, while the animal is in the second state, the operations further comprise:

receiving, from a shortrange wireless component on an electronic device associated with the animal, information related to a status of the animal; and sending, to the remote server, the information related to the status of the animal.

18. An electronic device for improved monitoring of control over an animal, the electronic device comprising:

an electronics housing;

a shortrange wireless component communicably couplable to a remote subsystem on a portable electronic device associated with the animal;

at least one long range communication component communicably couplable to a remote server; and an operating platform implemented by a processor within the electronics housing, wherein the operating platform comprises one or more modules to control the electronic device to:

detect a presence of the portable electronic device associated with the animal in a vicinity of the electronic device;

initiate a handoff of the control over the animal from a first responsible person to a second responsible person associated with the electronic device; and determine whether a confirmation of the handoff was received, wherein:

responsive to the confirmation of the handoff being received, the operating platform is further configured to send an update indicating the handoff to the remote server to update a record of the control over the animal, and responsive to the confirmation of the handoff not being received, the operating platform is further configured to send an indication of an error to at least one of the first responsible person and/or the second responsible person.

19. The electronic device of claim 18 wherein initiating the handoff of the control over the animal comprises sending a prompt to a user device associated with the second responsible person requesting that the second responsible person assume control over the animal.

20. The electronic device of claim 18 wherein, after detecting a presence of the portable electronic device, the one or more modules further control the electronic device to:

receive one or more updates from the portable electronic device, wherein the one or more updates include at least one of: a current geographic location of the animal, a record of previous geographic locations of the animal, a record of detected interactions with an electronic device associated with the first responsible person, and a health status of the animal; and send the one or more updates to the remote server to update a status of the animal stored at the remote server.

* * * * *